United States Patent
Baek et al.

(10) Patent No.: US 11,122,463 B2
(45) Date of Patent: Sep. 14, 2021

(54) METHOD FOR PROCESSING DATA IN COMMUNICATION SYSTEM

(71) Applicant: Samsung Electronics Co., Ltd., Suwon-si (KR)

(72) Inventors: Sangkyu Baek, Yongin-si (KR); Youngjoong Mok, Suwon-si (KR); Anil Agiwal, Suwon-si (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 16/481,032

(22) PCT Filed: Feb. 2, 2018

(86) PCT No.: PCT/KR2018/001457
§ 371 (c)(1),
(2) Date: Jul. 25, 2019

(87) PCT Pub. No.: WO2018/143728
PCT Pub. Date: Aug. 9, 2018

(65) Prior Publication Data
US 2019/0394675 A1    Dec. 26, 2019

(30) Foreign Application Priority Data
Feb. 2, 2017    (KR) .................... 10-2017-0015192

(51) Int. Cl.
*H04W 28/06* (2009.01)
*H04L 1/16* (2006.01)
(Continued)

(52) U.S. Cl.
CPC ........... *H04W 28/06* (2013.01); *H04L 1/1642* (2013.01); *H04L 5/0055* (2013.01); *H04W 80/08* (2013.01)

(58) Field of Classification Search
CPC ..... H04W 28/06; H04W 80/08; H04W 80/02; H04L 1/1642; H04L 1/1614;
(Continued)

(56) References Cited

U.S. PATENT DOCUMENTS

| 10,271,243 B2 * | 4/2019 | Phuyal .................. H04W 76/15 |
| 2009/0016301 A1 * | 1/2009 | Sammour ............... H04L 49/90 370/331 |

(Continued)

FOREIGN PATENT DOCUMENTS

KR    10-2017-0113355 A    10/2017

OTHER PUBLICATIONS

ISA/KR, "International Search Report and Written Opinion of the International Searching Authority," Application No. PCT/KR2018/001457, dated May 31, 2018, 34 pages.

*Primary Examiner* — Saumit Shah

(57) ABSTRACT

The present disclosure relates to a communication technique for convergence of IoT technology and a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology. The present disclosure relates to transmission and reception by a communication device in a wireless communication system, and may refer to a PDCP and RLC structure defined in the 3GPP.

14 Claims, 57 Drawing Sheets

(51) Int. Cl.
*H04L 5/00* (2006.01)
*H04W 80/08* (2009.01)

(58) Field of Classification Search
CPC ........... H04L 5/0055; H04L 2001/0097; H04L 69/28; H04L 29/08
See application file for complete search history.

(56) References Cited

U.S. PATENT DOCUMENTS

| | | |
|---|---|---|
| 2014/0313981 A1* | 10/2014 | Christoffersson ..... H04W 28/06 370/328 |
| 2015/0023370 A1 | 1/2015 | Sammour et al. |
| 2015/0043435 A1 | 2/2015 | Blankenship et al. |
| 2015/0085667 A1 | 3/2015 | Sivanesan et al. |
| 2015/0223093 A1 | 8/2015 | Zhang et al. |
| 2016/0164793 A1* | 6/2016 | Basu Mallick ....... H04L 47/564 370/235 |
| 2016/0219594 A1* | 7/2016 | Uchino ................. H04W 76/15 |
| 2016/0278138 A1 | 9/2016 | Chen et al. |
| 2017/0288821 A1 | 10/2017 | Baek et al. |
| 2018/0262950 A1* | 9/2018 | Malkamaki ........... H04L 1/1621 |

* cited by examiner

FIG. 10

| DPI | E | SEQUENCE NUMBER (SN) OF DISCARD PACKET | |
|---|---|---|---|
| E | SEQUENCE NUMBER (SN) OF DISCARD PACKET | | E |
| SEQUENCE NUMBER (SN) OF DISCARD PACKET | | .... | |

FIG. 12

| DPI | E1 | E2 | Discarded SN | Contiguous Num. (CN) |
|---|---|---|---|---|

FIG. 13

| DPI | E1 | E2 | Discarded SN Low | Discarded SN High |

FIG. 14

| DPI | Discarded SN | Bitmap |

FIG. 15

| DPI | Bitmap Size | Discarded SN | Bitmap |
|---|---|---|---|

FIG. 19
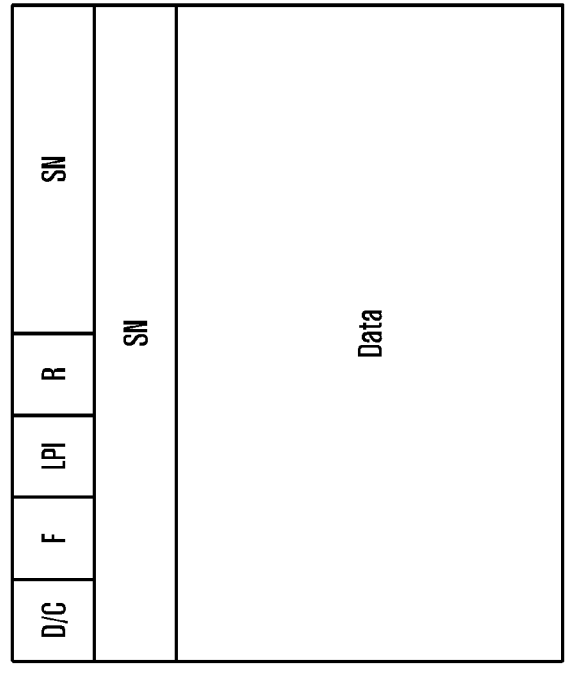
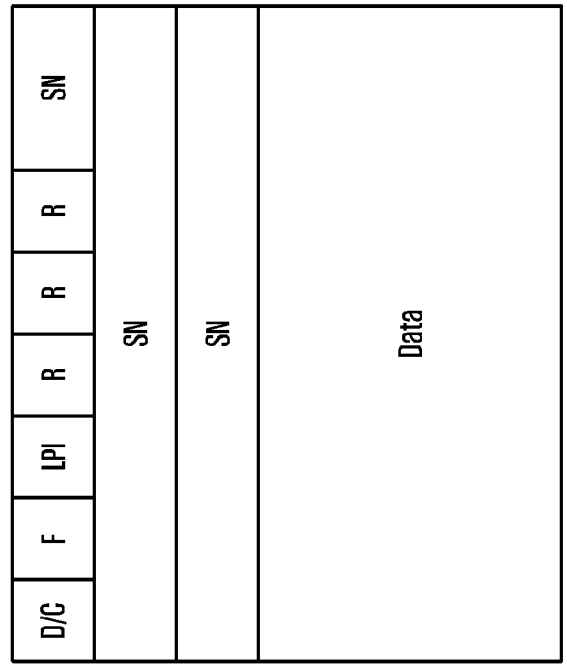

| COUNT 32-bit | OLD SN 7-bit | | TEMPORARY SN 22-bit | | NEW SN 5-bit |
|---|---|---|---|---|---|
| 8500029 | 61 | | 111421 | New HFN = 265625 | 29 |
| 8500030 | 62 | | 111422 | | 30 |
| 8500031 | 63 | | 111423 | | 31 |
| 8500032 | 64 | | 111424 | | 0 |
| 8500033 | 65 | | 111425 | | 1 |
| 8500034 | 66 | | 111426 | | 2 |
| 8500035 | 67 | | 111427 | | 3 |
| 8500036 | 68 | | 111428 | | 4 |
| 8500037 | 69 | | 111429 | | 5 |
| 8500038 | 70 | | 111430 | | 6 |
| 8500039 | 71 | | 111431 | | 7 |
| 8500040 | 72 | | 111432 | | 8 |
| 8500041 | 73 | | 111433 | | 9 |
| 8500042 | 74 | | 111434 | | 10 |
| 8500043 | 75 | Old HFN = 66407 | 111435 | New HFN = 265626 | 11 |
| 8500044 | 76 | TEMPORARY HFN = 2 | 111436 | | 12 |
| 8500045 | 77 | | 111437 | | 13 |
| 8500046 | 78 | | 111438 | | 14 |
| 8500047 | 79 | | 111439 | | 15 |
| 8500048 | 80 | | 111440 | | 16 |
| 8500049 | 81 | | 111441 | | 17 |
| 8500050 | 82 | | 111442 | | 18 |
| 8500051 | 83 | | 111443 | | 19 |
| 8500052 | 84 | | 111444 | | 20 |
| 8500053 | 85 | | 111445 | | 21 |
| 8500054 | 86 | | 111446 | | 22 |
| 8500055 | 87 | | 111447 | | 23 |
| 8500056 | 88 | | 111448 | | 24 |
| 8500057 | 89 | | 111449 | | 25 |
| 8500058 | 90 | | 111450 | | 26 |
| 8500059 | 91 | | 111451 | | 27 |
| 8500060 | 92 | | 111452 | | 28 |
| 8500061 | 93 | | 111453 | | 29 |
| 8500062 | 94 | | 111454 | | 30 |
| 8500063 | 95 | | 111455 | | 31 |
| 8500064 | 96 | | 111456 | | 0 |
| 8500065 | 97 | | 111457 | New HFN = 265627 | 1 |
| 8500066 | 98 | | 111458 | | 2 |
| 8500067 | 99 | | 111459 | | 3 |
| 8500068 | 100 | | 111460 | | 4 |
| 8500069 | 101 | | 111461 | | 5 |
| 8500070 | 102 | | 111462 | | 6 |
| 8500071 | 103 | | 111463 | | 7 |
| 8500072 | 104 | | 111464 | | 8 |
| 8500073 | 105 | | 111465 | | 9 |
| 8500074 | 106 | | 111466 | | 10 |
| 8500075 | 107 | | 111467 | | 11 |
| 8500076 | 108 | | 111468 | | 12 |

RECEPTION

NON-RECEPTION

METHOD FOR PROCESSING DATA IN COMMUNICATION SYSTEM

CROSS-REFERENCE TO RELATED APPLICATIONS

This application is a 371 National Stage of International Application No. PCT/KR2018/001457, filed Feb. 2, 2018, which claims priority to Korean Patent Application No. 10-2017-0015192, filed on Feb. 2, 2017, the disclosures of which are herein incorporated by reference in their entirety.

BACKGROUND

1. Field

The disclosure relates to the transmission and reception of a communication device in a wireless communication system. In the disclosure, reference may be made to a packet data convergence protocol (PDCP) and radio link control (RLC) structure defined in 3GPP, for example.

2. Description of Related Art

In order to satisfy a wireless data traffic demand that tends to increases after the $4^{th}$-generation (4G) communication system commercialization, efforts to develop an improved 5 (5G) communication system or pre-5G communication system is being made. For this reason, the 5G communication system or pre-5G communication system is called a beyond 4G network communication system or a post LTE system.

In order to achieve a high data transfer rate, the 5G communication system is considered to be implemented in a mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system.

In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, the Internet evolves from a human-centered connection network over which human generates and consumes information to Internet of Things (IoT) in which information is exchanged and process between distributed elements, such as things. An Internet of Everything (IoE) technology in which a big data processing technology through a connection with a cloud server is combined with the IoT technology is emerging. In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are recently researched.

In the IoT environment, an intelligent Internet technology (IT) service in which a new value is created for human life by collecting and analyzing data generated from connected things may be provided. The IoT may be applied to fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, machine to machine (M2M) and machine type communication (MTC), are implemented by schemes, such as beamforming, MIMO, and an array antenna. The application of a cloud wireless access network (cloud RAN) as the aforementioned big data processing technology may be said to be an example of convergence between the 5G technology and the IoT technology.

SUMMARY

The disclosure provides a method of solving a problem in that a packet not received in a receiving stage is processed through a configuration method and reporting method for a transmitting stage to report discard packet information to a receiving stage in a wireless communication system.

Furthermore, the disclosure provides a procedure and method operating without a loss of data when the size of a sequence number is changed in a wireless communication system.

According to an embodiment of the disclosure, a method by a transmitter in a wireless communication system may include starting a timer for a packet data convergence protocol (PDCP) packet, discarding the PDCP packet based on the timer being expired, and transmitting, to a receiver, reporting including information on the discarded PDCP packet.

Furthermore, according to an embodiment of the disclosure, a method by a receiver in a wireless communication system includes receiving, from a transmitter, reporting including information on a discarded packet data convergence protocol (PDCP) packet. A timer may be started for the PDCP packet, and the PDCP packet may be discarded in the transmitter based on the timer being expired.

Furthermore, according to an embodiment of the disclosure, a transmitter in a wireless communication system may include a transceiver and a controller configured to start a timer for a packet data convergence protocol (PDCP) packet, discard the PDCP packet based on the timer being expired, and control the transceiver to transmit, to a receiver, reporting including information on the discarded PDCP packet.

Furthermore, according to an embodiment of the disclosure, a receiver in a wireless communication system includes a transceiver configured to transmit, to a transmitter, configuration information on reporting including information of a packet data convergence protocol (PDCP) packet, and a controller configured to control the transceiver to receive, from the transmitter, reporting including information on a discarded PDCP packet generated based on the configuration information. A timer for the PDCP packet may be started, and the PDCP packet may be discarded in the transmitter based on the timer being expired.

In accordance with an embodiment of the disclosure, there is an effect in that a latency time can be reduced because information of a Discard Packet is transmitted to a receiving stage and the receiving stage processes a packet other than the Discard Packet based on the information.

Furthermore, in accordance with an embodiment of the disclosure, effective communication is possible although the size of a sequence number is changed.

BRIEF DESCRIPTION OF THE DRAWINGS

FIG. 10 is a diagram illustrating an example of a structure for transmitting Discard Packet information when a plurality of Discard Packets occurs.

FIG. 12 is an exemplary diagram showing a method of using a contiguous number in order to transmit Discard Packet information when a plurality of Discard Packets occurs.

FIG. 13 is an exemplary diagram showing a method of using a Discarded Sequence Number Now and a Discarded Sequence Number High in order to transmit Discard Packet information when a plurality of Discard Packets occurs.

FIG. 14 is an exemplary diagram showing a method of using a bitmap in order to transmit Discard Packet information when a plurality of Discard Packets occurs.

FIG. 15 is a diagram illustrating an example in which a bitmap size is notified in a method using a bitmap in order to transmit Discard Packet information when a plurality of Discard Packets occurs.

FIG. 19 is a diagram illustrating an embodiment of a header format when the format of a header is changed in the embodiment of FIG. 18.

DETAILED DESCRIPTION

Figure 1:
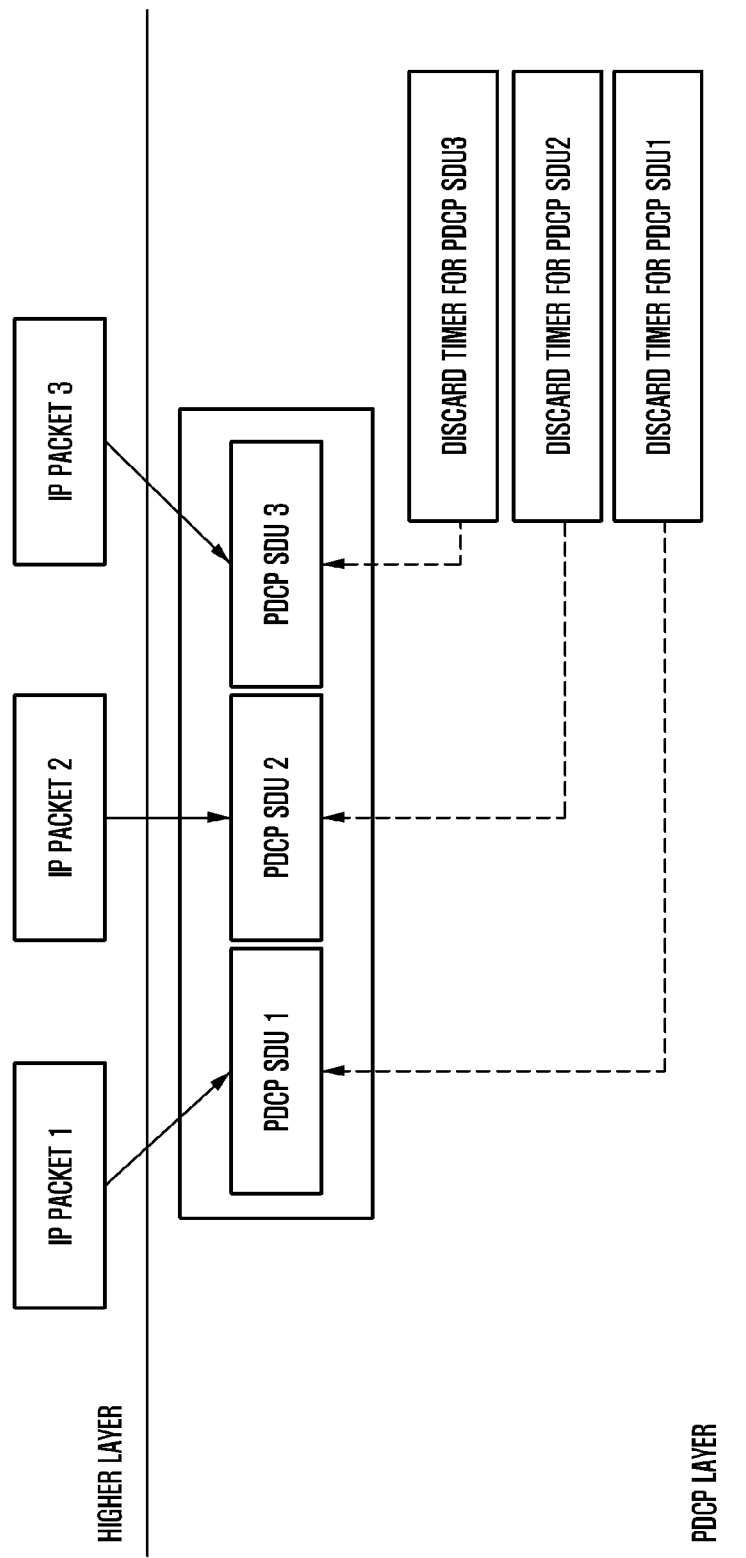
FIG. 1 is a diagram illustrating a Discard Timer operation during an uplink data transmission operation.

In describing embodiments of the disclosure, a description of contents that are well known in the art to which the disclosure pertains and not directly related to the disclosure is omitted in order to deliver the gist of the disclosure more clearly without making obscure it.

For the same reason, in the accompanying drawings, some elements are enlarged, omitted or depicted schematically. Furthermore, the size of each element does not accurately reflect its real size. In the drawings, the same or similar elements are assigned the same reference numerals.

The merits and characteristics of the disclosure and a method for achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure of the disclosure and to allow those skilled in the art to understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Furthermore, each block of the flowchart illustrations may represent a portion of a module, a segment or code, which includes one or more executable instructions for implementing a specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

In this case, the term "unit", as used in the present embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more CPUs within a device or a security multimedia card. Furthermore, in one embodiment, "~unit" may include one or more processors.

First Embodiment

FIG. 1 is a diagram illustrating a Discard Timer operation during an uplink data transmission operation.

FIG. 1 is a diagram illustrating an embodiment in the LTE system during an uplink data transmission operation. For example, if there is data to be transmitted in an upper layer (e.g., IP layer), the data (e.g., IP packet) is forwarded from the upper layer to a packet data convergence protocol (PDCP) layer. For example, an IP Packet1, an IP Packet2, and an IP Packet3 (IP Packets 1~3 may be data generated from the same app or may be data generated from different apps), that is, the data of the upper layer, are forwarded to the PDCP layer. The IP Packet1 is configured with a PDCP SDU1, the IP Packet2 is configured with a PDCP SDU2, and the IP Packet3 is configured with a PDCP SDU3.

Furthermore, when each PDCP SDU is generated, a Discard Timer operates for each PDCP SDU. For example, in the LTE system, when the PDCP SDU1 is generated, a PDCP SDU1 Discard Timer starts. When the Discard Timer expires (e.g., from a PDCP to radio resource control (RRC), when an expiration time set as a Discard Timer exceeds 50 ms if the expiration time is 50 ms), the PDCP SDU1 is discarded in the PDCP layer. Furthermore, the time of the Discard Timer may be set through radio resource control (RRC).

Figure 2:
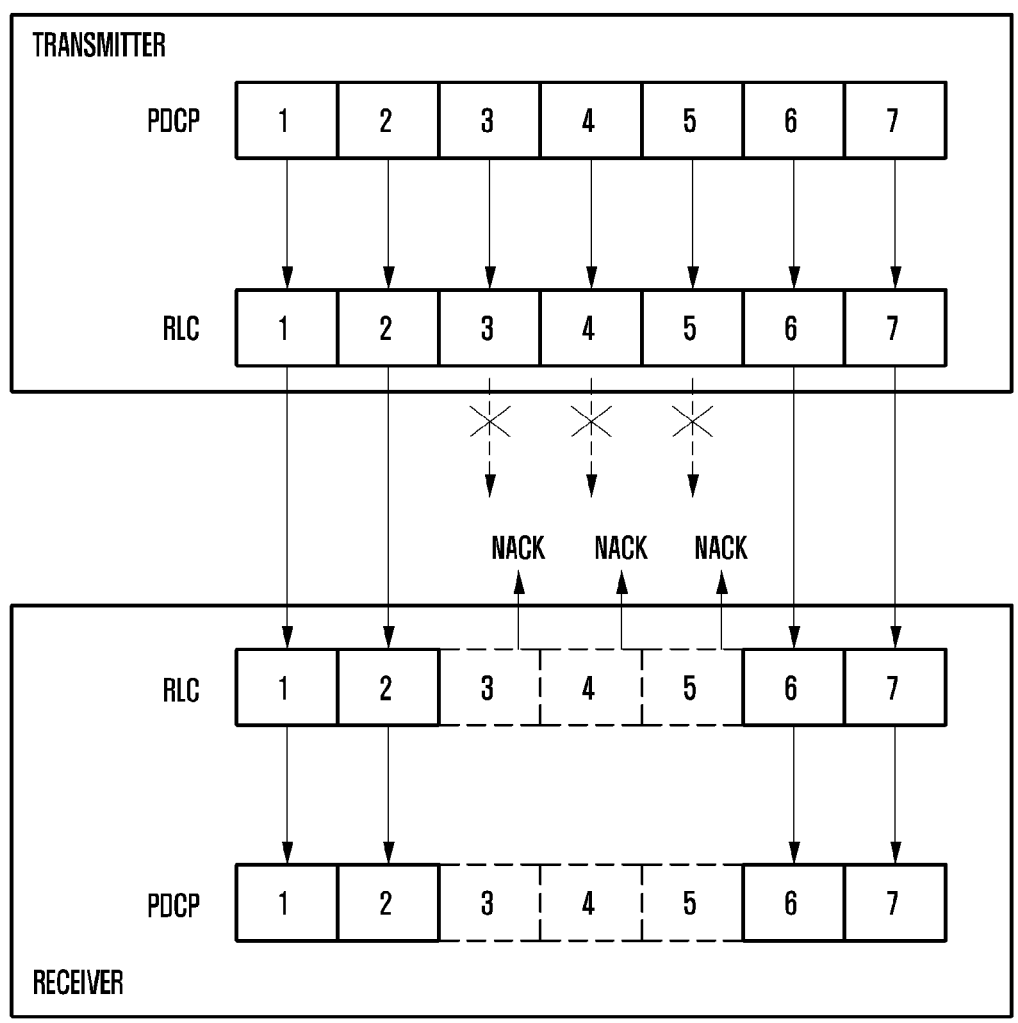
FIG. 2 is a diagram illustrating a problem that may occur in NR when a data packet is discarded.

FIG. 2 is a diagram illustrating a problem that may occur in NR when a data packet is discarded.

FIG. 2 is a diagram illustrating an example of a problem which may occur when a PDCP packet is discarded in a wireless communication system (e.g., LTE system) during an uplink data transmission operation. For example, if a transmitter has a PDCP packet to be transmitted to a receiver, the transmitter may transmit the data to the receiver by forwarding the PDCP packet to a lower layer through a radio link control (RLC) layer.

Although the transmitter has transmitted PDCP packets 1~7 to the receiver, the receiver may not receive RLC or PDCP packets 3, 4, and 5 due to a problem, such as a channel environment. Furthermore, in this case, when an RLC mode is an acknowledged mode (AM) in the RLC layer, the receiver may transmit negative acknowledgement (NACK) for the not-received RLC packet information 3~5. Alternatively, some of the packets 3, 4, and 5 may have been discarded because a Discard Timer expired.

When the receiver transmits the NACK, the PDCP layer of the transmitter may discard the PDCP packet Nos. 3, 4, and 5 based on the expiration of a PDCP Discard Timer, as described in FIG. 1. In this case, the transmitter receives information on the packets, not received by the receiver, from the receiver, but cannot retransmit the PDCP packets, not received by the receiver, to the receiver because the PDCP packets have been discarded. Furthermore, a problem may occur in that the receiver indefinitely transmits the NACK to the transmitter as a retransmission request for the not-received PDCP packets.

Figure 3:
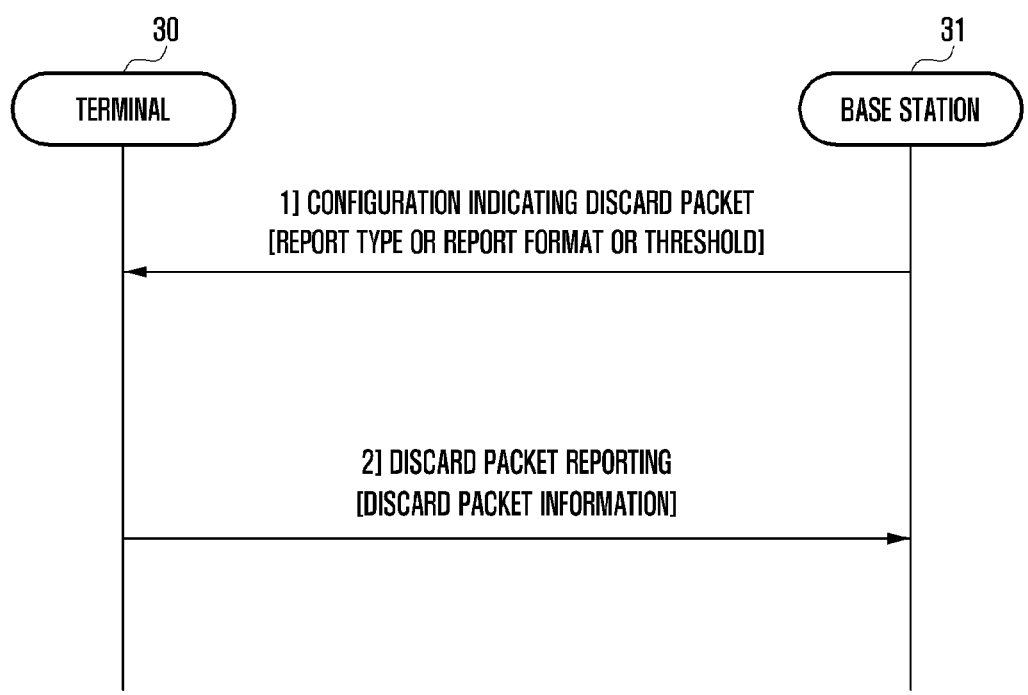
FIG. 3 is a diagram illustrating a configuration method for transmitting Discard Packet information, which is proposed in the disclosure.

FIG. 3 is a diagram illustrating a configuration method for transmitting Discard Packet information, which is proposed in the disclosure.

FIG. 3 is a diagram illustrating a configuration method in order for a transmitter (e.g., terminal or base station) to transmit Discard Packet information of data to be transmitted in uplink.

When a discarded packet occurs in data to be transmitted in uplink, a base station 31 transmits a Discard Packet Indication configuration message, regarding when Discard Packet information will be transmitted and that Discard Packet information will be transmitted in what format, to a terminal (1), so the terminal can configure the time when the Discard Packet information will be transmitted and a method of transmitting it.

For example, if a periodic type is set as Discard Packet information transmission timing (report type), the terminal 30 may transmit Discard Packet information to the base station 31 when a Discard Packet occurs (2). In another embodiment, if an event type is set as Discard Packet information transmission timing (report type), the terminal 30 may transmit Discard Packet information (2) as a combination of pieces of Discard Packet information during a given time from the timing when a Discard Packet occurred or a combination of pieces of Discard Packet information during given counting. For example, in the case of designation from an Event to a Timer, an Event and an event threshold time may be included. Alternatively, in the case of designation from an Event to counting, an event N-counter threshold may be included. Furthermore, an event threshold time embodiment may include expiration timing.

Furthermore, after the terminal 30 determines to transmit the Discard Packet information, it may configure a format for transmitting a Discard Packet. For example, a method, including a Discard Sequence Number or a Discard Sequence Low and a Discard Sequence High or a Discard Sequence Contiguous Number or Discard Sequence Bitmap Information (Discard Sequence Bitmap Info.), may be configured as a format (Report Format) for transmitting a Discard Packet.

A configuration message for transmitting Discard Packet information may be forwarded as system information or may be transmitted through dedicated signaling.

Furthermore, the terminal 30 or the base station 31 may use dedicated signaling as a Discard Packet Reporting message. In an embodiment, the Discard Packet Reporting message may be an RRC message or a medium access control (MAC) message or a PDCP message, or an RLC message.

Figure 4:
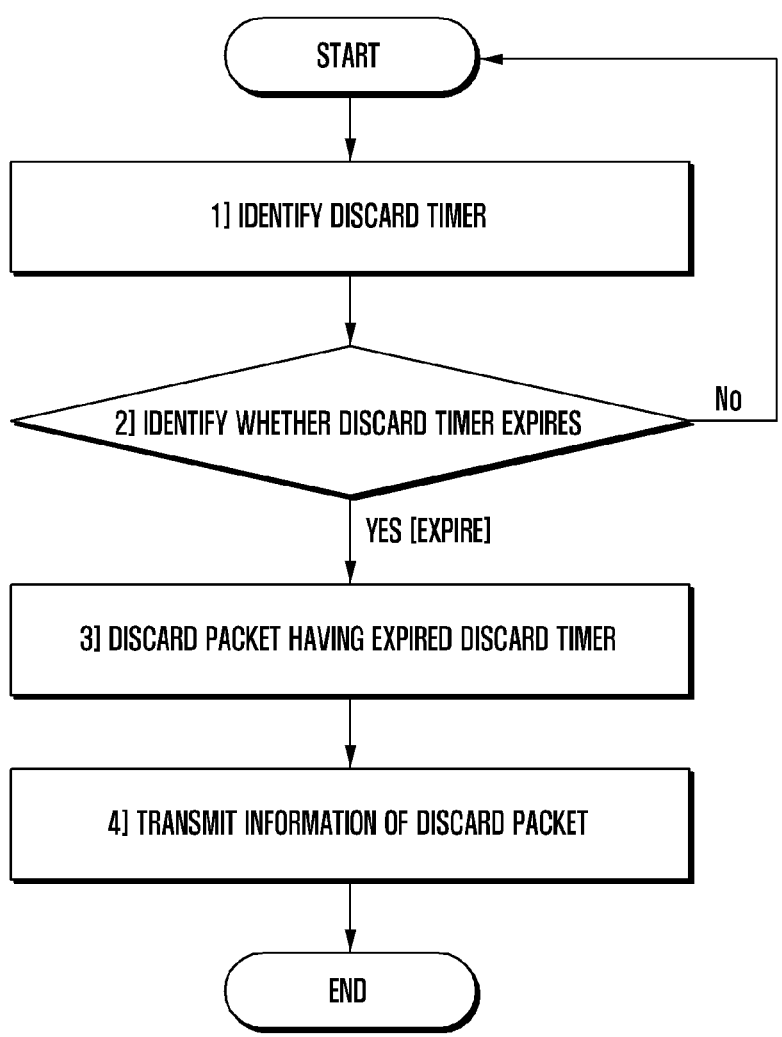
FIG. 4 is a diagram illustrating an operation when a single piece of Discard Packet information is transmitted.

FIG. 4 is a diagram illustrating an operation when a single piece of Discard Packet information is transmitted.

FIG. 4 is a diagram illustrating a method of transmitting Discard Packet information when a Discard Packet occurs in a method proposed in the disclosure.

In one embodiment of the disclosure, if Discard Packet transmission timing is periodic, the operation of FIG. 4 may be performed.

A transmitter (e.g., terminal or base station) identifies a Discard Timer from the timing when a packet was generated in a PDCP (1). After the transmitter identifies whether the Discard Timer has expired (2) based on the identifying of the Discard Timer, the transmitter discards a PDCP packet whose Discard Timer has expired (3) if the Discard Timer has expired. Furthermore, the transmitter transmits Discard PDCP packet information (e.g., including sequence information of a Discard Packet) to a receiver (e.g., terminal or base station).

Figure 5:
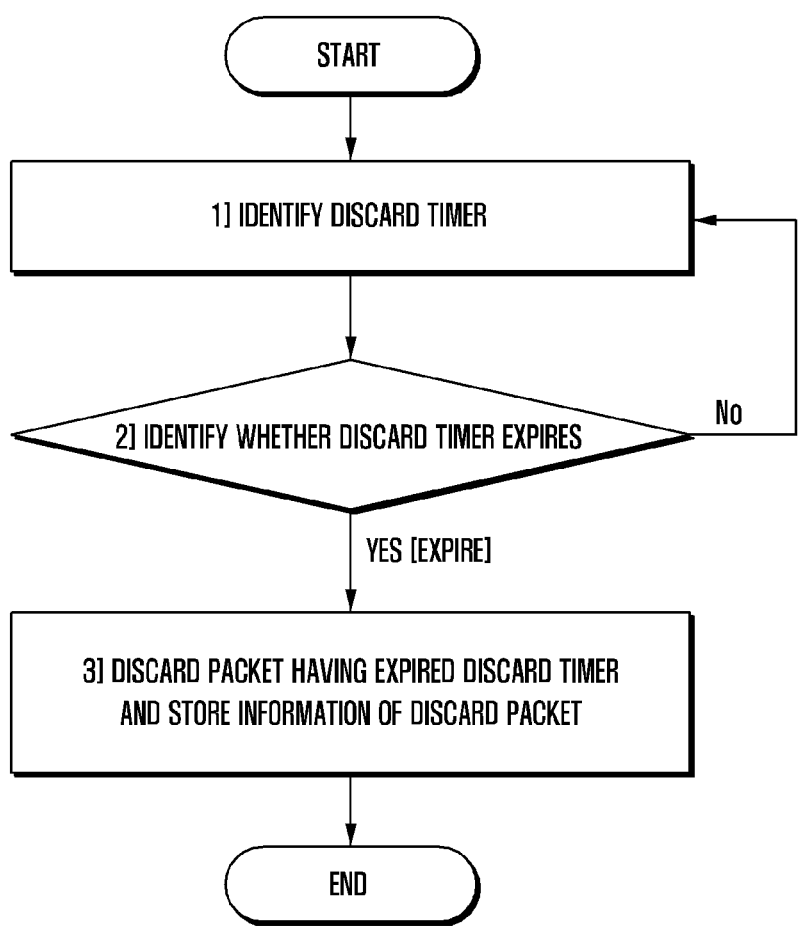
FIG. 5 is a diagram illustrating a method for a transmitter to store Discard Packet information when a Discard Timer expires.

FIG. 5 is a diagram illustrating a method for a transmitter to store Discard Packet information when a Discard Timer expires.

FIG. 5 is a diagram illustrating a method of storing Discard Packet information when a Discard Timer expires while the Discard Timer for each packet operates.

A transmitter identifies a Discard Timer from the timing when a packet was generated in a PDCP (1). The transmitter identifies whether the Discard Timer has expired (2) based on the identifying of the Discard Timer. The transmitter discards a PDCP packet whose Discard Timer has expired if the Discard Timer has expired, and stores Discard PDCP packet information (e.g., PDCP Sequence Number) (3).

Figure 6:
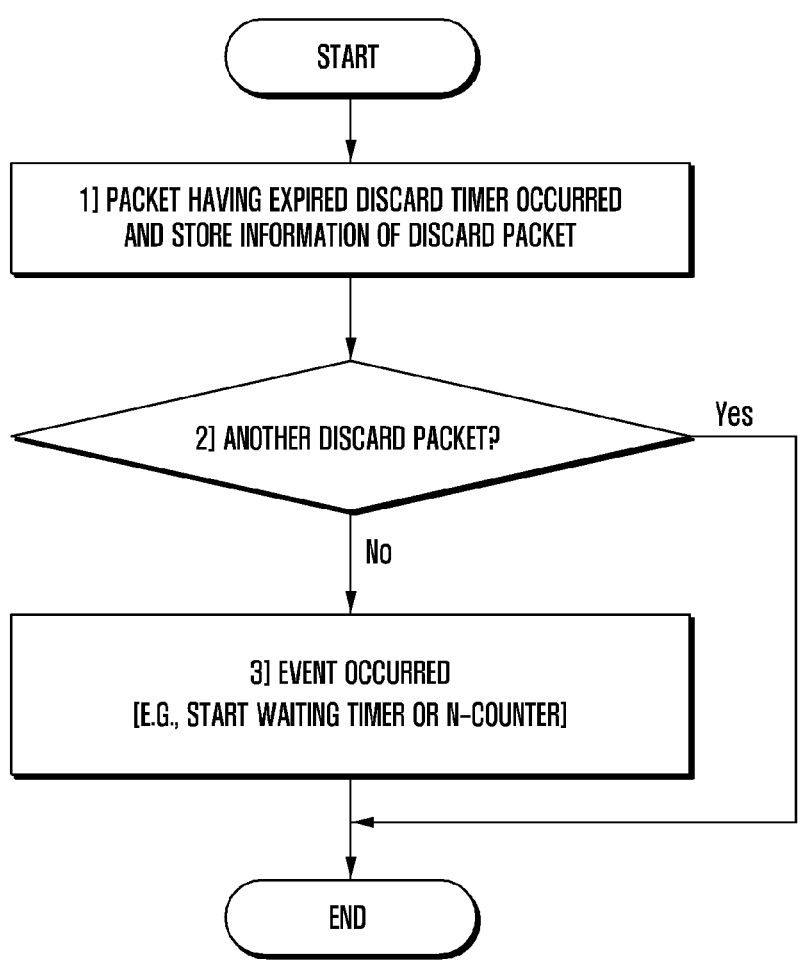
FIG. 6 is a diagram illustrating a starting method using an event when a plurality of pieces of Discard Packet information is transmitted.

FIG. 6 is a diagram illustrating a starting method using an event when a plurality of pieces of Discard Packet information is transmitted.

FIG. 6 is a diagram illustrating a method of starting an Event Timer or an N-Counter in order to transmit Discard Packet information occurred during a waiting time after waiting for a given time based on timing when a Discard Packet was generated in a method proposed in the disclosure.

In one embodiment of the disclosure, if a Discard Packet transmission timing type is an event or includes an event threshold time, the operation of FIG. 6 may be performed.

When a packet whose Discard Timer has expired is present, a transmitter discards a PDCP packet whose Discard Timer has expired and stores Discard PDCP packet information (e.g., PDCP Sequence Number) (1). After storing the Discard Packet information, the transmitter identifies whether previous Discard Packet information is present (2). If previously generated Discard Packet information is not present, the transmitter starts a waiting timer (3).

In another embodiment of the disclosure, if a Discard Packet transmission timing type is an event or includes an event N-Counter threshold, the operation of FIG. 6 may be performed.

When a packet whose Discard Timer has expired is present, a transmitter discards a PDCP packet whose Discard Timer has expired and stores Discard PDCP packet information (e.g., PDCP Sequence Number) (1). After storing the Discard Packet information, the transmitter identifies whether previous Discard Packet information is present (2). If previously generated Discard Packet information is not present, the transmitter starts an N-Counter (3).

Figure 7:
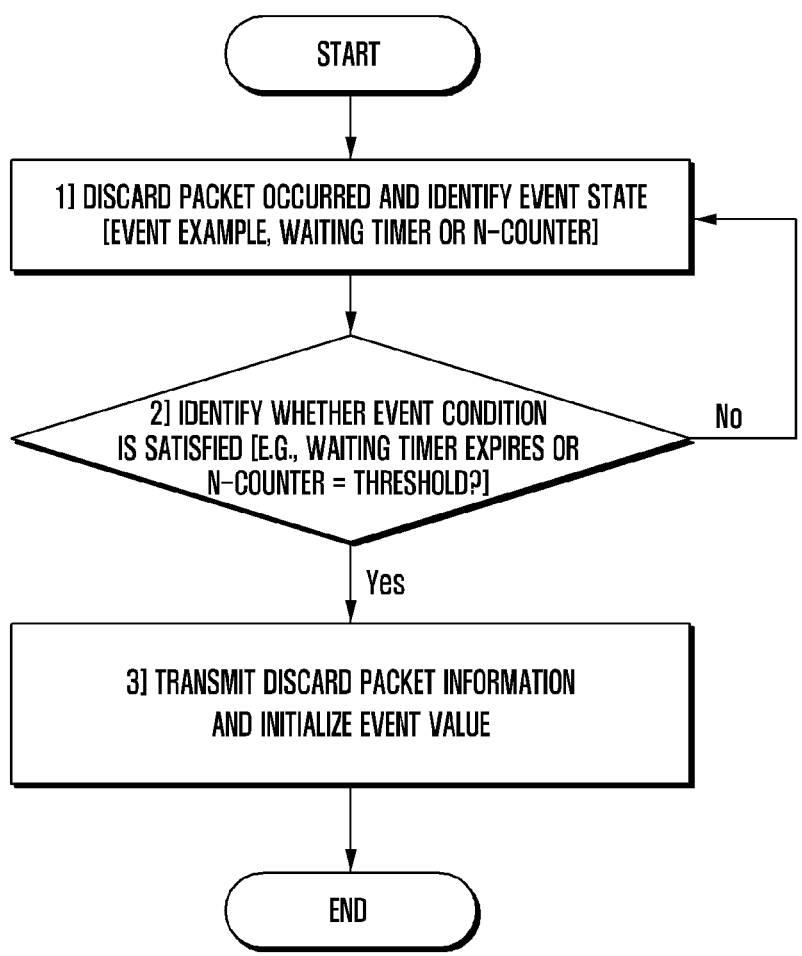
FIG. 7 is a diagram illustrating an operating method when an event expires if a plurality of pieces of Discard Packet information is transmitted.

FIG. 7 is a diagram illustrating an operating method when an event expires if a plurality of pieces of Discard Packet information is transmitted.

FIG. 7 is a diagram illustrating an operation when a Discard Packet occurs after an event was started in a method proposed in the disclosure.

In one embodiment of the disclosure, when a Discard Packet occurs after a waiting timer was started during an event, the operation of FIG. 7 may be performed.

A transmitter identifies whether a waiting timer operates when a Discard Packet occurs (1). When the waiting timer operates, the transmitter identifies whether the waiting timer has exceeded an event threshold time and has expired (2). If the waiting timer has not expired, the transmitter performs the operation of (1) again. Furthermore, if the waiting timer expired, the transmitter transmits Discard Packet information, stored during the operation of the waiting timer, to a receiver through the operation of FIG. 6. Furthermore, after transmitting the Discard Packet information to the receiver, the transmitter initializes the waiting timer (3).

In another embodiment of the disclosure, when a Discard Packet occurs after an N-Counter was started during an event, the operation of FIG. 7 may be performed.

When a Discard Packet occurs, a transmitter identifies whether an N-Counter operates (1). When the N-Counter operates, the transmitter identifies whether the N-Counter has exceeded an event N-Counter threshold and has expired (2). The transmitter compares the N-Counter with the event N-Counter threshold, and may perform the operation of (3) if a result of the comparison satisfies a condition.

For example, if the transmitter decreases the N-Counter, it may determine that a condition is satisfied when the N-Counter is smaller than or equal to the event N-Counter threshold. For another example, if the transmitter increases the N-Counter, it may determine that a condition is satisfied when the N-Counter is greater than or equal to the event N-Counter threshold. Furthermore, if the event of the N-Counter is not satisfied in the operation of (2), the transmitter changes a value of the N-Counter and performs the operation of (1) again. For example, the transmitter may decrease the N-Counter or increase the N-Counter. Furthermore, if the N-Counter event is satisfied, the transmitter transmits Discard Packet information, stored during the N-Counter during the operation of FIG. 5, to a receiver. Furthermore, after transmitting the Discard Packet information to the receiver, the transmitter initializes the N-Counter (3).

Figure 8:
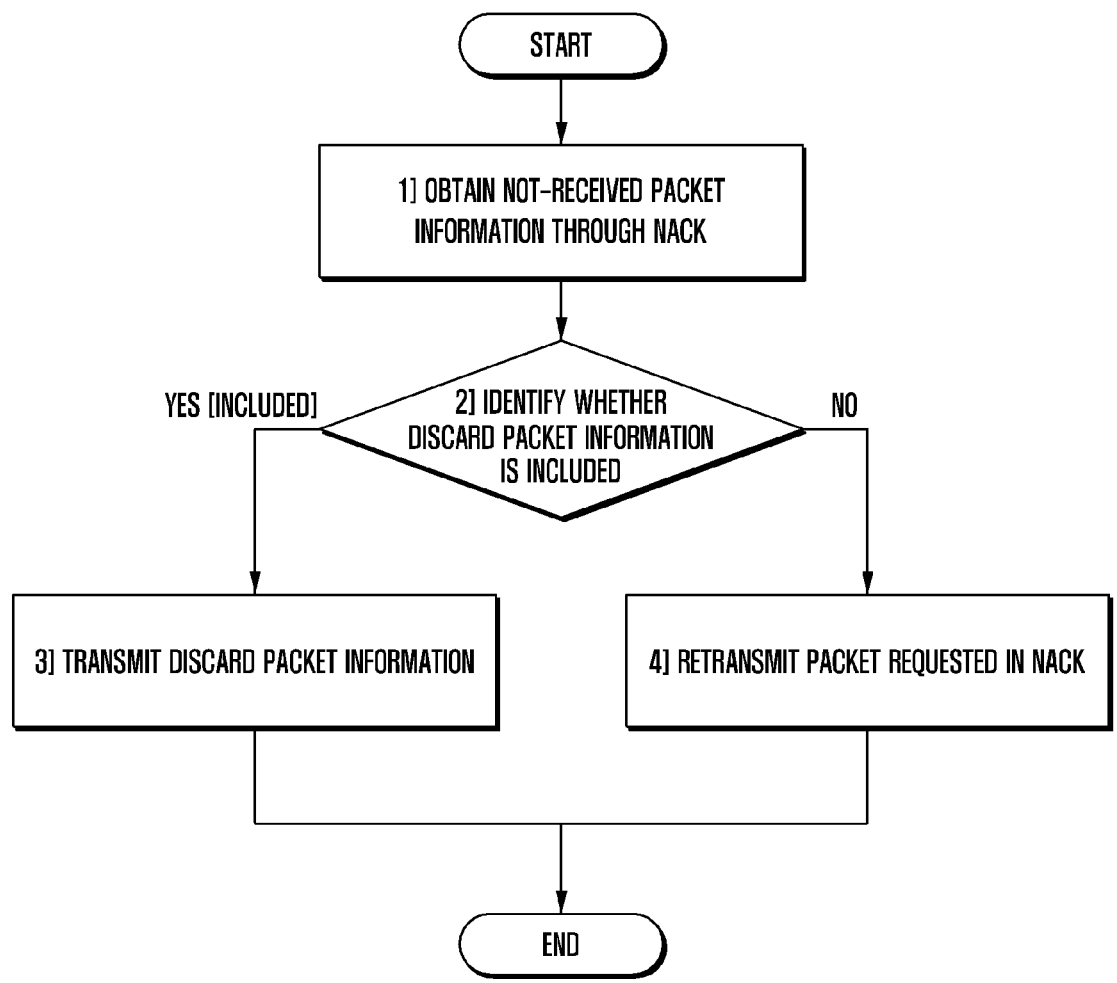
FIG. 8 is a diagram illustrating a method for a transmitter to transmit Discard Packet information when it receives NACK.

FIG. 8 is a diagram illustrating a method for a transmitter to transmit Discard Packet information when it receives NACK.

The transmitter may be aware of whether a packet of a receiver has been lost through the NACK message of the receiver (1). For example, the NACK message transmitted by the receiver includes the Sequence Number of the packet. When the transmitter receives NACK from the receiver, it identifies whether Discard Packet information corresponding to the Sequence Number included in the NACK message is present (2). The Discard Packet information may be stored by the method of FIG. 5. After the NACK is received, if Discard Packet information corresponding to the Sequence Number included in the NACK message is present, the transmitter transmits the corresponding Discard Packet information (e.g., Packet Sequence Number) to the receiver (3).

Furthermore, after the NACK is received, if Discard Packet information corresponding to the Sequence Number included in the NACK message is not present, the transmitter identifies that the packet of the Sequence Number included in the NACK message has not been discarded, and transmits the packet of the Sequence Number included in the NACK message to the receiver (4).

Figure 9:
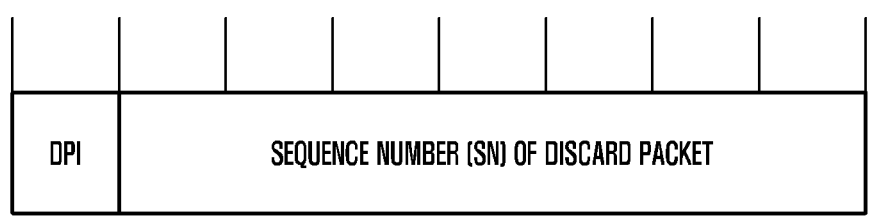
FIG. 9 is a diagram illustrating an example of a structure for transmitting Discard Packet information whenever a Discard Packet occurs.

FIG. 9 is a diagram illustrating an example of a structure for transmitting Discard Packet information whenever a Discard Packet occurs.

FIG. 9 is a diagram illustrating a packet structure for transmitting single piece of information of a Discard Packet to a receiver at Discard Packet occurrence timing when the Discard Packet occurs.

For example, if Discard Packet information transmission timing (report type) is periodic, the present embodiment may be applied to a case where a transmitter immediately transmits Discard Packet information to a receiver at the timing when a Discard Packet occurs.

The Discard Packet information of FIG. 9 may include discard packet indication (DPI), that is, an indicator indicative of Discard Packet information, and Discard Packet information (e.g., Discard packet sequence number).

Furthermore, the transmitter may transmit a Discard Packet Reporting message, including a Discard Packet format, through dedicated signaling. For example, the dedicated signaling message may be an RRC message or a MAC message or a PDCP message, or an RLC Message.

FIG. 10 is a diagram illustrating an example of a structure for transmitting Discard Packet information when a plurality of Discard Packets occurs.

FIG. 10 is a diagram illustrating a packet structure for transmitting a plurality of pieces of information of a Discard Packet to a receiver at Discard Packet occurrence timing when the Discard Packet occurs.

For example, if Discard Packet information transmission timing (report type) is an event type, the present embodiment may be applied to a case where a transmitter transmits pieces of Discard Packet information from the timing when a Discard Packet occurred to event expiration timing.

The Discard Packet information of FIG. 10 may include discard packet indication (DPI), that is, an indicator indicative of Discard Packet information, and a plurality of pieces of Discard Packet information (e.g., Discard packet sequence numbers). Furthermore, the transmitter may provide notification that a Discard packet sequence is present through an extension bit E.

Furthermore, the transmitter may transmit a Discard Packet Reporting message, including a Discard Packet format, through dedicated signaling. For example, the dedicated signaling message may be an RRC message or a MAC message or a PDCP message or an RLC message.

Figure 11:
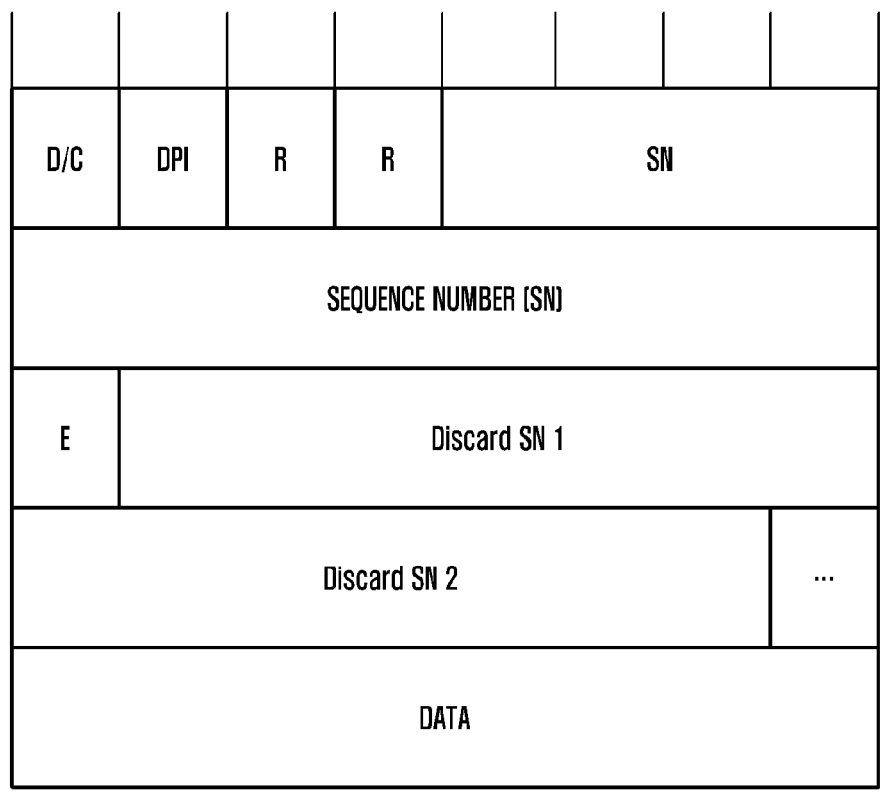
FIG. 11 is an exemplary diagram showing a method of including and transmitting Discard Packet information when a PDCP data transmission packet is used.

FIG. 11 is an exemplary diagram showing a method of including and transmitting Discard Packet information when a PDCP data transmission packet is used.

FIG. 11 is a diagram illustrating a structure for transmitting a single piece or a plurality of pieces of Discard Packet information using a PDCP data transmission packet.

In FIG. 11, the information that may be included may include an indicator (D/C) providing notification of whether a packet is a data packet or a control packet. Furthermore, in FIG. 11, the information that may be included may include discard packet indication (DPI), that is, an indicator providing notification that Discard Packet information has been included, and a plurality of pieces of Discard Packet information (e.g., Discard packet sequence numbers). Furthermore, the transmitter may provide notification that a Discard packet sequence is present through an expansion bit (E).

In one embodiment, in a PDCP data packet structure used in the LTE system, whether a corresponding PDCP data packet is a packet including a Discard Sequence Number may be notified by including DPI in a reserved bit. The Discard Sequence Number may be included between the sequence number of the existing PDCP data packet and Data. Furthermore, the transmitter may provide notification that one or a plurality of Discard packet sequences is present through an expansion bit (E).

Figure 12:
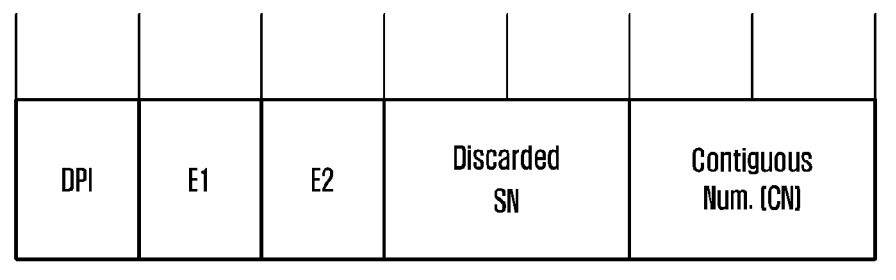

FIG. 12 is an exemplary diagram showing a method of using a contiguous number in order to transmit Discard Packet information when a plurality of Discard Packets occurs.

FIG. 12 is a diagram illustrating a packet structure for transmitting a plurality of pieces of information of a Discard Packet to a receiver at Discard Packet occurrence timing when the Discard Packet occurs.

For example, if Discard Packet information transmission timing (report type) is an event type, the present embodiment may be applied to a case where a transmitter transmits Discard Packet information from the timing when a Discard Packet occurs to event expiration timing.

The Discard Packet information of FIG. 12 may include discard packet indication (DPI), an indicator indicative of Discard Packet information, and the start timing sequence number of a Discard Packet, and may provide notification that how many Discard Packets have occurred through a contiguous number.

For example, if a Discard Sequence Number is 3 and a Contiguous Number is 2, a receiver may be aware that Discard Sequence Numbers 3, 4, and 5 have been discarded. Furthermore, a transmitter may provide notification that the start timing sequence of a Discard Packet is present through an expansion bit (E1), and may provide notification that the contiguous number (CN) of a Discard Packet is present through an expansion bit (E2).

Furthermore, the transmitter may transmit a Discard Packet Reporting message, including a Discard Packet format, through dedicated signaling. For example, the dedicated signaling message may be an RRC message or a MAC message or a PDCP message, or an RLC Message.

FIG. 13 is an exemplary diagram showing a method of using a Discarded Sequence Number Low and a Discarded Sequence Number High in order to transmit Discard Packet information when a plurality of Discard Packets occurs.

FIG. 13 is a diagram illustrating a packet structure for transmitting a plurality of pieces of information of a Discard Packet to a receiver at Discard Packet occurrence timing when the Discard Packet occurs.

For example, if Discard Packet information transmission timing (report type) is an event type, the present embodiment may be applied to a case where a transmitter transmits Discard Packet information from the timing when a Discard Packet occurs to event expiration timing.

The Discard Packet information of FIG. 13 may include discard packet indication (DPI), that is, an indicator indicative of Discard Packet information, and a Discard SN Low, that is, the start timing sequence number of a discarded packet, and may provide notification of the sequence of Discard Packet end timing through the Discard SN High of a Discard sequence.

For example, if a Discard SN Low is 3 and a Discard SN High is 5, a receiver may be aware that Discard Sequence Numbers 3, 4, and 5 have been discarded. Furthermore, a transmitter may provide notification that a Discard SN Low, that is, the start timing of a Discard Packet, is present through an extension bit (E1), and may provide notification that a Discard SN High, that is, the sequence number of Discard Packet end timing, through an expansion bit (E2).

Furthermore, the transmitter may transmit a Discard Packet Reporting message, including a Discard Packet format, through dedicated signaling. For example, the dedicated signaling message may be an RRC message or a MAC message or a PDCP message, or an RLC Message.

Figure 14:
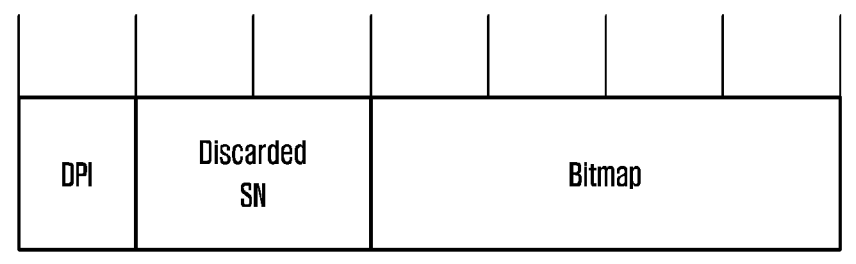

FIG. 14 is an exemplary diagram showing a method of using a bitmap in order to transmit Discard Packet information when a plurality of Discard Packets occurs.

FIG. 14 is a diagram illustrating a packet structure for transmitting a plurality of pieces of information of a Discard Packet to a receiver at Discard Packet occurrence timing when the Discard Packet occurs.

For example, if Discard Packet information transmission timing (report type) is an event type, the present embodiment may be applied to a case where a transmitter transmits Discard Packet information from the timing when a Discard Packet occurs to event expiration timing.

The Discard Packet information of FIG. 14 may include discard packet indication (DPI), that is, an indicator indicative of Discard Packet information, and a discarded SN, that is, the start timing sequence number of a Discard Packet. Furthermore, the transmitter may provide notification that which packet has been discarded from sequence number start timing by providing bitmap information. For example, if a discarded SN is 3 and a bitmap is 2 bits and this is represented as 1110, a receiver may be aware that Discard packet sequences are 3, 4, and 5.

Furthermore, the transmitter may transmit a Discard Packet Reporting message, including a Discard Packet format, through dedicated signaling. For example, the dedicated signaling message may be an RRC message or a MAC message or a PDCP message, or an RLC Message.

Figure 15:
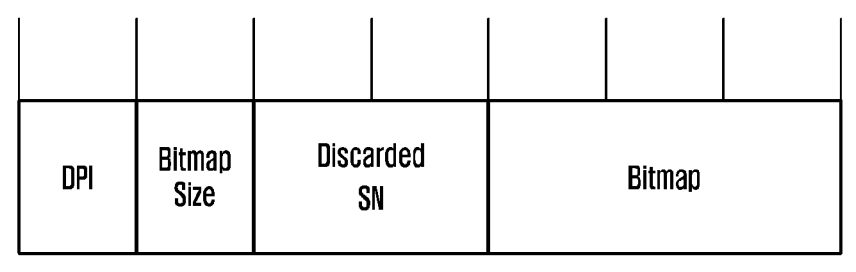

FIG. 15 is a diagram illustrating an example in which a bitmap size is notified in a method using a bitmap in order to transmit Discard Packet information when a plurality of Discard Packets occurs.

FIG. 15 is a diagram illustrating a packet structure for transmitting a plurality of pieces of information of a Discard Packet to a receiver at Discard Packet occurrence timing when the Discard Packet occurs.

For example, if Discard Packet information transmission timing (report type) is an event type, the present embodiment may be applied to a case where a transmitter transmits Discard Packet information from the timing when a Discard Packet occurs to event expiration timing.

The Discard Packet information of FIG. 15 may include discard packet indication (DPI), that is, an indicator indicative of Discard Packet information, and a discarded SN, that is, the start timing sequence number of a Discard Packet. Furthermore, the transmitter may provide notification that which packet has been discarded from sequence number start timing by providing bitmap information. For example, if a discarded SN is 3 and a bitmap is 2 bits and this is represented as 1110, a receiver may be aware that Discard packet sequences are 3, 4, and 5. Furthermore, a bitmap size may be notified through a bitmap size indicator.

Furthermore, the transmitter may transmit a Discard Packet Reporting message, including a Discard Packet format, through dedicated signaling. For example, the dedicated signaling message may be an RRC message or a MAC message or a PDCP message, or an RLC Message.

Second Embodiment

Figure 16:
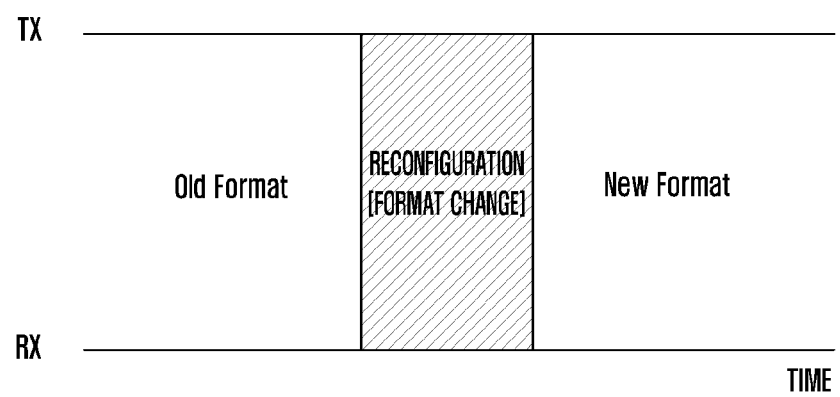
FIG. 16 is a diagram illustrating a scenario in which a header format is changed, which is taken into consideration in the disclosure.

FIG. 16 is a diagram illustrating a scenario in which a header format is changed, which is taken into consideration in the disclosure. In a conventional technology, a transmitter TX and a receiver RX perform communication using the header of an old format and perform communication using a new format after experiencing a reconfiguration or configuration procedure. The reconfiguration or configuration may be changed by an RRC message of a 3GPP network or a pre-configured condition.

Furthermore, an environment in which a scenario, such as that of FIG. 16, occurs may include several causes, such as handover between heterogeneous networks (e.g., moves from a 5G communication network to a 4G communication network) or handover to another base station having a different spec. version in the same network (e.g., change from a 3GPP Release 14 base station to a Release 13 base station), or a determination made by a base station within the same base station. When the format of a header is changed, the size of a sequence number (SN) included in the header may be changed. For example, the format of a header may be changed so that communication is performed using a header having an SN size of 12 bits and then performed using a header having an SN size of 10 bits.

Figure 17:
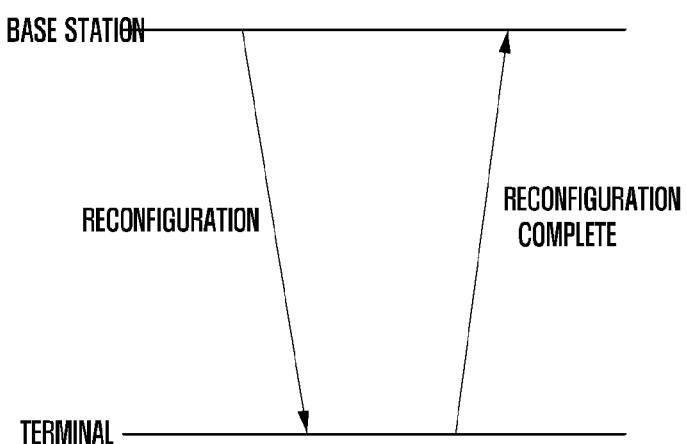
FIG. 17 is a diagram illustrating an embodiment of a message in which a header format is changed.

FIG. 17 shows an embodiment of a message whose header format is changed. In order to change a header format, a reconfiguration message of a 3GPP network may be used. The message may include the type of changed header and information regarding a change into which system. If a reconfiguration is a message regarding handover between homogeneous networks or heterogeneous networks, the message may include information by which handover is performed. Furthermore, if a reconfiguration message has been well received by a terminal, the terminal may transmit a Reconfiguration Complete message to a base station after a reconfiguration. If the reconfiguration message is a reconfiguration regarding handover, the terminal may transmit a Reconfiguration Complete message to the base station after handover.

Figure 18:
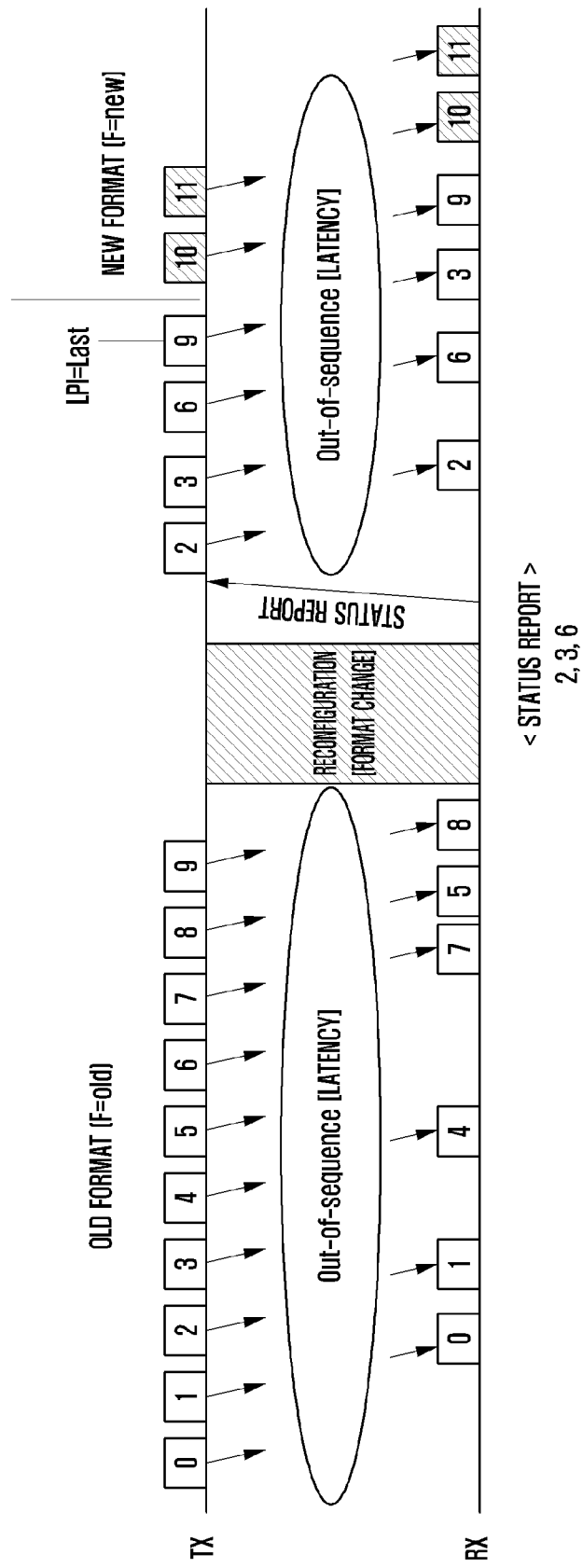
FIG. 18 is a diagram illustrating an embodiment of a retransmission method when a format is changed.

FIG. 18 shows an embodiment of a retransmission method when a format is changed. The embodiment of FIG. 18 shows a method of performing the remaining transmission of a message, transmitted using an old format, using the old format even after a reconfiguration message and performing data transmission using a new format after data produced according to the old format is fully transmitted.

In the embodiment of FIG. 18, it is assumed that when communication is performed using the old format, a transmitter TX transmits packets from an SN 0 to an SN 9. In this case, a receiver RX may receive out-of-sequence packets having a sequence different from that of the packets transmitted by the transmitter TX due to transmission latency in a lower layer or a radio link. In the embodiment of FIG. 18, it is assumed that packets are received in order of 0, 1, 4, 7, 5, 8.

Thereafter, a reconfiguration is performed. In this case, a status report message for old format data is transmitted to the transmitter. The receiver reports, to the transmitter, that it has now received the packet, that is, SN=8, because the most recent SN received by the receiver is 8 and has not received packets corresponding to SNs. 2, 3, and 6. In this case, an old SN or a PDCP count value may be used as the SN used for the status report message, or the SN used for the status report message may be changed into a new SN and used.

In the embodiment of FIG. 18, subsequently, the transmitter transmits the packets 2, 3, 6, and 9 on which transmission has been performed to the receiver. In this case, the data of the old format is used. Instead, the transmitter specifies the old packet in the format (F) field of a header so that the receiver can process the data using the old format. The format field may specify whether a packet is an old packet or a new packet. However, in another embodiment, the format field may be indicated in a toggle manner depending on the format. For example, a format field value in the packet of an old format and a format field value in the format of a new format may be distinguished by setting the format field value in the packet of the old format to 0 and the format field value in the format of the new format to 1.

Furthermore, the transmitter indicates the last packet in the last packet indicator (LPI) field of the last packet transmitted using the old format so that another subsequent packet can be processed using the new format. In this case, the receiver may combine a SN, a format field, and an LPI field, and may perform communication not having a loss by performing reordering. In this case, the SN of the new format may remain intact, may be changed or may be started again.

FIG. 19 show an embodiment of a header format when the format of a header is changed in the embodiment of FIG. 18. The header format includes a format (F) field and the last packet indicator (LPI) necessary for the disclosure based on the PDCP layer format of a 3GPP communication system. D/C is a data/control information field, R is a reserved field, SN is a sequence number field, and Data is a data field. The embodiment of FIG. 19 shows an embodiment the SN field is reduced when a header format is changed. However, the size of the SN field may be increased or may be maintained identically.

Figure 20:
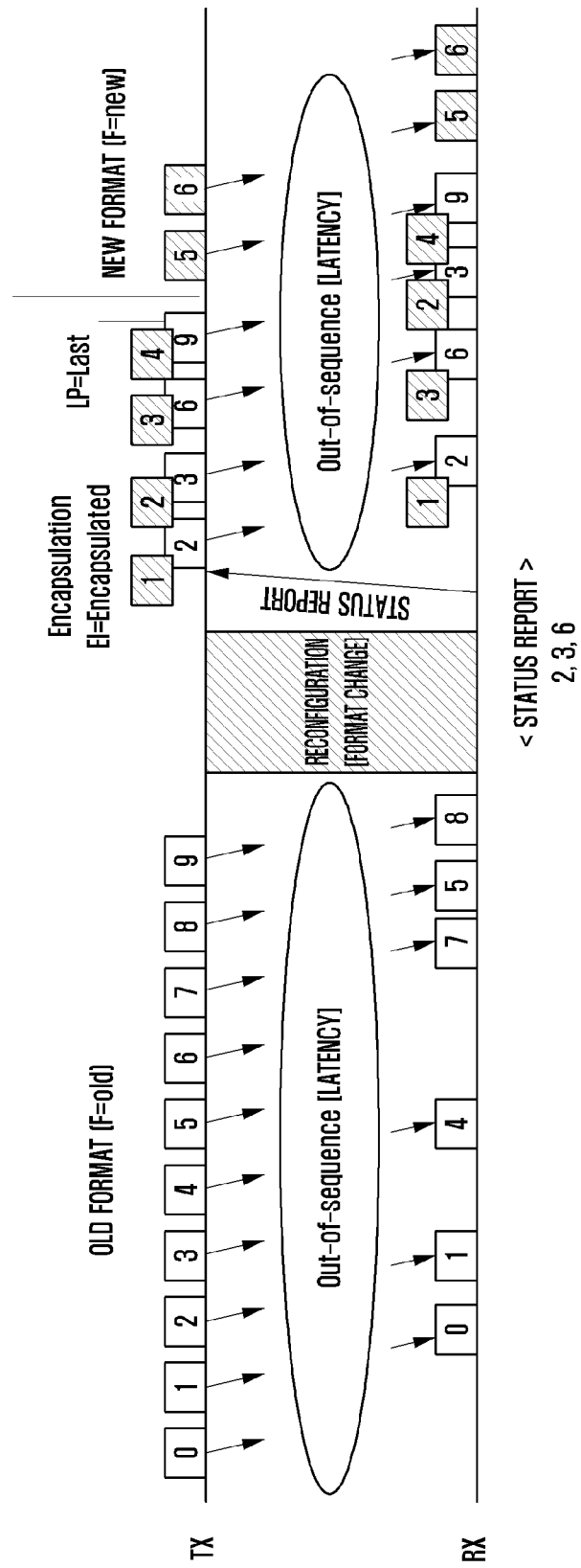
FIG. 20 is a diagram illustrating another embodiment of a retransmission method when a format is changed.

FIG. 20 shows another embodiment of a retransmission method when a format is changed. The embodiment of FIG. 20 shows a method of performing data transmission using a new format after a reconfiguration message, but performing data transmission in such a way as to include an old format packet in the new format with respect to the remaining transmission of a message transmitted using the old format.

In the embodiment of FIG. 20, it is assumed that when performing communication using an old format, a transmitter TX transmits packets from an SN 0 to an SN 9. In this case, a receiver RX may receive out-of-sequence packets having a sequence different from that of the transmitted packets due to transmission latency in a lower layer or a radio link. In the embodiment of FIG. 20, it is assumed that the packets are received in order of 0, 1, 4, 7, 5, 8.

Thereafter, a reconfiguration is performed. In this case, the receiver transmits a status report message for old format data to the transmitter. The receiver reports, to the transmitter, that it has now received up to the packet SN=8 because the most recent SN received by the receiver is 8 and has not received packets corresponding to SNs 2, 3, and 6. In this case, an old sequence number or a PDCP count value may be used as the sequence number used for the status report message, or the sequence number used for the status report message may be changed into a new sequence number and used.

After receiving the status report message, the transmitter performs the retransmission of the packets corresponding to SN=2, 3, 6, and 9. However, it is difficult to transmit the packets 2, 3, 6, and 9 without any change because the header format has been changed. In the embodiment of FIG. 20, in this case, a new format and a new sequence number (SN) are used, and instead, an old data field is encapsulated and transmitted in the data field. Accordingly, the packets corresponding to SN=2, 3, 6, 9 are encapsulated with headers corresponding to 1, 2, 3, and 4, that is, new SNs, and are transmitted. In this case, the encapsulated packet may include a field indicating that the packet has been encapsulated in the encapsulation indicator (EI) field of a corresponding header.

If the EI field is a field indicating that a corresponding packet has been encapsulated, the receiver needs to process the header of an old format after removing the header of a new format. If a device processing an old format and a device processing a new format are separated in the receiver, the device processing the old format may be requested to process a corresponding packet. If this is uplink transmission, the device processing an old format and the device processing a new format may be different base station entities. A packet corresponding to the old SN=9 (i.e., new SN=4) is the last packet transmitted using the old format. Accordingly, the last packet is indicated in the past packet indicator field of the packet so that other subsequent packets can be processed using a new format. Packets corresponding to subsequently transmitted SN=5, 6 may be transmitted using the new format itself. In this case, the receiver can perform communication not having a loss by performing reordering.

Figure 21:
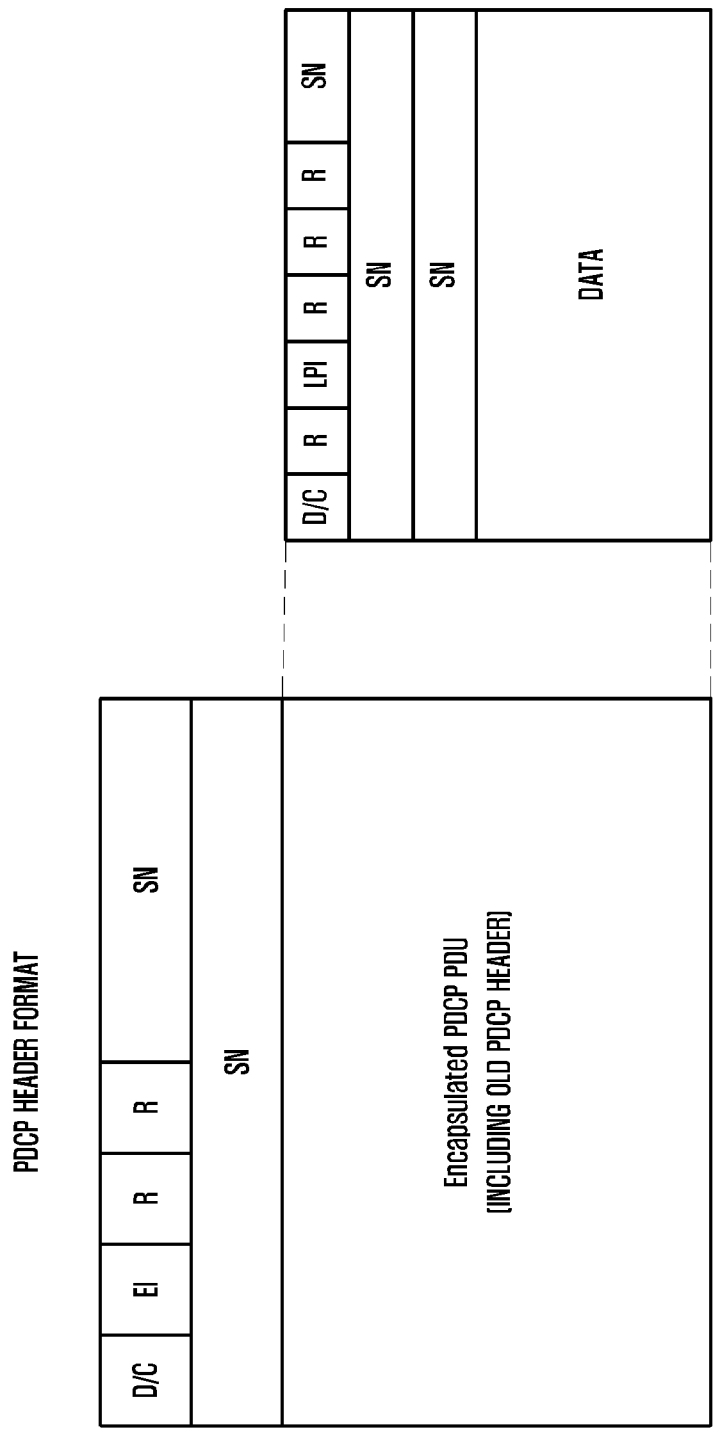
FIG. 21 is a diagram illustrating an embodiment of a header format when the format of a header is changed in the embodiment of FIG. 20.

FIG. 21 shows an embodiment of a header format when the format of a header is changed in the embodiment of FIG. 20. Referring to FIG. 21, the header format includes an encapsulation indicator (EI) field and the last packet indicator (LPI) necessary for the disclosure based on the PDCP layer format of the 3GPP communication system. D/C is a data/control information field, R is a reserved field, SN is a sequence number field, and Data is a data field. If it is indicated that a packet has been encapsulated in the EI field, the data field includes the header of an old format and Data. The embodiment of FIG. 21 shows an embodiment in which when the header format is changed, the SN field is reduced. However, the size of the SN field may be increased or identically maintained.

Figure 22:
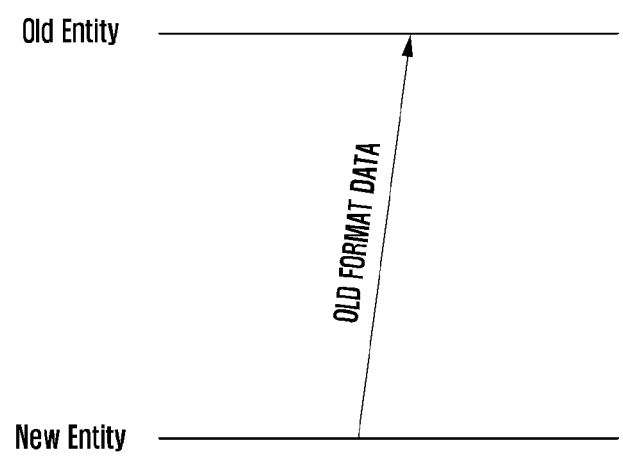
FIG. 22 is a diagram illustrating a procedure of requesting data processing from an old entity capable of processing an old format by transmitting old format data when the data processing of the old format is necessary after a reconfiguration.

FIG. 22 shows a procedure of requesting data processing from an old entity capable of processing an old format by transmitting old format data when the data processing of the old format is necessary after a reconfiguration. After processing the data, the old entity may transmit the data to a new entity or may autonomously perform processing. If this is uplink transmission, a device processing the old format and a device processing the new format may be different base station entities.

Figure 23:
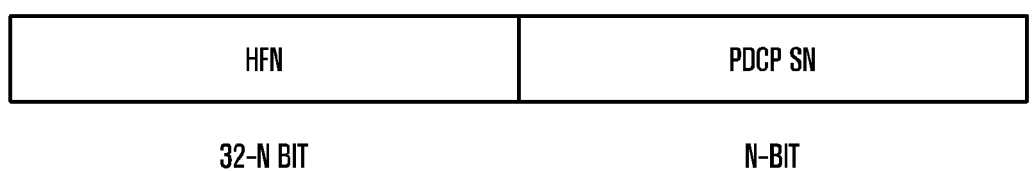
FIG. 23 is a diagram illustrating a PDCP COUNT structure in a 3GPP communication system.

FIG. 23 shows a PDCP COUNT structure in the 3GPP communication system. The COUNT has a fixed length and is divided into a hyper frame number (HFN) field and an SN field. The size of the SN field is variable, but the length of the COUNT is fixed. In the 3GPP communication system, the COUNT has a COUNT length of 32 bits. Accordingly, if the length of the SN field is N bits, the HFN has the length of 32-N bits. The disclosure proposes a method of performing reordering using a COUNT value when a header format is changed in the disclosure including FIG. 16. The COUNT value is one of values of the PDCP layer in the 3GPP communication system.

An arithmetic relation between the HFN, the SN value and the COUNT value is as follows.

$$COUNT = HFN*(2N) + SN \qquad \text{Equation 1}$$

In this case, N is the length (N bits) of the SN.

The relation in which the N-bit PDCP SN and the HFN are derived from the COUNT value is as follows.

$$HFN = \text{floor}\left(\frac{COUNT}{2^N}\right) \qquad \text{Equation 2}$$

$$SN = \text{mod}(COUNT, 2N) \qquad \text{Equation 3}$$

Figure 24:
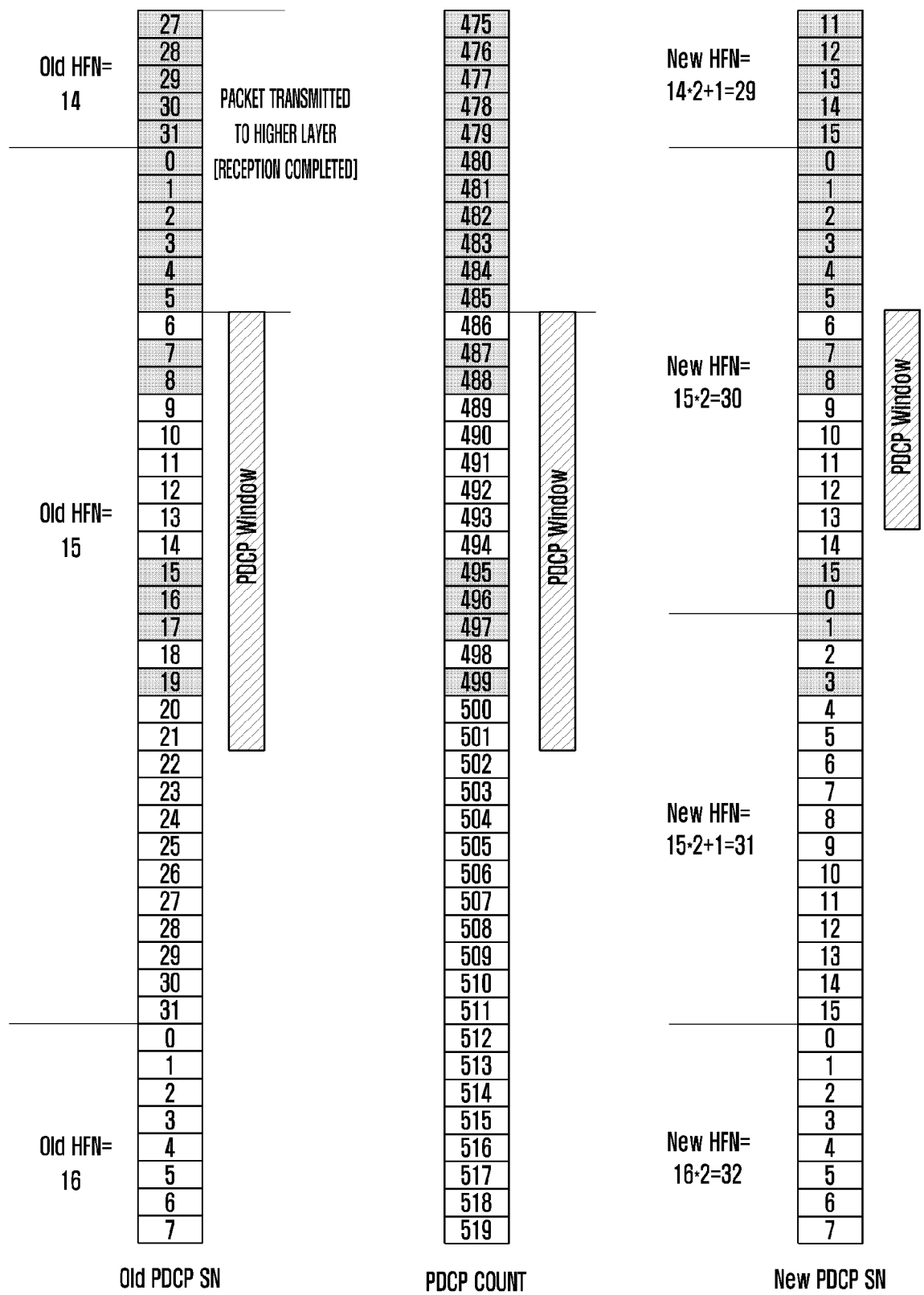
FIG. 24 is a diagram illustrating an embodiment of a reordering method using COUNT when a reconfiguration is performed.
Figure 25:
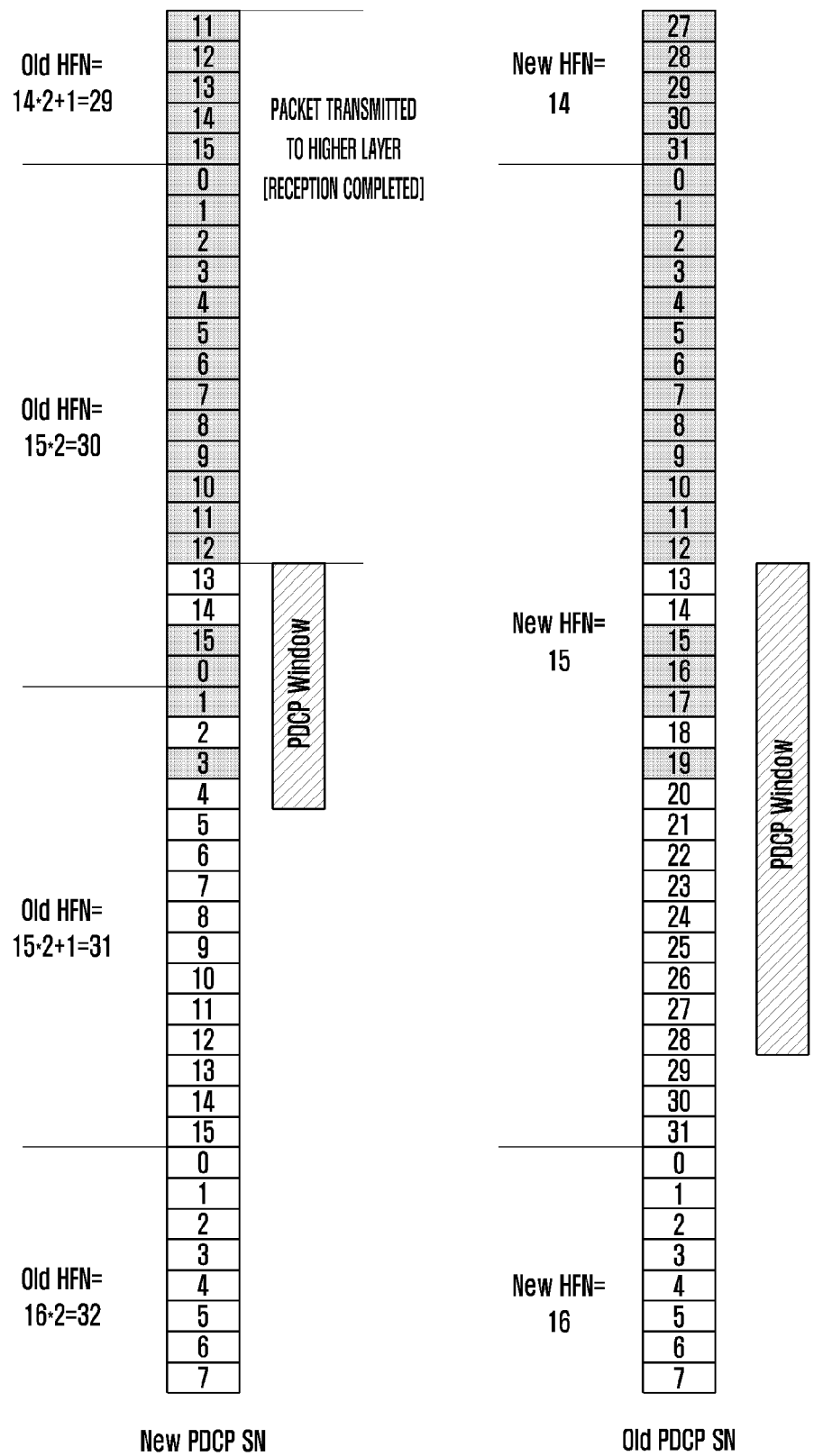
FIG. 25 is a diagram illustrating another embodiment in which an HFN value and COUNT are changed when a reconfiguration is performed.

The correspondence relation between Equations 1-3 is used in the embodiments of FIGS. 24 and 25.

FIG. 24 shows an embodiment of a reordering method using COUNT when a reconfiguration is performed. In the embodiment of FIG. 24, it is assumed that an old format has an SN size (0-31 SNs) of 5 bits, and a new format has an SN size (0-15) of 4 bits. In this case, a PDCP Window for reordering is assumed to be half the entire SN that is usually possible.

In the embodiment of FIG. 24, it is assumed that a reconfiguration occurs in HFN=15 and transmission is performed using the new format. In this case, a format transmitted after the reconfiguration is assumed to be transmitted as the new format. Instead, in this case, a transmitter and a receiver transmit a packet by changing it into an HFN and SN having the same COUNT. In the embodiment of FIG. 24, a situation in which packets up to SN=19 other than SN=6, 9, 10, 11, 12, 13, 14, 18 packets are not received in Old HFN=15.

After the reconfiguration, after a status report message is received, the transmitter converts a corresponding packet into SN=6, 9, 10, 11, 12, 13, 14 of a New HFN=30 and values of a New HFN=31, SN=2 by converting the packet into a COUNT value (486, 489, 490, 491, 492, 493, 494, 498) corresponding to an old HFN and SN and then converting the count value into the HFN and SN of the new format, and then transmits the packet to the receiver. The receiver may perform reordering by converting COUNT into an old HFN, the SN value with respect to a packet received prior to the reconfiguration and converting COUNT into a new HFN, SN value with respect to a packet received after the reconfiguration.

FIG. 25 shows another embodiment in which an HFN value and COUNT are changed when a reconfiguration is performed. In the embodiment of FIG. 25, an SN size (0-15 SN) of 4 bits is assumed in an old format, and an SN size (0-31) of 5 bits is assumed in a new format. In this case, a PDCP Window for reordering is assumed to be half the entire SN that is usually possible.

In the embodiment of FIG. 25, it is assumed that a reconfiguration occurs in HFN=30 and transmission is performed using a new format. In this case, a format transmitted after the reconfiguration is assumed to be transmitted as the new format. In this case, since the size of an SN is reduced, the HFN is increased that much. This relation may be changed so that COUNT is reserved using the HFN in which the COUNTs and SN conversion relation of Equations 1-3 are reserved.

Referring to the embodiment of FIG. 25, at the reconfiguration timing, the SN=13, 14 packet of the HFN=30 and the SN=2 packet of an HFN=31 have not been received by a receiver. The packets may be changed into HFN=15, SN=13, 14, 18 through a conversion process after the reconfiguration, retransmission may be performed, and a reordering process may be performed.

Figure 26:
FIG. 26 is a diagram showing an example in which a header format is changed according to an embodiment of the disclosure.
Figure 27:
FIG. 27 is a diagram showing an example in which a header format is changed according to an embodiment of the disclosure.

FIGS. 26 and 27 show other scenarios in which a header format is changed, which are taken into consideration in the disclosure. In a conventional technology, a TX and an RX perform communication using the header of an old format, perform communication using a temporary format after experiencing a reconfiguration or configuration procedure, and perform communication using a new format after given timing. The reconfiguration or configuration may be changed by an RRC message of a 3GPP network or by a pre-configured condition. Furthermore, an environment in which a reconfiguration or configuration scenario, such as those of FIGS. 26 and 27, occurs may include several causes, such as handover between heterogeneous networks (e.g., a movement from a 5G communication network to a 4G communication network) or handover to a base station having a different spec. version in the same network (e.g., a change from a 3GPP Release 14 base station to a Release 13 base station), or a determination made by a base station within the same base station.

When the format of a header is changed, the size of a sequence number (SN) within the header may be changed. The embodiment of FIG. 26 shows that the size of an SN is relatively long, but the size of the SN is relatively short after a temporary SN is used. For example, a change may be made so that communication is performed using a header having an SN size of 12 bits and communication is performed using a header having an SN size of 10 bits.

The embodiment of FIG. 27 shows that the size of an SN is relatively short, but the size of the SN is relatively long after a temporary SN is used. For example, a change may be made so that communication is performed using a header having an SN size of 12 bits and communication is performed using a header having an SN size of 18 bits.

The temporary SN of FIGS. 26 and 27 may be used to forward a packet not having a loss right after a reconfiguration or configuration, but may be a PDCP COUNT value or the SN of another agreed common size. In the disclosure, a change in the format of a header and a change in the length of an SN are interchangeably described, but there is no basic difference between them in an embodiment of the disclosure. Information on given timing at which communication is performed using the temporary format and communication is performed using the new format or condition information in which given timing is determined may be indicated through the reconfiguration or configuration.

Figure 28:
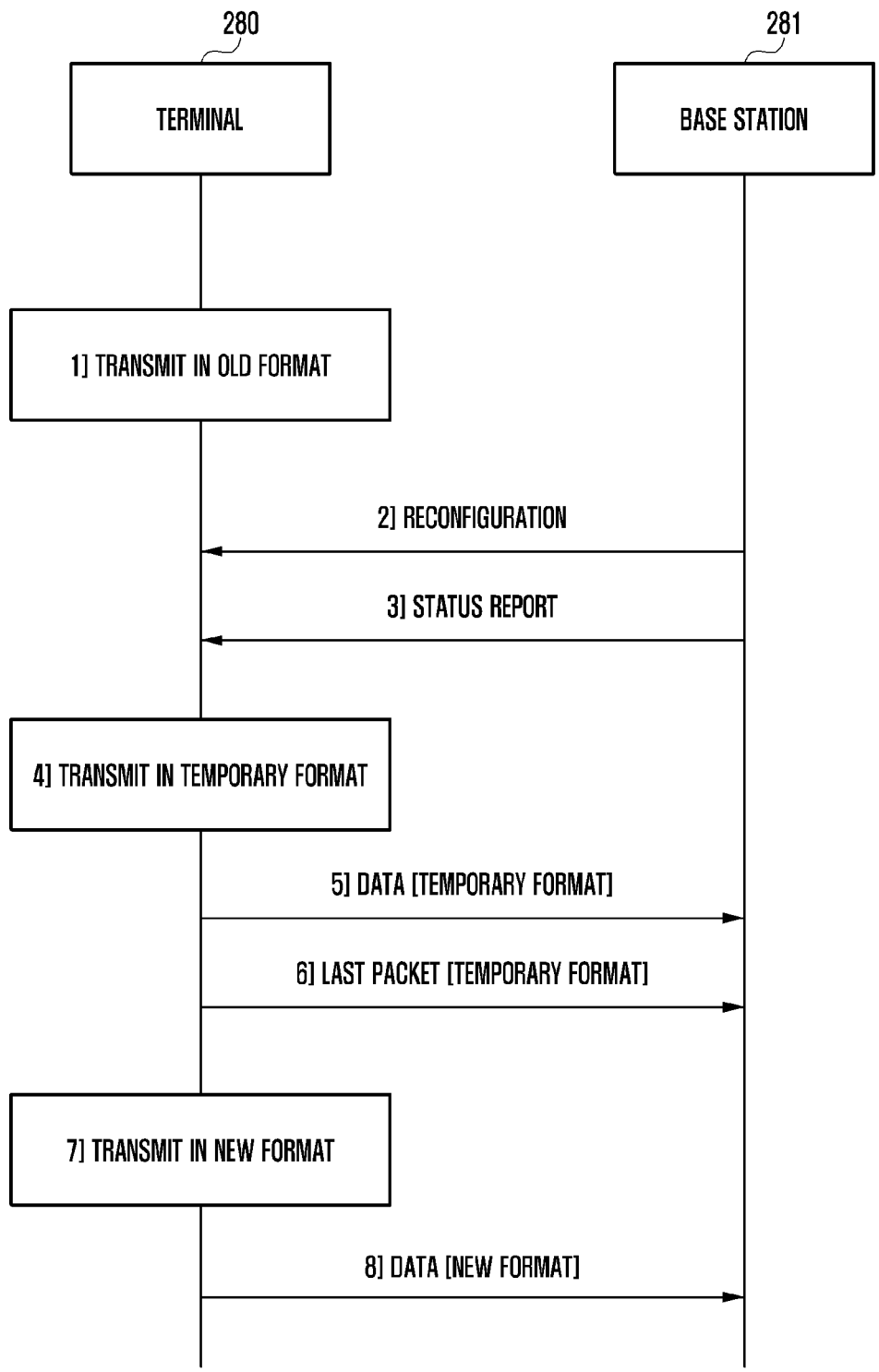
FIG. 28 is a diagram illustrating a procedure of changing a header format with respect to uplink data according to an embodiment of the disclosure.

FIG. 28 shows a procedure of changing a header format with respect to uplink data. In an embodiment of FIG. 28, an old format may include an SN size having a relatively long length, and a new format may include an SN size having a relatively short length. Alternatively, the opposite case is also possible. Furthermore, a temporary format may be a PDCP COUNT value or the SN of another agreed common size.

At the start timing of the embodiment of FIG. 28, a terminal 280 transmits a packet to a base station 281 using an old format (1). Thereafter, the terminal 280 receives a reconfiguration message from the base station 281 (2) and recognizes that it needs to transmit a packet using a new format. In this case, the receiver, that is, the base station 281 transmits a receiver status report message to the transmitter, that is, the terminal 280 (3) in order to identify information of the received packet. In this case, the PDCP entities of the base station 281 and the terminal 280 may be responsible for this role. The status report message includes information indicating which packet has been received or which packet is not received or needs to be retransmitted.

Figure 32:
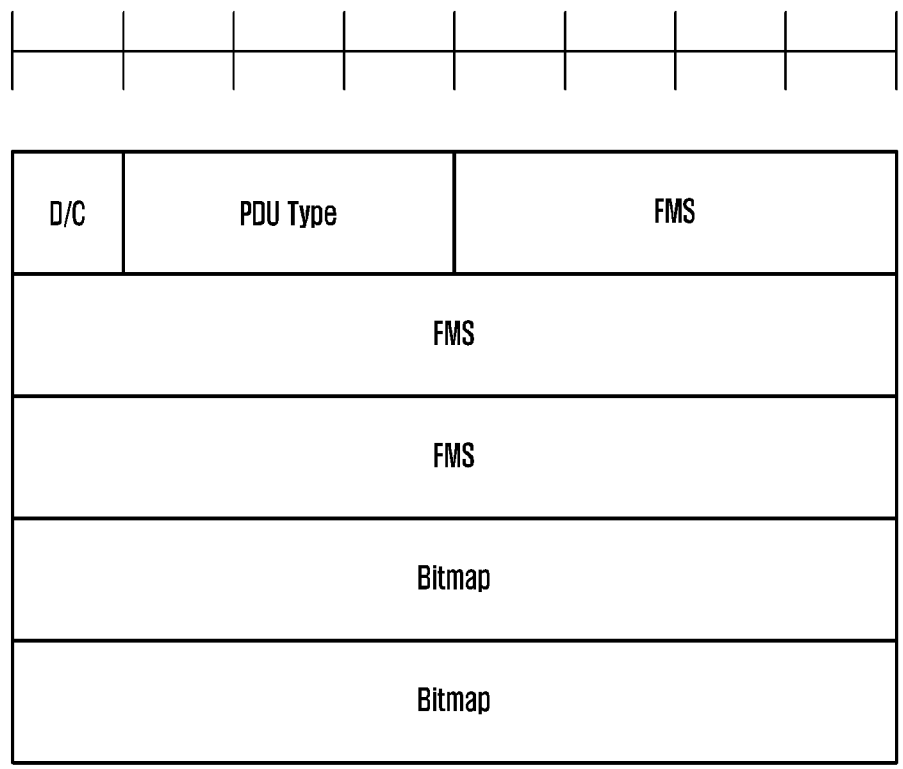
FIG. 32 is a diagram illustrating the format of a status report message according to an embodiment of the disclosure.
Figure 33:
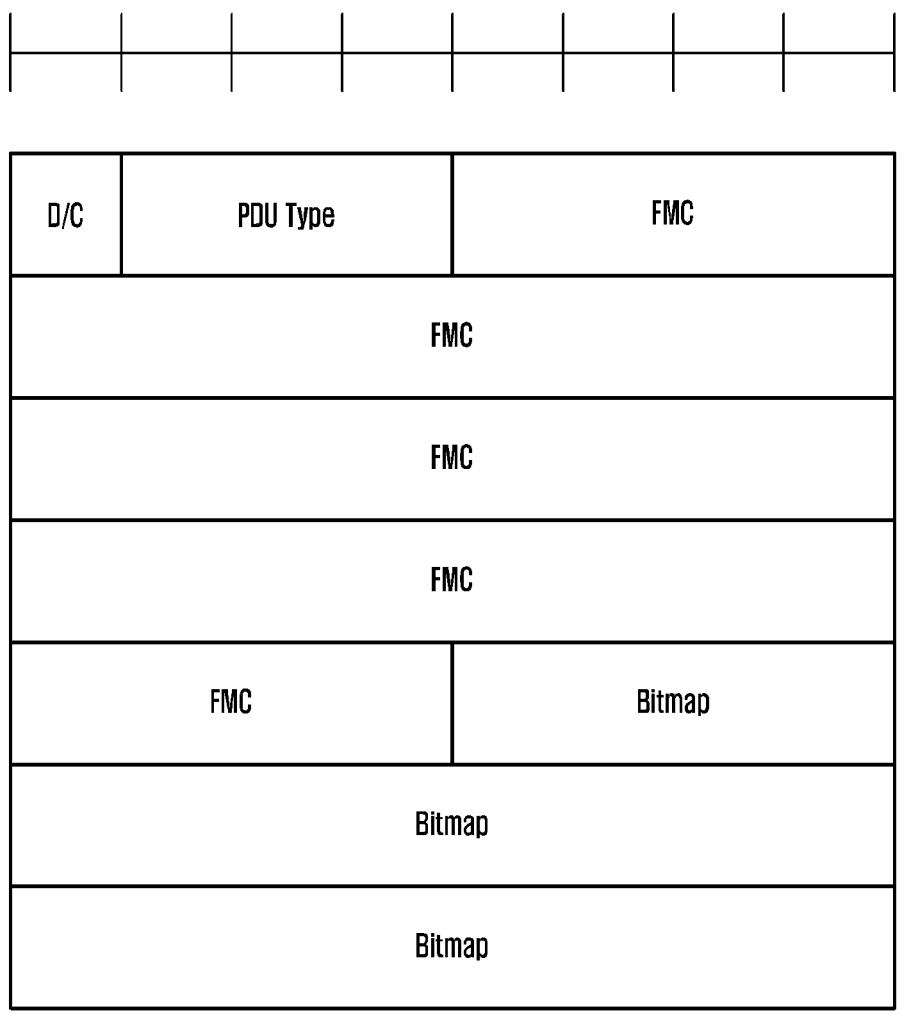
FIG. 33 is a diagram illustrating the format of a status report message according to an embodiment of the disclosure.

The status report message may include an SN or COUNT value that has not been first received and a bitmap indicative of the reception state of a subsequent packet. A detailed status report message is shown in FIGS. 32 and 33. The terminal 280 transmits a packet using a temporary format after a reconfiguration message is received (4).

Figure 34:
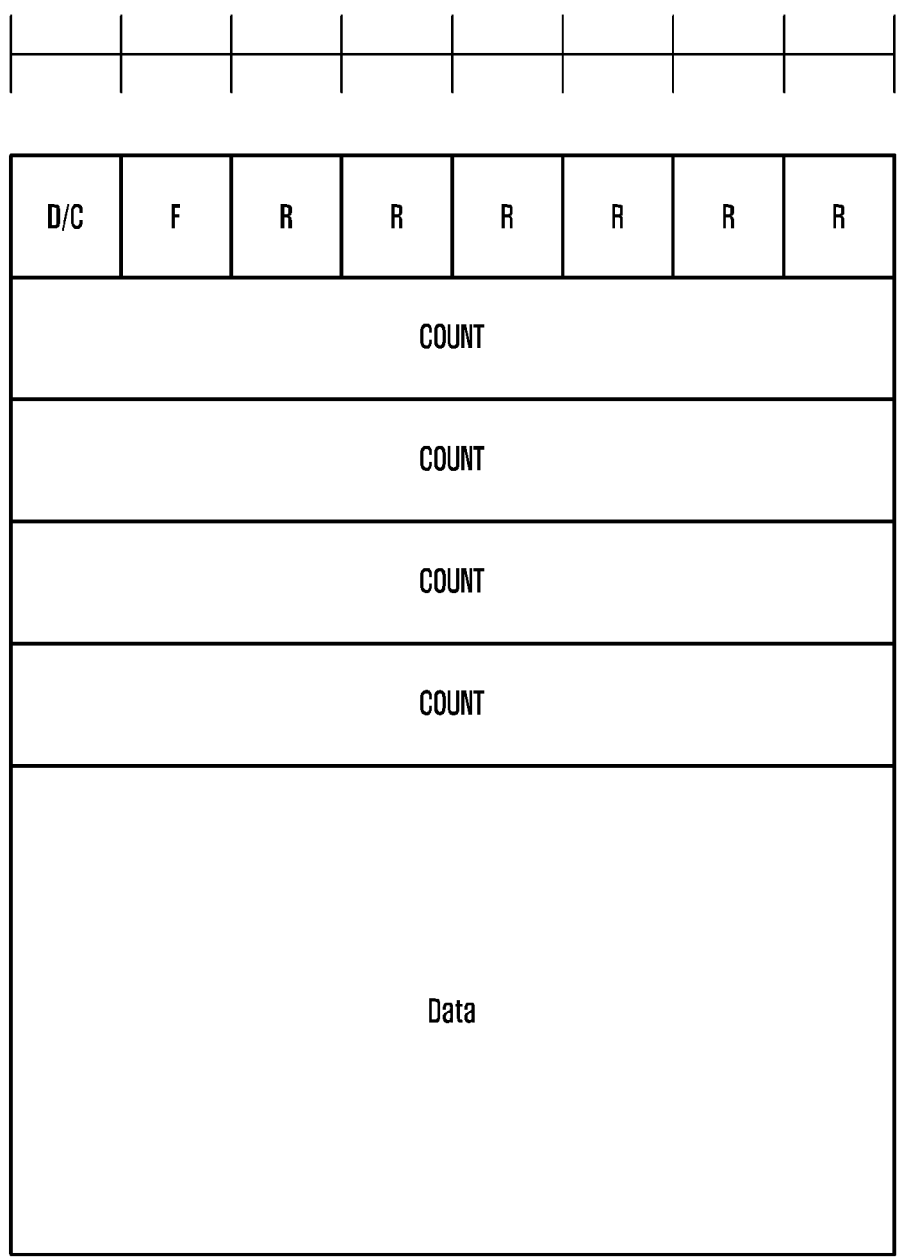
FIG. 34 is a diagram illustrating the format of a PDCP data PDU including a COUNT according to an embodiment of the disclosure.
Figure 35:
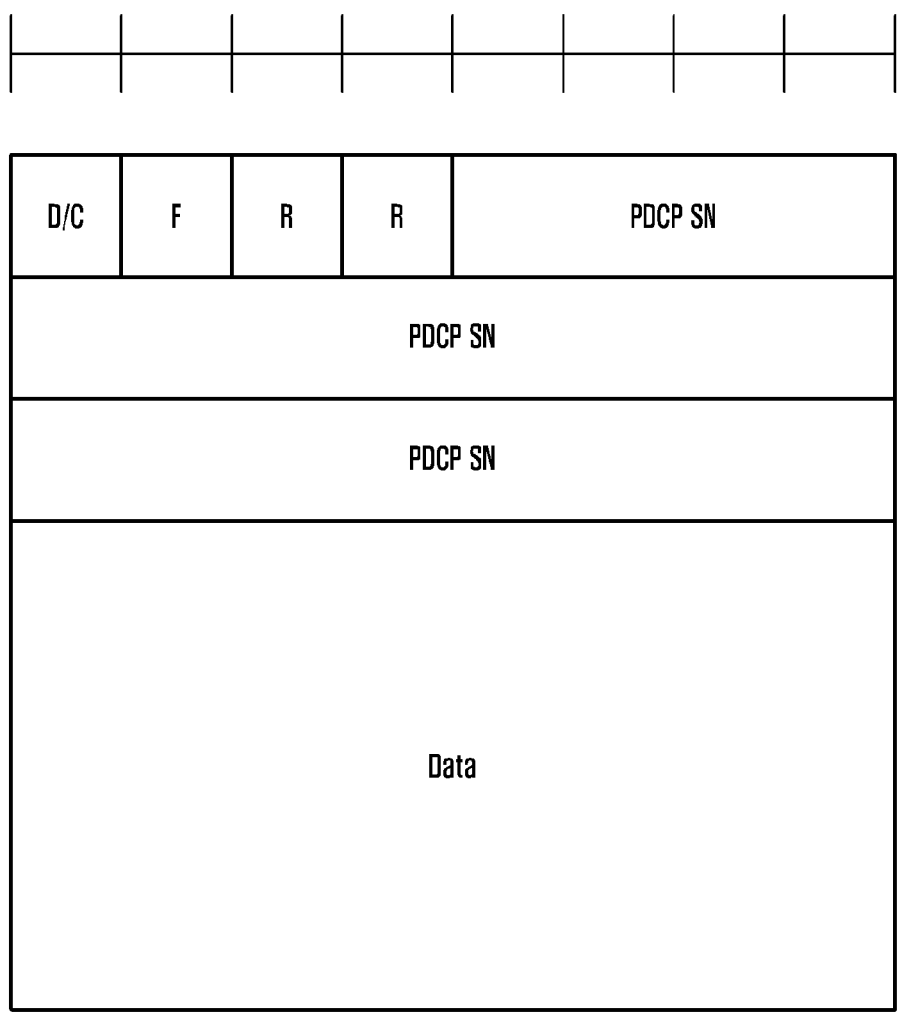
FIG. 35 is a diagram illustrating the format of a PDCP data PDU including a PDCP sequence number (SN) according to an embodiment of the disclosure.

The terminal 280 transmits a packet as much as a preset amount using a temporary format (4, 5, 6), and may hereinafter transmit a packet using a new format indicated in a reconfiguration message (7). In this case, the terminal may transmit up to a packet, having an SN or COUNT value that is a given amount greater than a first missing SN (FMS) or first missing count (FMC) indicated in the status report message, using the temporary format. The size of the given amount may be a PDCP Window size used in the old format or a positive number times the size. After transmitting a packet using the temporary format, the transmitter, that is, the terminal 280, transmits a packet using a new format (8), but experiences retransmission in a radio channel. For this reason, the base station 281 may receive the data of the temporary format and the data of the new format that have been out of sequence. In such a case, in order to distinguish between the header formats, an indicator for identifying whether a packet uses the temporary format is necessary, and detailed header formats thereof are shown in FIGS. 34 and 35.

Figure 29:
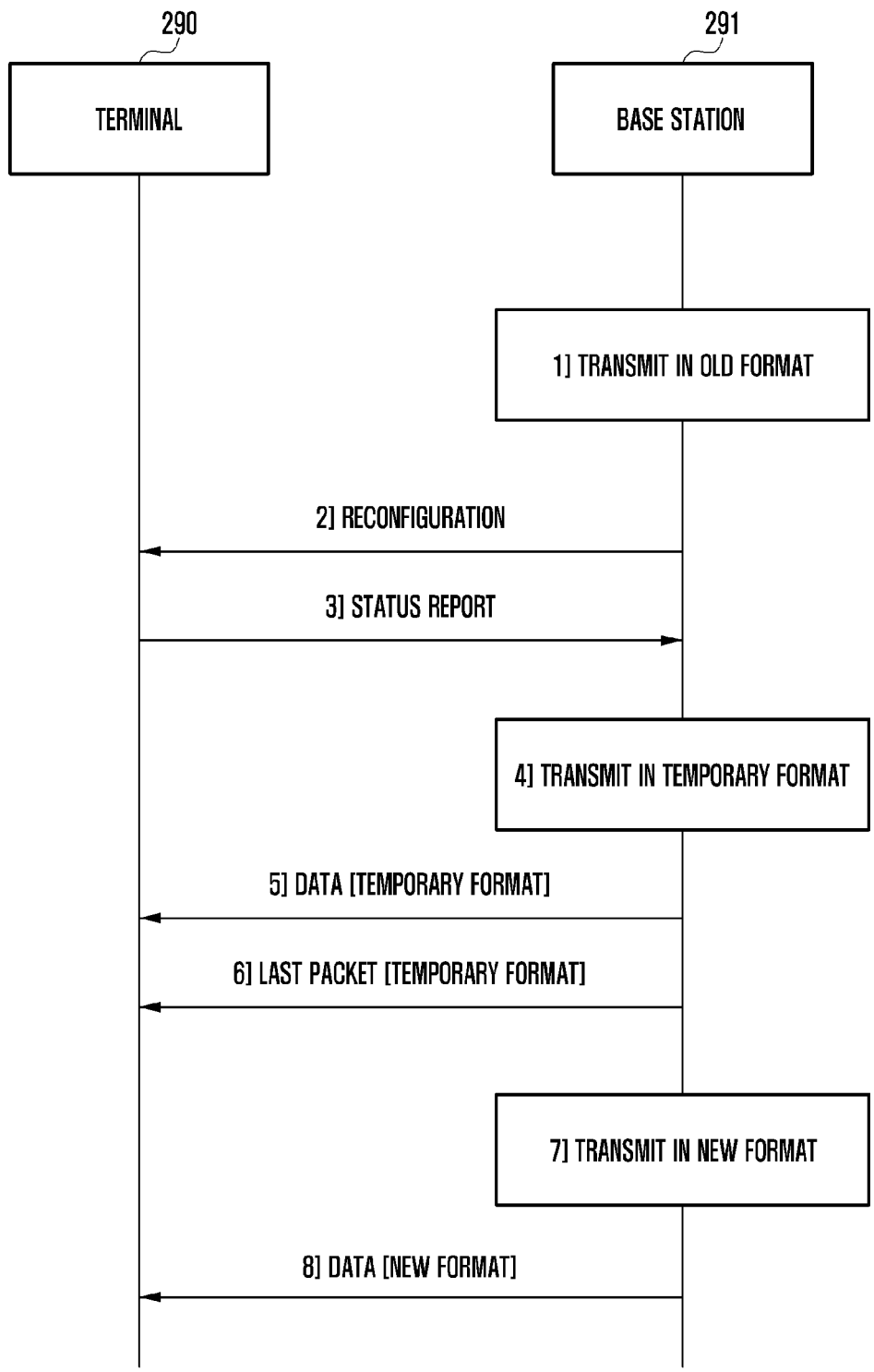
FIG. 29 is a diagram illustrating a procedure of changing a header format with respect to downlink data according to an embodiment of the disclosure.

FIG. 29 shows a procedure of changing a header format with respect to downlink data. In an embodiment of FIG. 29, an old format may include an SN size having a relatively long length, and a new format may include an SN size having a relatively short length. Alternatively, the opposite case is also possible. Furthermore, a temporary format may be a PDCP COUNT value or the SN of another agreed common size.

At the start timing of the embodiment of FIG. 29, a base station 291 transmits a packet to a terminal 290 using an old format. Thereafter, the terminal receives a reconfiguration message from the base station 291 (2) and recognizes that it needs to transmit a packet using a new format. In this case, the receiver, that is, the terminal 290, transmits a receiver status report message to the transmitter, that is, the base station 291, (3) in order to identify information of the received packet. In this case, the PDCP entities of the base station 291 and the terminal 290 may be responsible for this role. The status report message includes information indicating which packet has been received or which packet is not received or needs to be retransmitted.

The status report message may include an SN or COUNT value that has not been first received and a bitmap indicative of the reception state of a subsequent packet. Detailed status report messages are shown in FIGS. 32 and 33. The base station 291 transmits a packet using a temporary format after it transmits the reconfiguration message (4).

The base station 291 transmits a packet as much as a preset amount using the temporary format (5, 6), and may hereinafter transmit a packet using a new format indicated in the reconfiguration message (7). In this case, the base station may transmit up to a packet, having an SN or COUNT value that is a given amount greater than an FMS or FMC indicated in the status report message, using the temporary format. The size of the given amount may be a PDCP Window size used in the old format or a positive number times the size.

The transmitter, that is, the base station 291, transmits a packet using the new format (8) after it transmits the packet using temporary format, but experiences retransmission in a radio channel. For this reason, the terminal 290 may receive the data of the temporary format and the data of the new format that have been out of sequence. In such a case, in order to distinguish between the heater formats, an indicator to identify whether a packet uses the temporary format is necessary, and detailed header formats thereof are shown in FIGS. 34 and 35.

Figure 30:
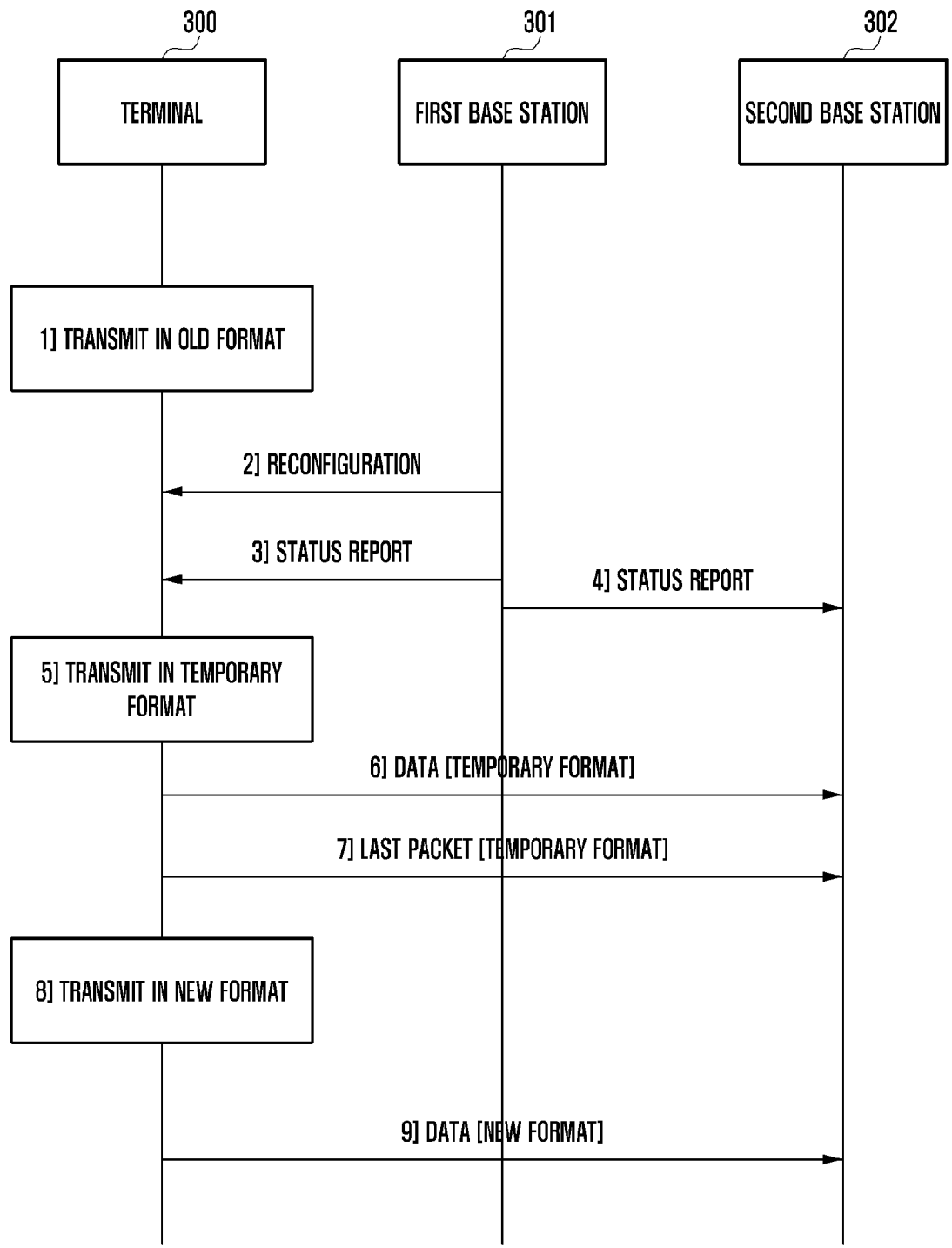
FIG. 30 is a diagram illustrating a procedure of changing a header format with respect to uplink data according to an embodiment of the disclosure.

FIG. 30 shows a procedure of changing a header format with respect to uplink data. In an embodiment of FIG. 30, an old format may include an SN size having a relatively long length, and a new format may include an SN size having a relatively short length. Alternatively, the opposite case is also possible. Furthermore, a temporary format may be a PDCP COUNT value or the SN of another agreed common size.

At the start timing of the embodiment of FIG. 30, a terminal 300 transmits a packet to a first base station 301 using an old format (1). Thereafter, the terminal receives a reconfiguration message from the first base station 301 (2), and subsequently recognizes that it needs to transmit data to a second base station 302 using a new format. In this case, the old receiver, that is, the first base station 301, transmits a receiver status report message to the transmitter, that is, the terminal 300 (3), in order to identify information of the received packet.

Furthermore, the first base station 301 may also transmit a status report message to the second base station 302 (4).

Furthermore, the first base station 301 does not directly transmit a status report message to the terminal, but the second base station 302 may transmit a status report message to the terminal. Such a procedure of transmitting the status report message may be responsible for the PDCP entities of the base station and the terminal. The status report message includes information indicating which packet has been received or which packet is not received or needs to be retransmitted. The status report message may include an SN or COUNT value that has not been first received and a bitmap indicative of the reception state of a subsequent packet. Detailed status report messages are shown in FIGS. 32 and 33.

After receiving the reconfiguration message, the terminal 300 transmits a packet using a temporary format (5). The terminal 300 may transmit a packet as much as a preset amount using the temporary format (6, 7), and may hereinafter transmit a packet using a new format indicated in the reconfiguration message (8). In this case, the terminal may transmit up to a packet, having an SN or COUNT value that is a given amount greater than an FMS or FMC indicated in the status report message, using the temporary format. The size of the given amount may be a PDCP Window size used in the old format or a positive number times the size.

After transmitting a packet using the temporary format, the transmitter, that is, the terminal 300, transmits a packet using the new format (9), but experiences retransmission in a radio channel. For this reason, the base station may receive the data of the temporary format and the data of the new format that have been out of sequence. In such a case, in order to distinguish between the heater formats, an indicator to identify whether a packet uses the temporary format is necessary, and detailed header formats thereof are shown in FIGS. 34 and 35.

Figure 31:
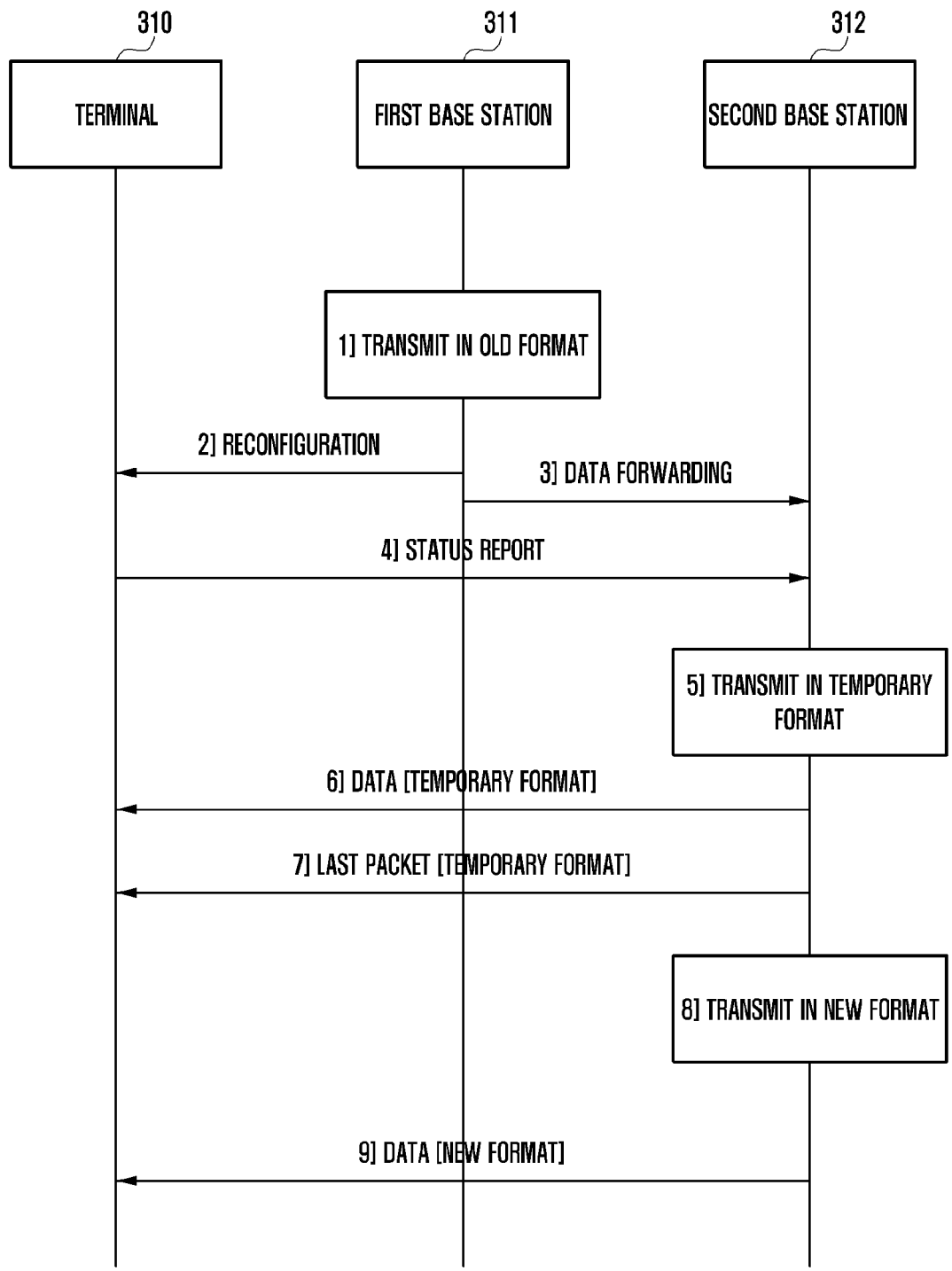
FIG. 31 is a diagram illustrating a procedure of changing a header format with respect to downlink data according to an embodiment of the disclosure.

FIG. 31 shows a procedure of changing a header format with respect to downlink data. In an embodiment of FIG. 31, an old format may include an SN size having a relatively long length, and a new format may include an SN size having a relatively short length. Alternatively, the opposite case is also possible. Furthermore, a temporary format may be a PDCP COUNT value or the SN of another agreed common size.

At the start timing of the embodiment of FIG. 31, a first base station 311 transmits a packet to a terminal 310 using an old format (1). Thereafter, the terminal 310 receives a reconfiguration message from the first base station 311 (2), and hereinafter recognizes that it needs to transmit data to a second base station 312 using a new format. The first base station 311 forwards the data to the second base station (3).

In this case, an old receiver, that is, the terminal 310, transmits a receiver status report message to a new transmitter, that is, the second base station 312, in order to identify information of the received packet (4). Such a procedure of transmitting the status report message may be responsible for the PDCP entities of the base station and the terminal. The status report message includes information indicating which packet has been received or which packet is not received or needs to be retransmitted. The status report message may include an SN or COUNT value that has not been first received and a bitmap indicative of the reception state of a subsequent packet. Detailed status report messages are shown in FIGS. 32 and 33.

After receiving the reconfiguration message, the terminal 310 receives a packet using a temporary format. The second base station 312 may transmit a packet as much as a preset amount using a temporary format (5, 6, 7), and may hereinafter transmit a packet using a new format indicated in the reconfiguration message (8). In this case, the second base station may transmit up to a packet, having an SN or COUNT value that is a given amount greater than an FMS or FMC indicated in the status report message, using the temporary format. The size of the given amount may be a PDCP Window size used in the old format or a positive number times the size.

After transmitting a packet using the temporary format, a transmitter, that is, the second base station 312, transmits a packet using a new format (9), but experiences retransmission in a radio channel. For this reason, the terminal may receive the data of the temporary format and the data of the new format that have been out of sequence. In such a case, in order to distinguish between the heater formats, an indicator to identify whether a packet uses the temporary format is necessary, and detailed header formats thereof are shown in FIGS. 34 and 35.

FIG. 32 shows an embodiment of the format of a status report message. The status report message may include a D/C field, a PDU Type field, a first missing SN (FMS) field, a Bitmap field, etc. The D/C field is an indicator indicating whether a corresponding protocol data unit (PDU), message or packet is a data PDU or a control PDU. The status report message is the type of control PDU and may be indicated as a value indicative of a control message. The PDU Type is a bit indicative of a detailed type of corresponding PDU, and is assumed to be a 3-bit value in FIG. 32. In one embodiment of the disclosure, the PDU Type field may be indicated as a value indicative of the status report message.

The FMS field is set as a sequence number (SN) value of the foremost packet among the SNs of packets determined to have not been received by a receiver at the timing when a status report message is transmitted or the timing when a reconfiguration message to a configuration message is received. In this case, the SN is the SN of an old format used prior to a reconfiguration, but may be the SN of a new format to be used after a reconfiguration or the SN of a temporary format.

The bitmap field is a bit indicative of a reception/non-reception state for a packet after a packet corresponding to an SN indicated in the FMS field. The bitmap field may be set to 0 when a packet is received and 1 (or to be opposite) when a packet is not received. If an SN indicated in the FMS is 5, the first bit of the bitmap field may be set to indicate the reception/non-reception state of a packet corresponding to an SN 6, and the fifth bit of the bitmap field may be set to indicate the reception/non-reception state of a packet corresponding to an SN 10.

FIG. 33 shows another embodiment of the format of a status report message. The status report message may include a D/C field, a PDU Type field, a first missing count (FMC) field, a Bitmap field, etc. The D/C field is an indicator indicating whether a corresponding protocol data unit (PDU), message or packet is a data PDU or a control PDU. The status report message may be indicated as a value indicative of a control message because it is the type of control PDU.

The PDU Type is a bit indicative of a detailed type of corresponding PDU, and is assumed to be a 3-bit value in FIG. 33. The PDU Type field may be indicated as a value indicative of a status report message. The FMC field is set as a PDCP COUNT value of the foremost packet among the PDCP COUNTs of packets determined to have not been received by a receiver at the timing when a status report message is transmitted or the timing when a reconfiguration message to configuration message is received. The bitmap field is a bit indicative of the reception/non-reception state of a packet after a packet corresponding to a PDCP COUNT indicated in the FMC field. The bitmap field may be set to 0 when a packet is received and 1 (or to be opposite) when a packet is not received. If a PDCP COUNT indicated in the FMC is 5, the first bit of the bitmap field may be set to indicate the reception/non-reception state of a packet corresponding to a COUNT 6, and the fifth bit of the bitmap field may be set to indicate the reception/non-reception state of a packet corresponding to a COUNT 10.

FIG. 34 shows the format of a PDCP data protocol data unit (PDU) including a COUNT. The PDCP data PDU format may include a D/C field, an F field, an R field, a COUNT field, a data field, etc. The D/C field is an indicator indicating whether a corresponding PDU, message or packet is a data PDU or a control PDU. The D/C field of a PDCP data PDU may be indicated as a value indicative of a data PDU. The F field indicates whether the data PDU includes the sequence number of a temporary format.

The embodiment of FIG. 34 is an embodiment in which the COUNT is used as a sequence number. If the embodiment of FIG. 34 is used as a temporary format, the F field may be set as a value indicative of a temporary format. The R field is a reserved field not used as a given value. The COUNT field indicates a PDCP COUNT value of a corresponding PDU. A value encrypted as a PDCP service data unit (SDU) may be used as the data field. In addition, an MAC-I field for integrity protection, etc. may be added.

FIG. 35 shows the format of a PDCP data PDU including a PDCP sequence number (SN). The PDCP data PDU format may include a D/C field, an F field, an R field, a PDCP SN field, a data field, etc.

The D/C field is an indicator indicating whether a corresponding PDU, message or packet is a data PDU or a control PDU. The D/C field of a PDCP data PDU may be indicated as a value indicative of a data PDU. The F field indicates whether the data PDU includes the SN of a temporary format. If the embodiment of FIG. 35 is used as a temporary format, the F field may be set as a value indicative of a temporary format. In some embodiments, a temporary format may be a format using a PDCP SN, such as FIG. 35. The R field is a reserved field not used as a given value. The PDCP SN field indicates a PDCP SN value of a corresponding PDU. A value encrypted as a PDCP SDU may be used as the data field. In addition, an MAC-I field for integrity protection, etc. may be added.

Figure 36:
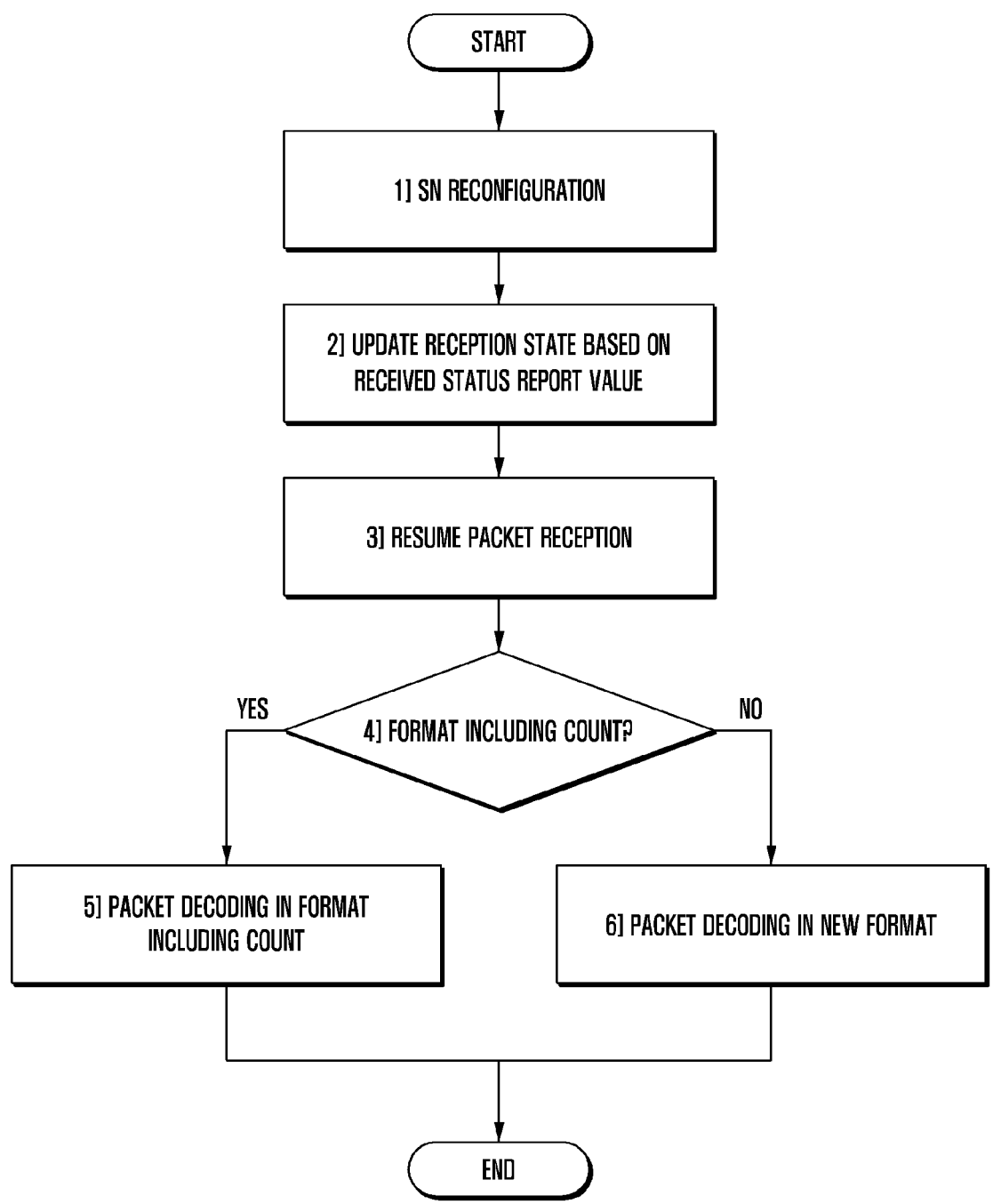
FIG. 36 is a diagram illustrating a method for the PDCP entity of a receiver to identify and decode the PDCP data PDU format of FIG. 34-35 according to an embodiment of the disclosure.

FIG. 36 shows a method for the PDCP entity of a receiver to identify and decode the PDCP data PDU format of FIG. 34-35. According to the embodiments of FIGS. 28 to 31 or FIGS. 50 to 53, when a reconfiguration message is received, the receiver may reconfigure a sequence number (SN) and a header format including the SN (1, 2). Thereafter, the receiver transmits a status report message to a transmitter. The transmitter may retransmit a packet based on the status report message.

The receiver resumes the reception of a packet (3) after the SN reconfiguration. In this case, the receiver identifies whether a received data PDU is a format including the COUNT of FIG. 34 or the format of FIG. 35 including the reconfigured SN. In this case, the receiver may identify whether the received data PDU is a format including a COUNT or a format including the new reconfigured PDCP SN (4) based on a value of the F field of FIG. 34-35. If the received data PDU is a PDCP data PDU of the format including the COUNT, the receiver may determine the format to be a format including the COUNT and decode a packet (5). If not, the receiver may decode the packet using the new format including the reconfigured PDCP SN (6).

Figure 37:
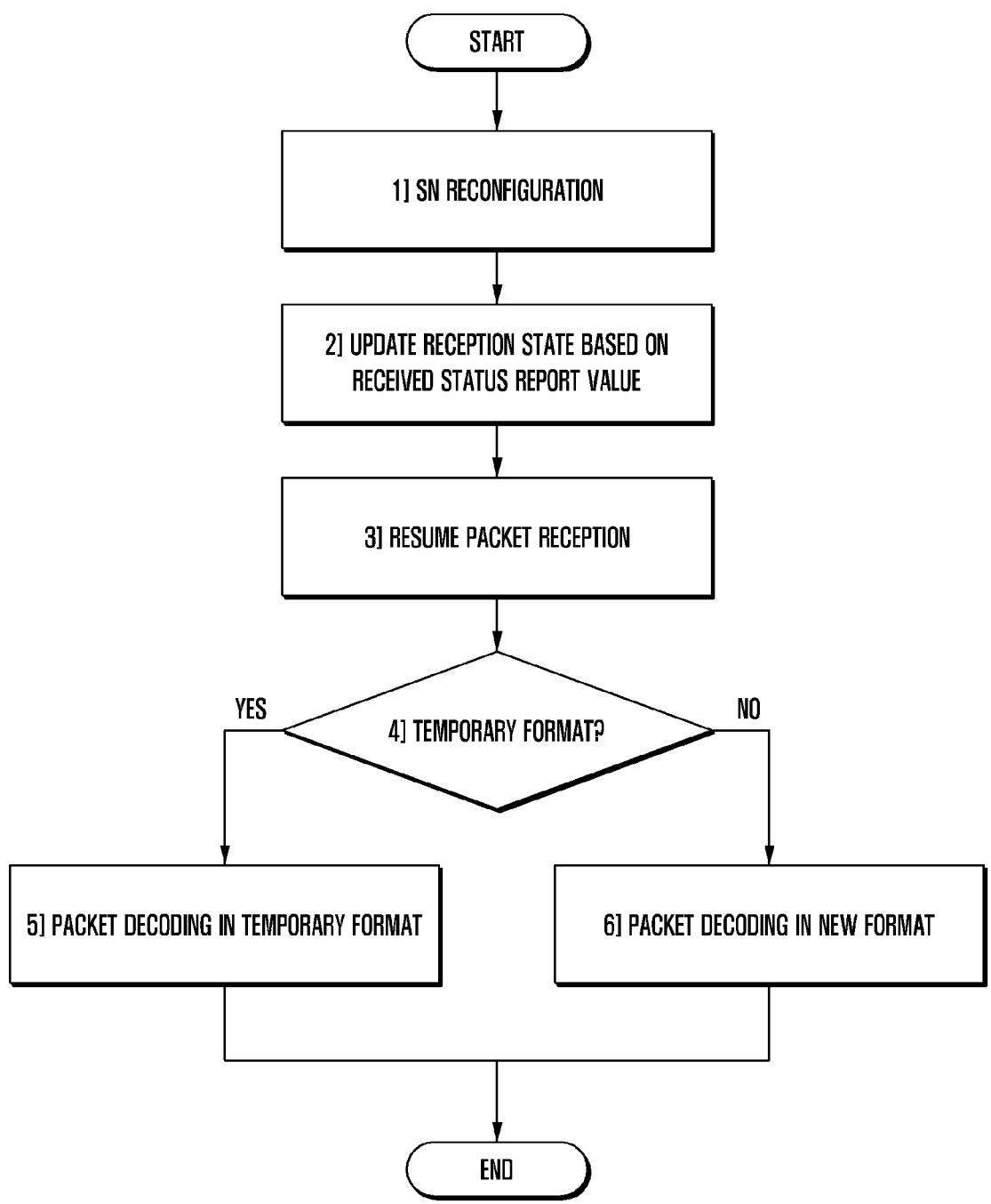
FIG. 37 is a diagram illustrating a method for the PDCP entity of a receiver to identify and decode the PDCP data PDU format of FIG. 34-35 according to an embodiment of the disclosure.

FIG. 37 shows a method for the PDCP entity of a receiver to identify and decode the PDCP data PDU format of FIG. 34-35. According to the embodiments of FIGS. 28 to 31 or FIGS. 50 to 53, when a reconfiguration message is received, the receiver may reconfigure a sequence number (SN) and a header format including the SN (1, 2). Thereafter, the receiver transmits a status report message to a transmitter. The transmitter may retransmit a packet based on the status report message.

The receiver resumes the reception of a packet after the SN reconfiguration (3). In this case, the receiver identifies whether a received data PDU is a format including the PDCP SN of a temporary format or a format including a reconfigured PDCP SN. In this case, the receiver may identify whether the received data PDU is a format including the PDCP SN of the temporary format or a format including the reconfigured PDCP SN (4) based on a value of the F field of FIG. 35. If the received data PDU is a PDCP data PDU of the format including the PDCP SN of the temporary format, the receiver may determine the format to be a format including the PDCP SN of the temporary format, and may decode a packet (5). If not, the receiver may decode a packet using a new format including the reconfigured PDCP SN (6).

Figure 38:
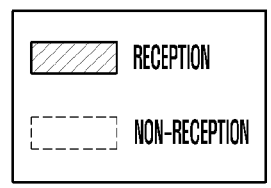
FIG. 38 is a diagram illustrating a case where a PDCP SN is changed by a packet format reconfiguration by which the length of a PDCP SN is changed according to an embodiment of the disclosure.

FIG. 38 shows an embodiment in which a PDCP SN is changed by a packet format reconfiguration by which the length of a PDCP SN is changed. In the embodiment of FIG. 38, it is assumed that an old format has an SN size (0-127 SNs) of 7 bits and a new format has an SN size (0-31) of 5 bits. In the embodiment of FIG. 38, at reconfiguration timing, the PDCP entity of a receiver assumes that packets corresponding to PDCP COUNTs 8500033, 8500034, 8500038, 8500043, 8500055, 8500059, 8500065, 8500066, 8500069, 8500070, 8500071 and subsequent COUNT values are a non-reception state.

The packets need to be retransmitted after a reconfiguration, and they may include a header including one of a PDCP COUNT, the SN of a temporary format or the SN of a new format and may be transmitted. HFN values of old formats of the packets are the same as 66407, and PDCP SNs thereof correspond to 65, 66, 70, 75, 87, 91, 97, 98, 101, 102, 103, and a value of a subsequent PDCP SN. The non-reception packets correspond to PDCP SN values 1, 2, 6, 11, 23, 27 (HFN 265626), 1, 2, 5, 6, 7 (HFN 265627) of a new format and a value of a subsequent PDCP SN. In this case, packets having the same PDCP SN value may be present. The same PDCP SN value may generate HFN desynchronization.

In the embodiment of FIG. 38, both a packet corresponding to a COUNT 8500033 and a packet corresponding to a COUNT 8500065 correspond to a PDCP SN 1. Accordingly, if the packets are transmitted using the SN of the new format, it may be difficult for a receiver to precisely determine an HFN value. Furthermore, both a packet corresponding to a COUNT 8500034 and a packet corresponding to a COUNT 8500066 also correspond to a PDCP SN 2. Accordingly, if the packets are transmitted using the SN of the new format, it may be difficult for a receiver to precisely determine an HFN value. In this case, given packets may be transmitted using a header including the PDCP COUNT of FIG. 34. Accordingly, the HFN value can be precisely identified based on the header. The relation between the HFN and SN values complies with Equations 1-3.

Figure 39:
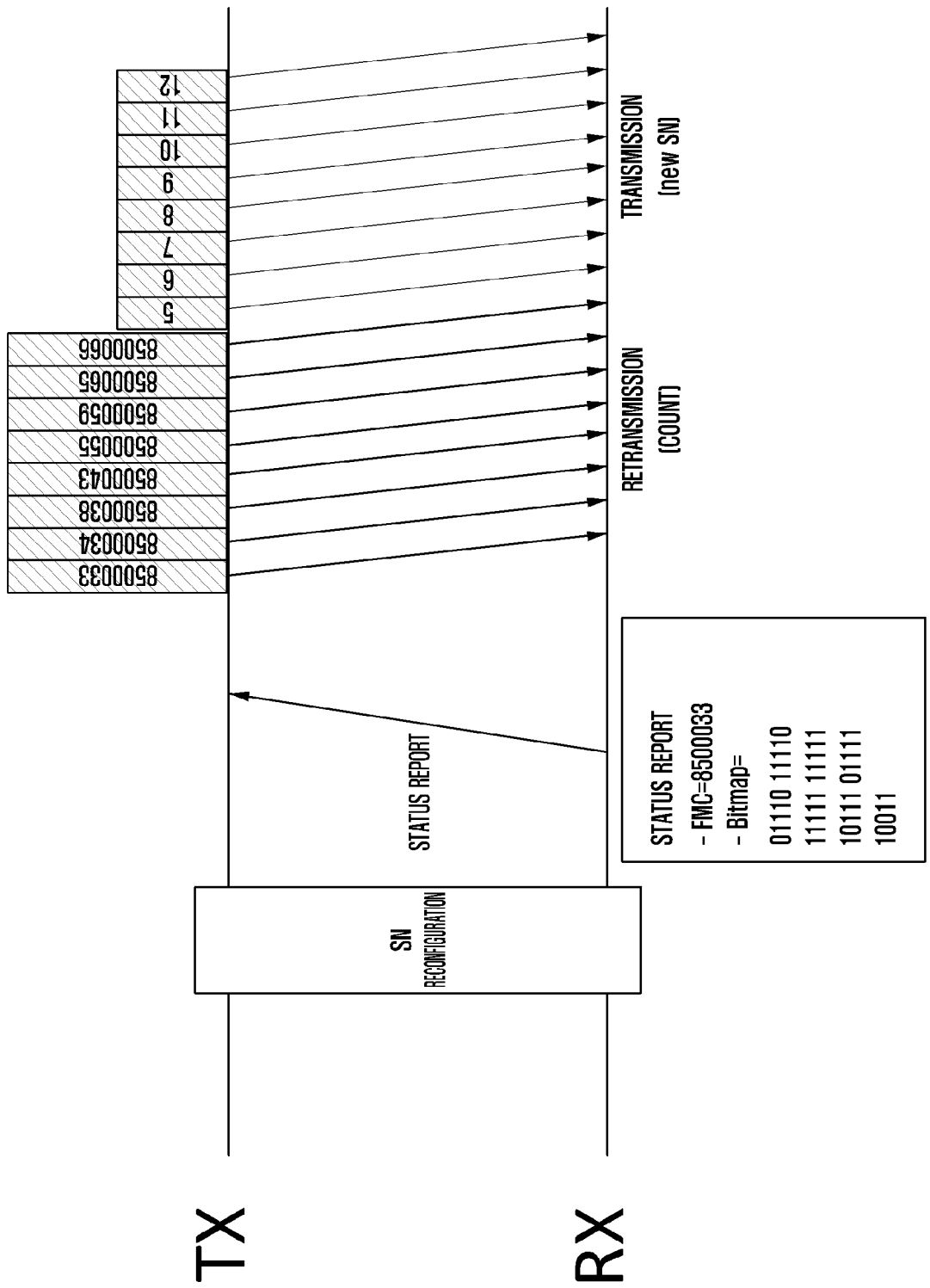
FIG. 39 is a diagram illustrating a procedure of retransmitting a non-reception packet after a packet format reconfiguration by which the length of a PDCP SN is changed according to an embodiment of the disclosure.

FIG. 39 shows an embodiment of a procedure of retransmitting a non-reception packet after a packet format reconfiguration by which the length of a PDCP SN is changed. In FIG. 39, it is assumed that the size of the PDCP SN is changed from 7 bits to 5 bits due to a reconfiguration. In this case, the reception situation of a packet is assumed to be the same as that of FIG. 38. Accordingly, in this case, a status report may be transmitted from a receiver to a transmitter, and may include an FMC and a bitmap as shown in the embodiment of FIG. 33 and may include an FMS and a bitmap as shown in the embodiment of FIG. 32. In FIG. 39, it is assumed that a status report is transmitted as the status report of FIG. 33 including an FMC and a bitmap.

The FMC indicates a COUNT value of a packet, having the smallest COUNT value, among not-received packets, and thus 8500033 is indicated in the FMC. Furthermore, with respect to a packet subsequent to this packet, a reception state is indicated using a bitmap. In the embodiment of FIG. 39, the bitmap indicates 0 upon non-reception and indicates 1 upon reception. Accordingly, the bitmap may be indicated as 01110 11110 11111 11111 10111 01111 10011. That is, the non-reception of packets having COUNT values of 8500034, 8500038, 8500043, 8500055, 8500059, 8500065, 8500066 has been specified as a bit 0, and it may indicate that up to a packet having a PDCP COUNT of 8500068 has been received.

The transmitter performs the retransmission of the non-reception packets based on them. In this case, the transmitter transmits the packets using a PDU format including the PDCP COUNT of FIG. 34. Packets having a COUNT indicated as described above do not generate HFN desynchronization. Thereafter, packets corresponding to PDCP COUNTs exceeding a PDCP COUNT 8500069 are transmitted using 5, that is, a new SN value.

In the embodiment of FIG. 39, packets have been transmitted using a PDCP COUNT value only up to a non-reception packet included in a status report message (COUNT 8500066 in the embodiment), but this timing may be changed into different pre-configured timing. For example, up to a packet having a PDCP COUNT that is a given value higher than the COUNT value (COUNT 8500068 in the embodiment) of a packet indicated to be received in a status report message may be transmitted using a format including a COUNT. In this case, the given value may be the size of a PDCP reception window corresponding to the PDCP SN of a new format. The size of the reception window may be 2(PDCP SN size−1). The size of a reception window for a PDCP SN of 5 bits may be 2(5−1)=16. In this case, whether a packet is a format using a PDCP COUNT or a format using a PDCP SN may be identified based on the F field of FIG. 34-35.

Figure 40:
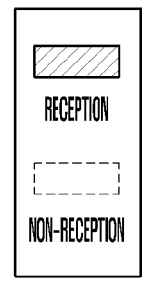
FIG. 40 is a diagram illustrating a case where a PDCP SN is changed by a packet format reconfiguration by which the length of a PDCP SN is changed according to an embodiment of the disclosure.

FIG. 40 shows an embodiment in which a PDCP SN is changed by a packet format reconfiguration by which the length of a PDCP SN is changed. In the embodiment of FIG. 40, it is assumed that an old format has an SN size (0-127 SNs) of 7 bits and a new format has an SN size (0-31) of 5 bits.

In the embodiment of FIG. 40, at reconfiguration timing, the PDCP entity of a receiver assumes that packets corresponding to PDCP COUNTs 8500033, 8500034, 8500038, 8500043, 8500055, 8500059, 8500065, 8500066, 8500069, 8500070, 8500071 and a subsequent COUNT value are a non-reception state. The packets need to be reconfigured, and they include a header including one of a PDCP COUNT, the SN of a temporary format, or the SN of a new format and may be transmitted. HFN values of old formats of the packets are the same as 66407, and PDCP SNs thereof correspond to 65, 66, 70, 75, 87, 91, 97, 98, 101, 102, 103, and a value of a subsequent PDCP SN.

The non-reception packets correspond to PDCP SN values 1, 2, 6, 11, 23, 27 (HFN 265626), 1, 2, 5, 6, 7 (HFN 265627) of a new format and a value of a subsequent PDCP SN. In this case, there may be packets having the same PDCP SN value. The same PDCP SN value may generate HFN desynchronization.

In the embodiment of FIG. 40, both a packet corresponding to a COUNT 8500033 and a packet corresponding to a COUNT 8500065 correspond to a PDCP SN 1. If the packets are transmitted using the SN of the new format, it may be difficult for a receiver to precisely determine an HFN value. Furthermore, both a packet corresponding to a COUNT 8500034 and a packet corresponding to a COUNT 8500066 also correspond to a PDCP SN 2. If the packets are transmitted using the SN of the new format, it may be difficult for a receiver to precisely determine an HFN value. In this case, given packets may be transmitted using a header including a temporary SN. Accordingly, an HFN value can be precisely identified based on the header. A value of the temporary SN may have a sufficiently large value so that an HFN value can be precisely identified.

In the embodiment of FIG. 40, the size of the temporary SN is assumed to be 22 bits. Accordingly, in the embodiment of FIG. 40, at reconfiguration timing, the temporary SNs of non-reception packets may correspond to 111425, 111426, 111430, 111435, 111447, 111451, 111457, 111458, 111461, 111462, 111463 and a higher SN value thereof. A temporary HFN value for corresponding temporary SNs may be 2. The relation between the HFN and SN values complies with Equations 1-3.

Figure 41:
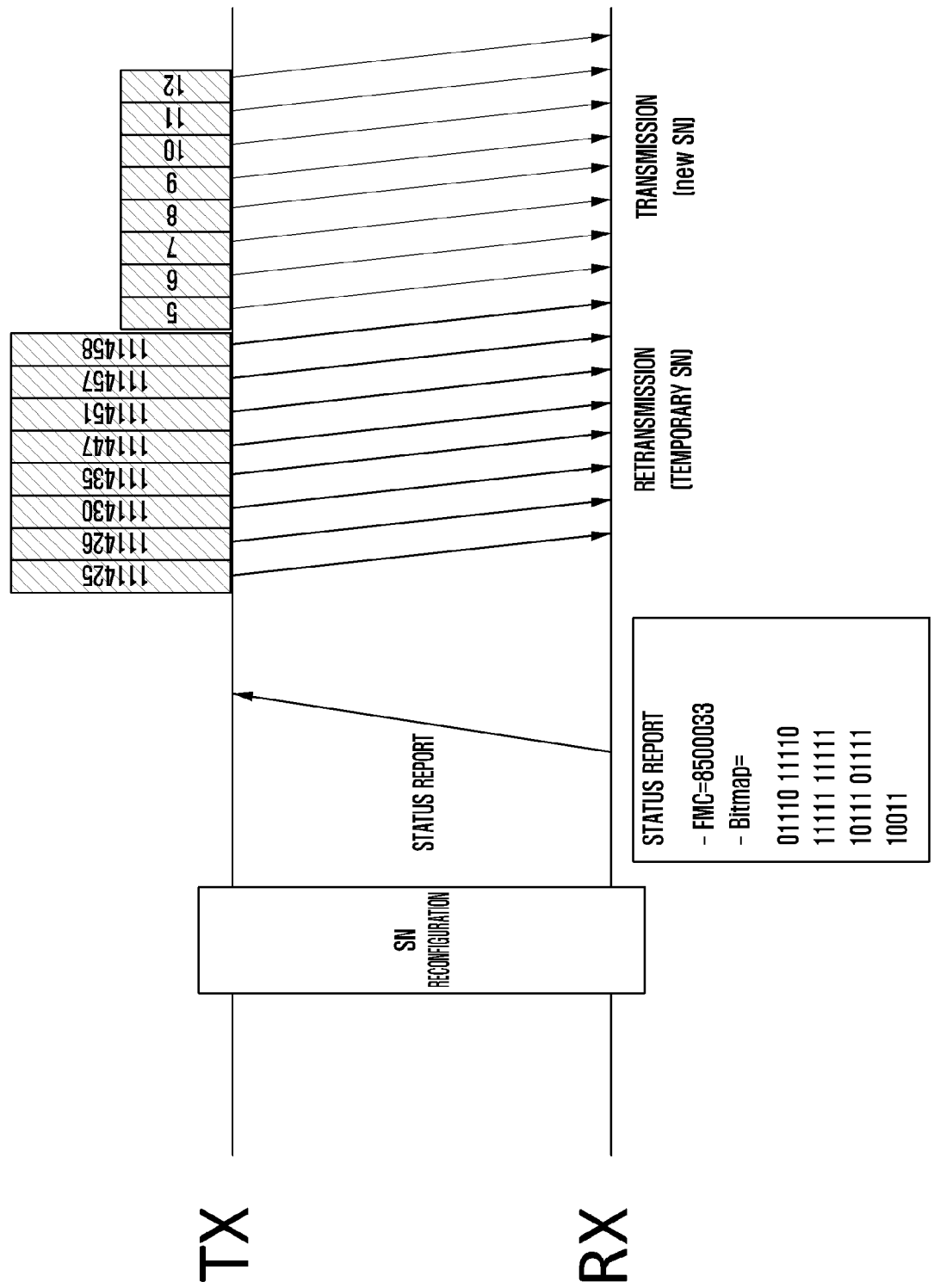
FIG. 41 is a diagram illustrating a procedure of retransmitting a non-reception packet after a packet format reconfiguration by which the length of a PDCP SN is changed according to an embodiment of the disclosure.

FIG. 41 shows an embodiment of a procedure of retransmitting a non-reception packet after a packet format reconfiguration by which the length of a PDCP SN is changed. In FIG. 41, it is assumed that the size of the PDCP SN is changed from 7 bits to 5 bits due to a reconfiguration. In this case, the reception situation of packets is the same as that of FIG. 40. Accordingly, in this case, a status report may be transmitted from a receiver to a transmitter, and may include an FMC and a bitmap as shown in the embodiment of FIG. 33 or may include an FMS and a bitmap as shown in the embodiment of FIG. 32. In FIG. 41, it is assumed that the status report is transmitted as the status report of FIG. 33 including an FMC and a bitmap.

The FMC indicates the COUNT value of a packet having the smallest COUNT value among not-received packets, and thus 8500033 is indicated in the FMC. If a temporary SN value is used as the FMS, 111425 may be indicated. Furthermore, the reception state of packets subsequent to this packet is indicated using a bitmap. In the embodiment of FIG. 41, the bitmap is indicated as 0 upon non-reception and indicated as 1 upon reception. Accordingly, the bitmap may be indicated as 01110 11110 11111 11111 10111 01111 10011. That is, what packets having COUNT values of 8500034, 8500038, 8500043, 8500055, 8500059, 8500065, 8500066 have not been received are specified as a bit 0, and it may indicate that up to a packet having a PDCP COUNT of 8500068 has been received.

The transmitter performs the retransmission of the non-reception packets based on them. In this case, the transmitter transmits the packets using a PDU format, including a temporary PDCP SN, among PDU formats including the PDCP SN of FIG. 35. Packets in which a temporary PDCP SN has been indicated as described above do not generate HFN desynchronization. Thereafter, packets corresponding to a PDCP COUNT exceeding a PDCP COUNT 8500069 are transmitted using 5, that is, a new SN value.

In the embodiment of FIG. 41, packets only up to a non-reception packet including a status report message (COUNT 8500066 in the embodiment) have been transmitted using a temporary PDCP SN value, but this timing may be changed into another pre-configured timing. For example, up to a packet having a PDCP COUNT that is a given value higher than the COUNT value (8500068 in the embodiment) of a packet indicated to have been received in a status report message may be transmitted using a format including a temporary PDCP SN.

In this case, the given value may be the size of a PDCP reception window corresponding to the PDCP SN of a new format. 2(PDCP SN size−1) may be used as the size of the reception window. The size of a reception window for a PDCP SN of 5 bits may be 2(5−1)=16. In this case, whether a packet is a format using a temporary PDCP SN or a format using a new PDCP SN may be identified using the F field of FIG. 35.

Figure 42:
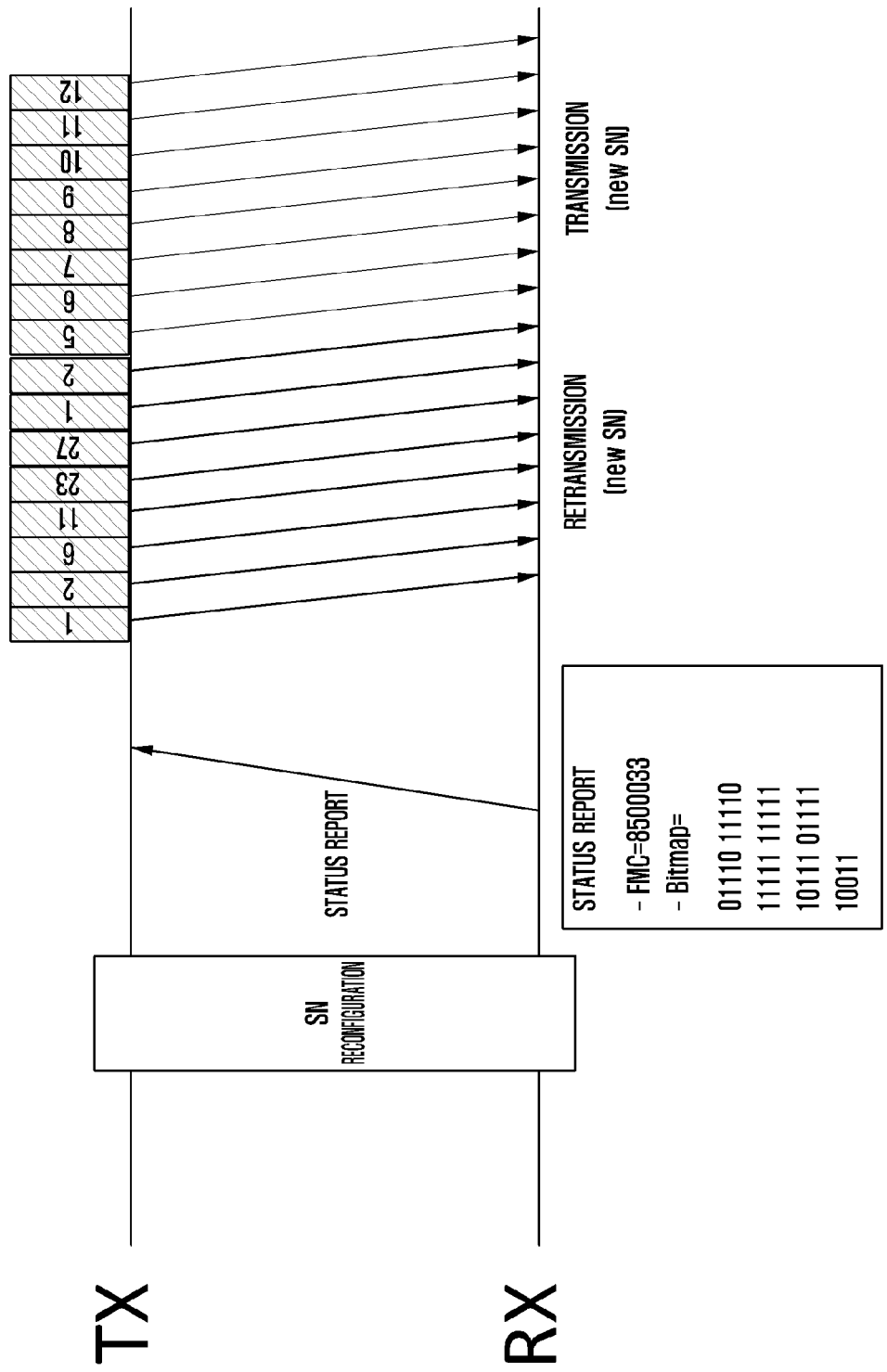
FIG. 42 is a diagram illustrating a procedure of retransmitting a non-reception packet after a packet format reconfiguration by which the length of a PDCP SN is changed according to an embodiment of the disclosure.

FIG. 42 shows an embodiment of a procedure of retransmitting a non-reception packet after a packet format reconfiguration by which the length of a PDCP SN is changed. In FIG. 42, it is assumed that the size of a PDCP SN is changed from 7 bits to 5 bits due to a reconfiguration. In this case, the reception situation of packets is the same as that of FIG. 40. Accordingly, in this case, a status report may be transmitted from a receiver to a transmitter, and may include an FMC and a bitmap as shown in the embodiment of FIG. 33 or may include an FMS and a bitmap as shown in the embodiment of FIG. 32. In FIG. 42, it is assumed that the status report is transmitted as the status report of FIG. 33 including an FMC and a bitmap.

The FMC indicates a COUNT value of a packet having the smallest COUNT value among not-received packets, and thus 8500033 is indicated in the FMC. Furthermore, the reception state of packets subsequent to this packet is indicated using a bitmap. In the embodiment of FIG. 42, the bitmap is indicated as 0 upon non-reception and indicated as 1 upon reception. Accordingly, the bitmap may be indicated as 01110 11110 11111 11111 10111 01111 10011. That is, the non-reception of packets having COUNT values of 8500034, 8500038, 8500043, 8500055, 8500059, 8500065, 8500066 has been specified as a bit 0, and it may indicate that up to a packet having a PDCP COUNT of 8500068 has been received.

The transmitter performs the retransmission of the non-reception packets based on them. In this case, the transmitter transmits the packets using a PDU format, including a new PDCP SN, among PDU formats including the PDCP SN of FIG. 35. In the embodiment of FIG. 42, different formats including a PDCP SN or a COUNT are not mixed in the receiver, and thus the F field of FIG. 34-35 may not be used. In the embodiment of FIG. 42, HFN desynchronization may occur because a temporary PDCP SN or a PDCP COUNT is not used. However, this can be solved using a latency transmission method of FIG. 43-44.

Figure 43:
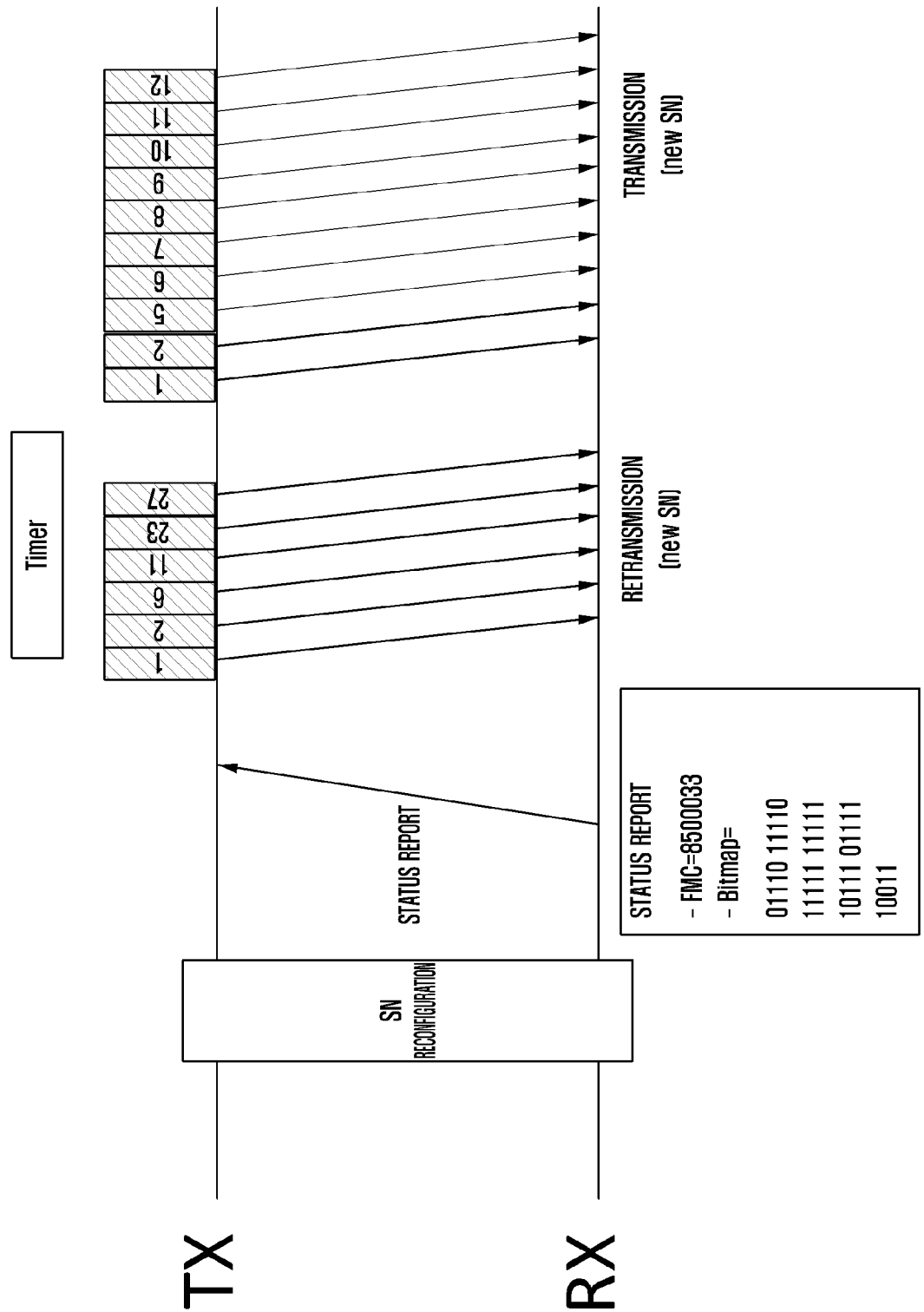
FIG. 43 is a diagram illustrating an embodiment of a procedure of retransmitting a non-reception packet after a packet format reconfiguration by which the length of a PDCP SN is changed according to an embodiment of the disclosure.

FIG. 43 shows an embodiment of a procedure of retransmitting a non-reception packet after a packet format reconfiguration by which the length of a PDCP SN is changed. In FIG. 43, it is assumed that the size of a PDCP SN is changed from 7 bits to 5 bits due to a reconfiguration. In this case, the reception situation of packets is the same as that of FIG. 40, and a description of a retransmitted packet is the same as that of FIG. 41. In the embodiment of FIG. 43, after a packet having a given PDCP SN is transmitted, a packet having a different HFN value, among packets corresponding to the same PDCP SN, is transmitted after a set timer time.

In the embodiment of FIG. 43, it is assumed that after a packet that is the first packet of packets having a PDCP SN value of 1 and that corresponds to a COUNT 8500033 is transmitted, a packet having the same PDCP SN and corresponding to a COUNT 8500065 is transmitted after a set timer time. The timer may be indicated in a reconfiguration to configuration message or may be indicated to use a preset value. A timer value may be set so that HFN desynchronization of different packets having the same PDCP SN does not occur or may be set as a PDCP reordering timer length in some embodiments. A corresponding timer may be set for all PDCP packets, but may be set for some packets transmitted after a reconfiguration.

Figure 44:
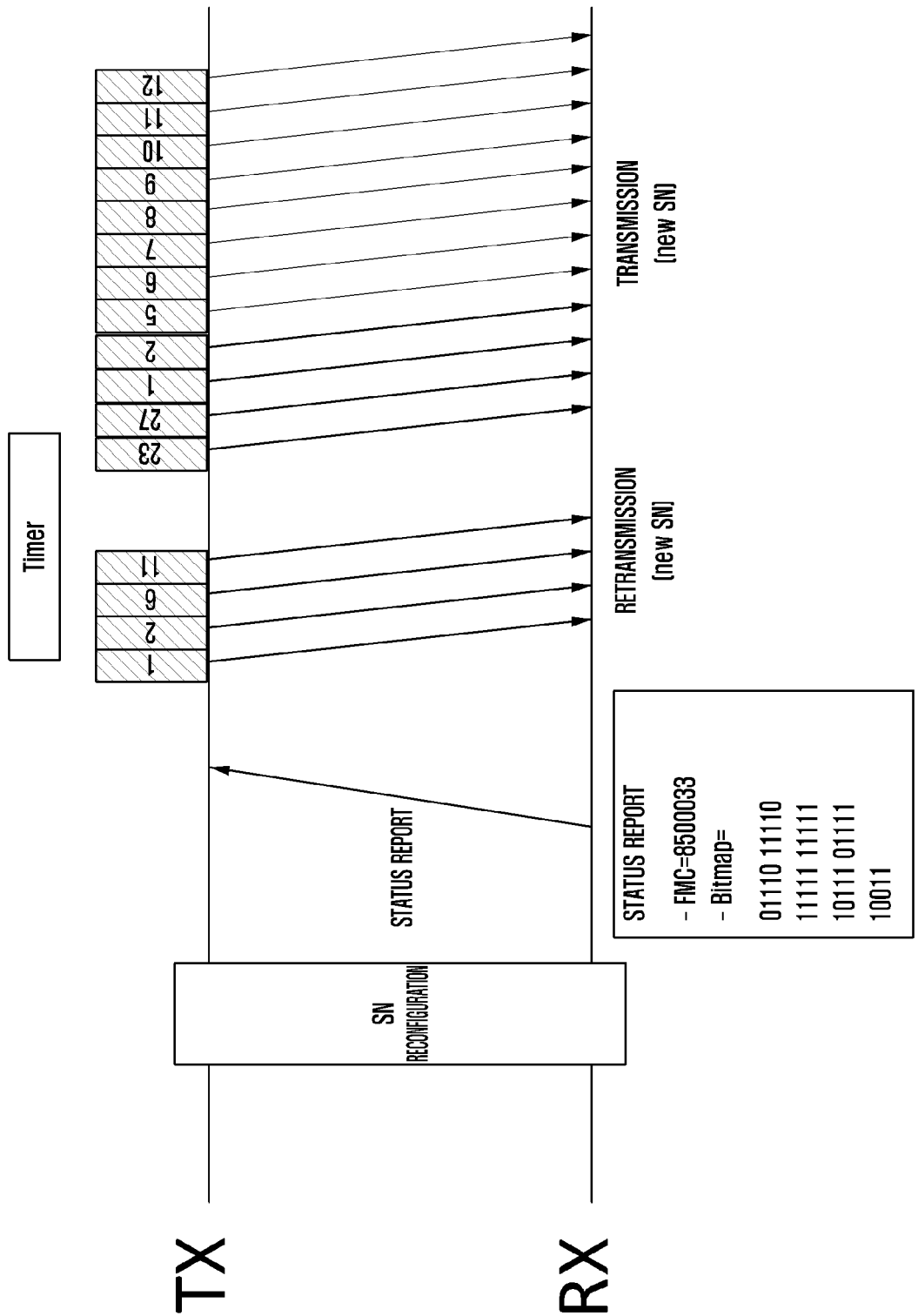
FIG. 44 is a diagram illustrating a procedure of retransmitting a non-reception packet after a packet format reconfiguration by which the length of a PDCP SN is changed according to an embodiment of the disclosure.

FIG. 44 shows an embodiment of a procedure of retransmitting a non-reception packet after a packet format reconfiguration by which the length of a PDCP SN is changed. In FIG. 44, it is assumed that the size of a PDCP SN is changed from 7 bits to 5 bits due to a reconfiguration. In this case, the reception situation of packets is the same as that of FIG. 40, and a description of a retransmitted packet is the same as that of FIG. 41. In the embodiment of FIG. 44, after a transmitter transmits a packet having a given PDCP SN, it performs the transmission of a corresponding packet after a sequence number interval, set after this packet, or a corresponding packet after a COUNT interval, set after this packet, after a set timer time.

In the embodiment of FIG. 44, it is assumed that after a packet corresponding to a COUNT 8500033, that is, the first packet of packets having a PDCP SN value of 1, is transmitted, the transmission of packets after a COUNT 8500049 (SN=17) having a COUNT value equal to or greater than 16 is performed after a timer time. The timer may be indicated in a reconfiguration to configuration message or may be indicated to use a preset value. A timer value may be set so that HFN desynchronization of different packets having the same PDCP SN does not occur or may be set as a PDCP reordering timer length in some embodiments. Furthermore, the interval (e.g., sequence number interval or COUNT interval) of a packet that delays transmission using the timer may be a preset value. Such a set value may be a PDCP reception window.

Figure 45:
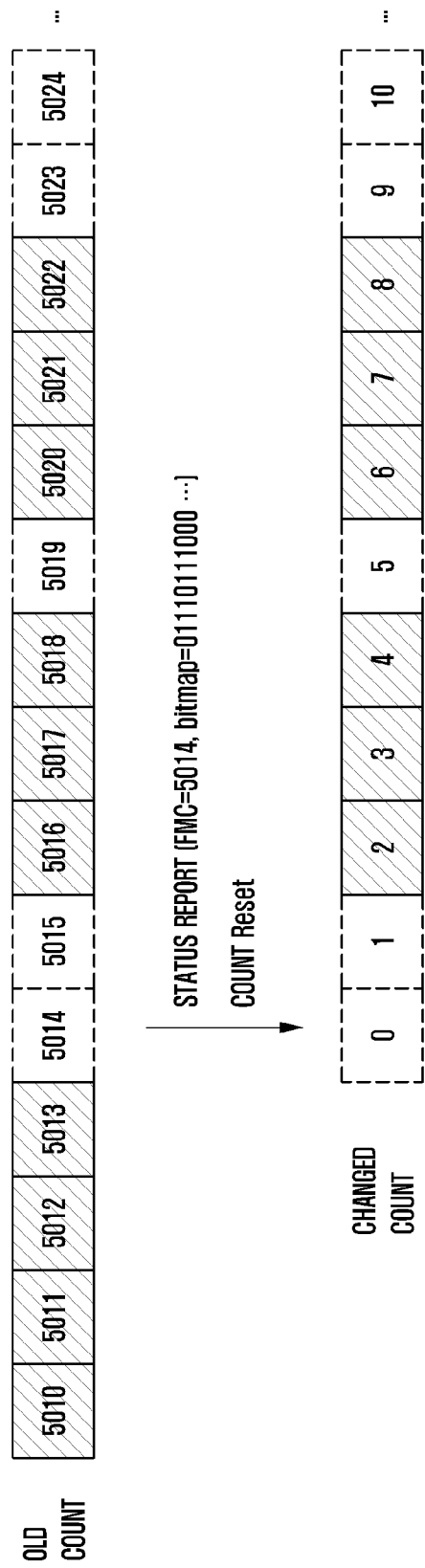
FIG. 45 is a diagram illustrating a procedure of changing a COUNT after the reconfiguration of a packet format according to an embodiment of the disclosure.

FIG. 45 shows a procedure of changing a COUNT after the reconfiguration of a packet format. In the embodiments of FIGS. 16 to 44, a COUNT value may be maintained even after a reconfiguration. However, in some embodiments, a COUNT value may be reconfigured and may start from an initial value. In the embodiment of FIG. 45, it is assumed that at reconfiguration timing, packets corresponding to COUNTs 5014, 5015, 5019, 5023, 5024 and a subsequent value are a non-reception state.

In this case, a receiver may transmit an FMC or FMS value and a bitmap regarding whether a packet has been received in a status report message. In this case, a PDCP COUNT value of a packet corresponding to an FMC or FMS value of the status report message may be reset to 0. In the embodiment of FIG. 45, it is assumed that a COUNT value of a packet corresponding to an old COUNT 5014 is reset to 0. Packets corresponding to COUNTs 0, 1, 5, 9, 10 changed based on the bitmap of the status report message and a COUNT value exceeding the COUNTs may be reconfigured to be a non-reception state, and a retransmission procedure may be performed.

Figure 46:
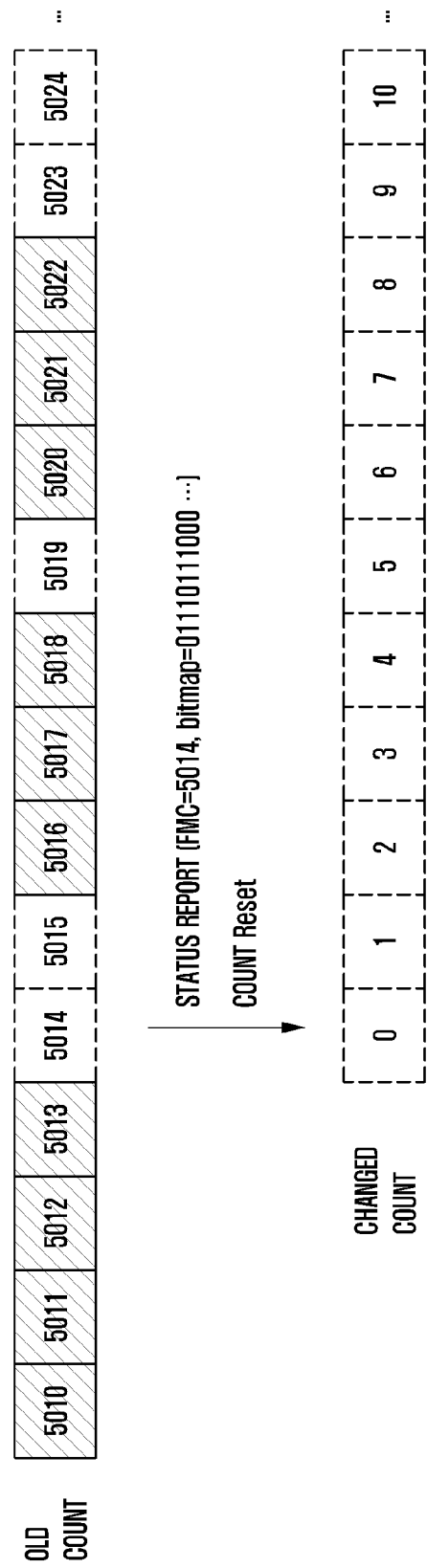
FIG. 46 is a diagram illustrating a procedure of changing a COUNT after the reconfiguration of a packet format according to an embodiment of the disclosure.

FIG. 46 shows a procedure of changing a COUNT after the reconfiguration of a packet format. In the embodiments of FIGS. 16 to 44, a COUNT value may be maintained even after a reconfiguration. However, in some embodiments, a COUNT value may be reset and may start from an initial value. In the embodiment of FIG. 46, it is assumed that at reconfiguration timing, packets corresponding to COUNTs 5014, 5015, 5019, 5023, 5024 and a subsequent value are a reception state.

In this case, a receiver may transmit an FMC or FMS value in a status report message. The receiver may additionally transmit a bitmap regarding whether a subsequent packet has been received. In this case, a PDCP COUNT value of a packet corresponding to the FMC or FMS value of the status report message may be reset to 0. In the embodiment of FIG. 46, it is assumed that a COUNT value of a packet corresponding to an old COUNT 5014 is reset to 0. In the embodiment of FIG. 46, all packets from a packet having a reset COUNT value of 0 to a subsequent packet may be reconfigured to be a non-reception state regardless of the relation with the bitmap of the status report message, and a retransmission procedure may be performed.

Figure 47:
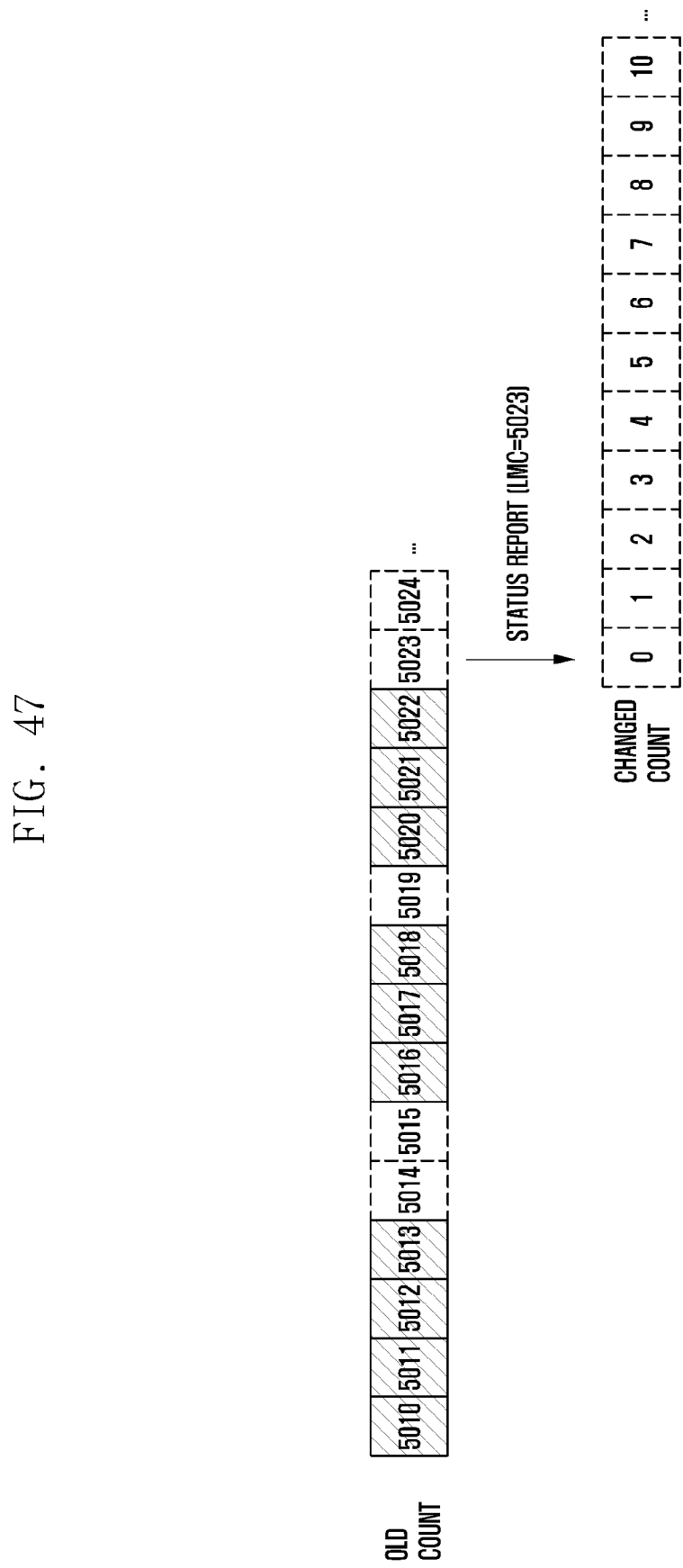
FIG. 47 is a diagram illustrating a procedure of changing a COUNT after the reconfiguration of a packet format according to an embodiment of the disclosure.

FIG. 47 shows a procedure of changing a COUNT after the reconfiguration of a packet format. In the embodiments of FIGS. 16 to 44, a COUNT value may be maintained even after a reconfiguration. However, in some embodiments, a COUNT value may be reset and may start from an initial value. In the embodiment of FIG. 47, it is assumed that at reconfiguration timing, packets corresponding to COUNTs 5014, 5015, 5019, 5023, 5024 and a subsequent value are a non-reception state.

In this case, a receiver may transmit the last missing count (LMC) value or the last missing SN (LMS) value in a status report message. In the embodiment of FIG. 47, it is assumed that the LMC value is set to 5023. In this case, the LMC value indicates the smallest COUNT value continuously determined to be a non-reception COUNT without a COUNT value determined to have been received by a receiver. Likewise, the LMS value indicates the smallest SN value continuously determined to be a non-reception SN without an SN determined to have been received by a receiver. Additionally, a bitmap regarding whether a subsequent packet has been received may be transmitted.

In this case, a PDCP COUNT value of a packet corresponding to the LMC or LMS value of the status report message may be reset to 0. In the embodiment of FIG. 47, all packets from a packet having a reset COUNT value of 0 to a subsequent packet may be updated as being a non-reception state regardless of the bitmap of a status report message, and a retransmission procedure may be performed.

Figure 48:
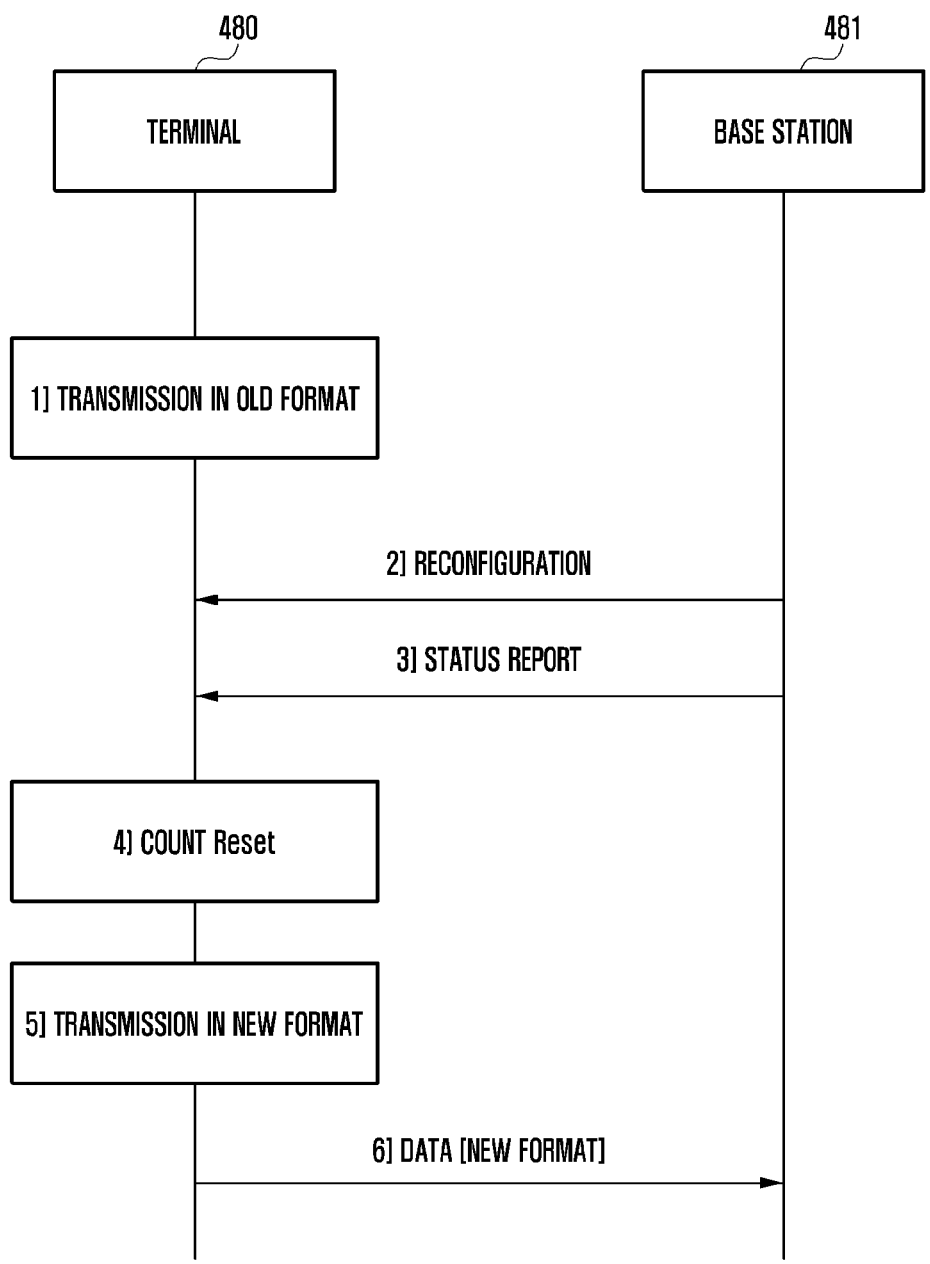
FIG. 48 is a diagram illustrating a procedure of changing COUNT resumption and a header format with respect to uplink data according to an embodiment of the disclosure.

FIG. 48 shows a procedure of changing COUNT resumption and a header format with respect to uplink data. In an embodiment of FIG. 48, an old format may include an SN size having a relatively long length, and a new format may include an SN size having a relatively short length. Alternatively, the opposite case is also possible.

At the start timing of the embodiment of FIG. 48, a terminal 480 transmits a packet to a base station 481 using an old format (1). Thereafter, the terminal 480 receives a reconfiguration message from the base station 481 (2), and recognizes that it needs to transmit a packet using a new format. In this case, the receiver, that is, the base station 481, transmits a receiver status report message to the transmitter, that is, the terminal 480, in order to identify information of the received packet (3). In this case, the PDCP entities of the base station 481 and the terminal 480 may be responsible for this role.

The status report message includes information indicating which packet has been received or which packet is not received or needs to be retransmitted. The status report message may include an SN or COUNT value that has not been first received and a bitmap indicative of the reception state of a subsequent packet. Detailed status report messages are shown in FIGS. 32 and 33.

After receiving the reconfiguration message and the status report message, the terminal 480 resets a COUNT (4). In this case, the terminal reconfigures a packet, corresponding to one of an FMS, FMC, LMS or LMC value included in the status report message, as a COUNT 0. A method of resetting the COUNT to 0 may follow one of the procedures of FIGS. 45 to 47. Thereafter, the terminal 480 may transmit an uplink packet to the base station 481 using a new format (5). I order to prevent HFN desynchronization, the terminal may use the transmission method described in FIG. 43-44. From this timing, the base station 481 receives a packet using the new format (6).

Figure 49:
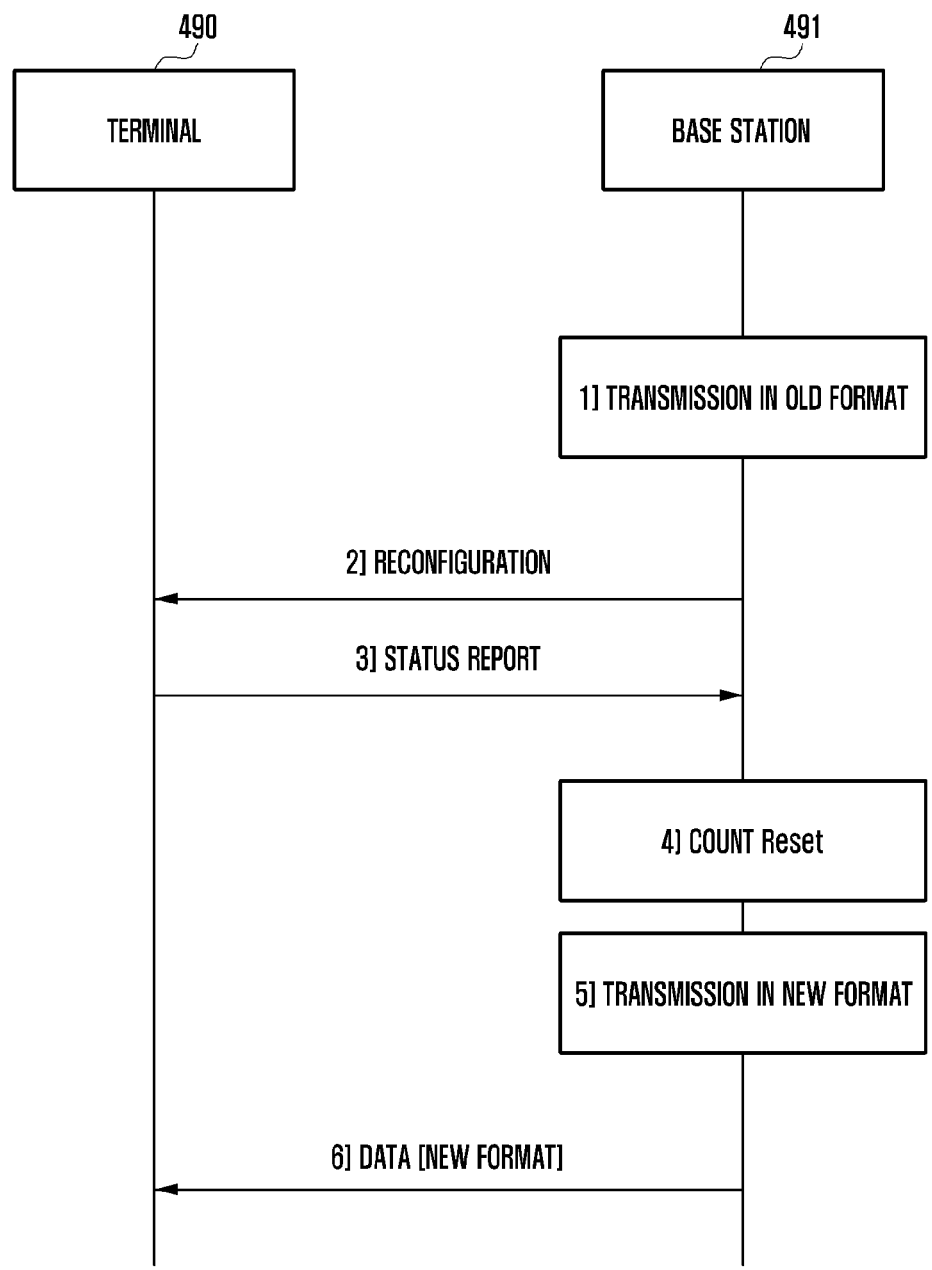
FIG. 49 is a diagram illustrating a procedure of changing COUNT resumption and a header format with respect to downlink data according to an embodiment of the disclosure.

FIG. 49 shows a procedure of changing COUNT resumption and a header format with respect to downlink data. In an embodiment of FIG. 49, an old format may include an SN size having a relatively long length, and a new format may include an SN size having a relatively short length. Alternatively, the opposite case is also possible.

At the start timing of the embodiment of FIG. 49, a base station 491 transmits a packet to a terminal 490 using an old format (1). After the base station transmits a reconfiguration message (2), it recognizes that it needs to transmit a packet using a new format. In this case, the receiver, that is, the terminal 490, transmits a receiver status report message to the transmitter, that is, the base station 491 (3), in order to identify information of the received packet. In this case, the PDCP entities of the base station and the terminal may be responsible for this role. The status report message includes information indicating which packet has been received or which packet is not received or needs to be retransmitted. The status report message may include a packet SN or COUNT value that has not been first received and a bitmap indicative of the reception state of a subsequent packet. Detailed status report messages are shown in FIGS. 32 and 33.

After transmitting the reconfiguration message and receiving the status report message, the base station 491 resets a COUNT (4). In this case, the base station reconfigures a packet, corresponding to one of an FMS, FMC, LMS or LMC value included in the status report message, as a COUNT 0. A method of resetting the COUNT to 0 may follow one of the procedures of FIGS. 45 to 47. Thereafter, the base station 491 may transmit a downlink packet to the terminal using a new format (5). In order to prevent HFN desynchronization, the base station may use the transmission method described in FIG. 43-44. From this timing, the terminal 490 receives a packet using the new format (6).

Figure 50:
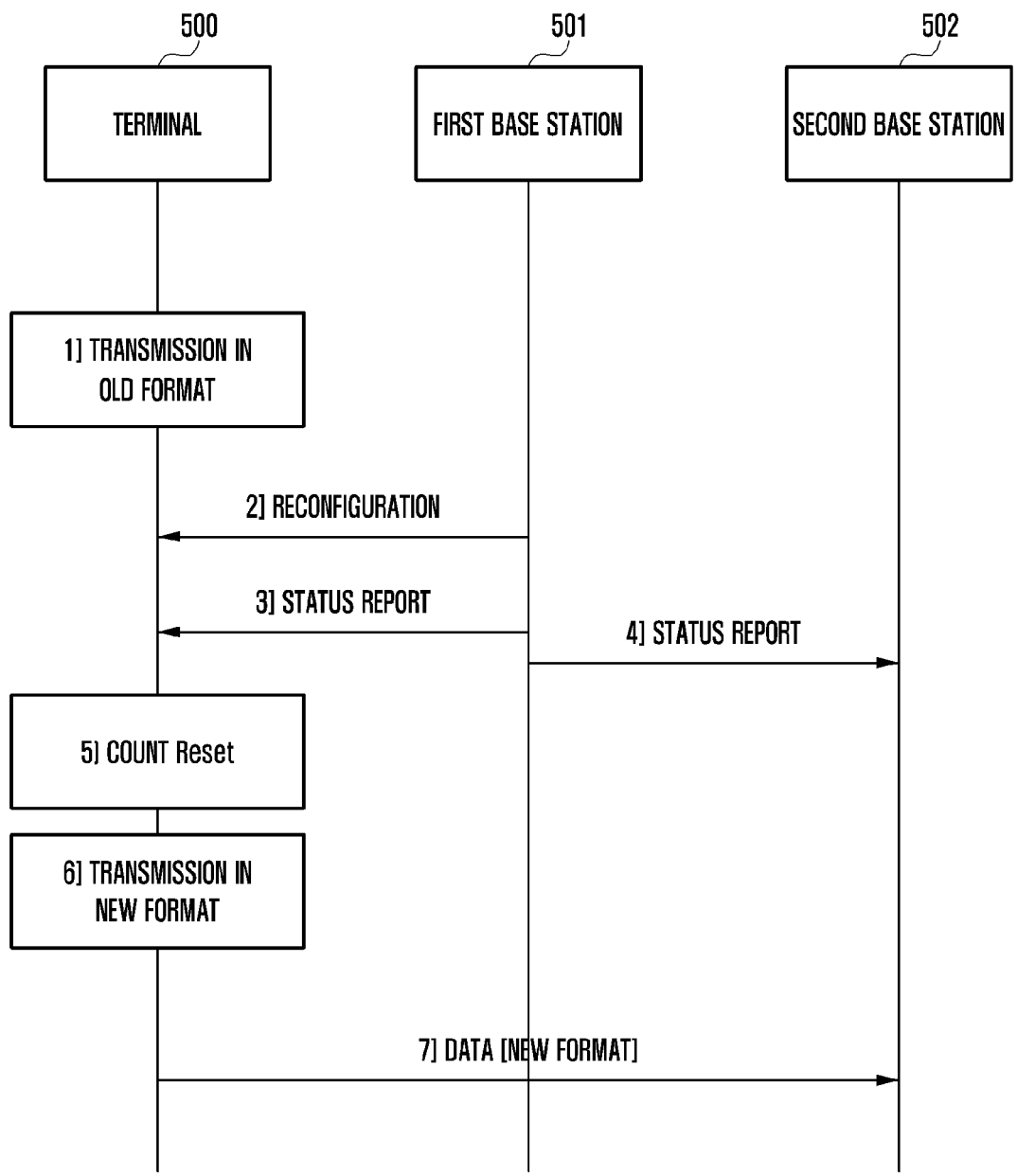
FIG. 50 is a diagram illustrating a terminal and base station signal flow when a COUNT is restarted and a header format is changed with respect to uplink data according to an embodiment of the disclosure.

FIG. 50 shows a terminal and base station signal flow when a COUNT is restarted and a header format is changed with respect to uplink data. In an embodiment of FIG. 50, an old format may include an SN size having a relatively long length, and a new format may include an SN size having a relatively short length. Alternatively, the opposite case is also possible.

At the start timing of the embodiment of FIG. 50, a terminal 500 transmits a packet to a first base station 501 using an old format (1). Thereafter, the terminal 500 receives a reconfiguration message from the base station (2), and recognizes that it needs to transmit a packet using a new format. In the embodiment of FIG. 50, it has been assumed that the reconfiguration message is received from the first base station 501, but a base station capable of transmitting a reconfiguration message to the terminal is not limited to the transmission of the message. In this case, a receiver, that is, the first base station 501, transmits a receiver status report message to the transmitter, that is, the terminal 500 (3), in order to identify information of the received packet. In this case, the PDCP entities of the base station and the terminal may be responsible for this role.

In the embodiment of FIG. 50, it has been assumed that the first base station 501 transmits a status report message to the terminal 500, but the first base station 501 may transmit the status report message to a second base station 502 (4) and the second base station 502 may then transmit the status report message to the terminal 501. The status report message includes information indicating which packet has been received or which packet is not received or needs to be retransmitted. The status report message may include an SN or COUNT value that has not been first received. Furthermore, the status report message may include a bitmap indicative of the reception state of a packet. Detailed status report messages are shown in FIGS. 32 and 33.

After receiving the reconfiguration message and the status report message, the terminal 500 resets a COUNT (5). In this case, the terminal reconfigures a packet, corresponding to one of an FMS, FMC, LMS or LMC value included in the status report message, as a COUNT 0. A method of resetting the COUNT to 0 may follow one of the procedures of FIGS. 45 to 47. Thereafter, the terminal 500 may transmit an uplink packet to the second base station 502 using a new format (6). In order to prevent HFN desynchronization, the base station and the terminal may use the transmission method described in FIG. 43-44. From this timing, the second base station 502 receives a packet using a new format (7).

Figure 51:
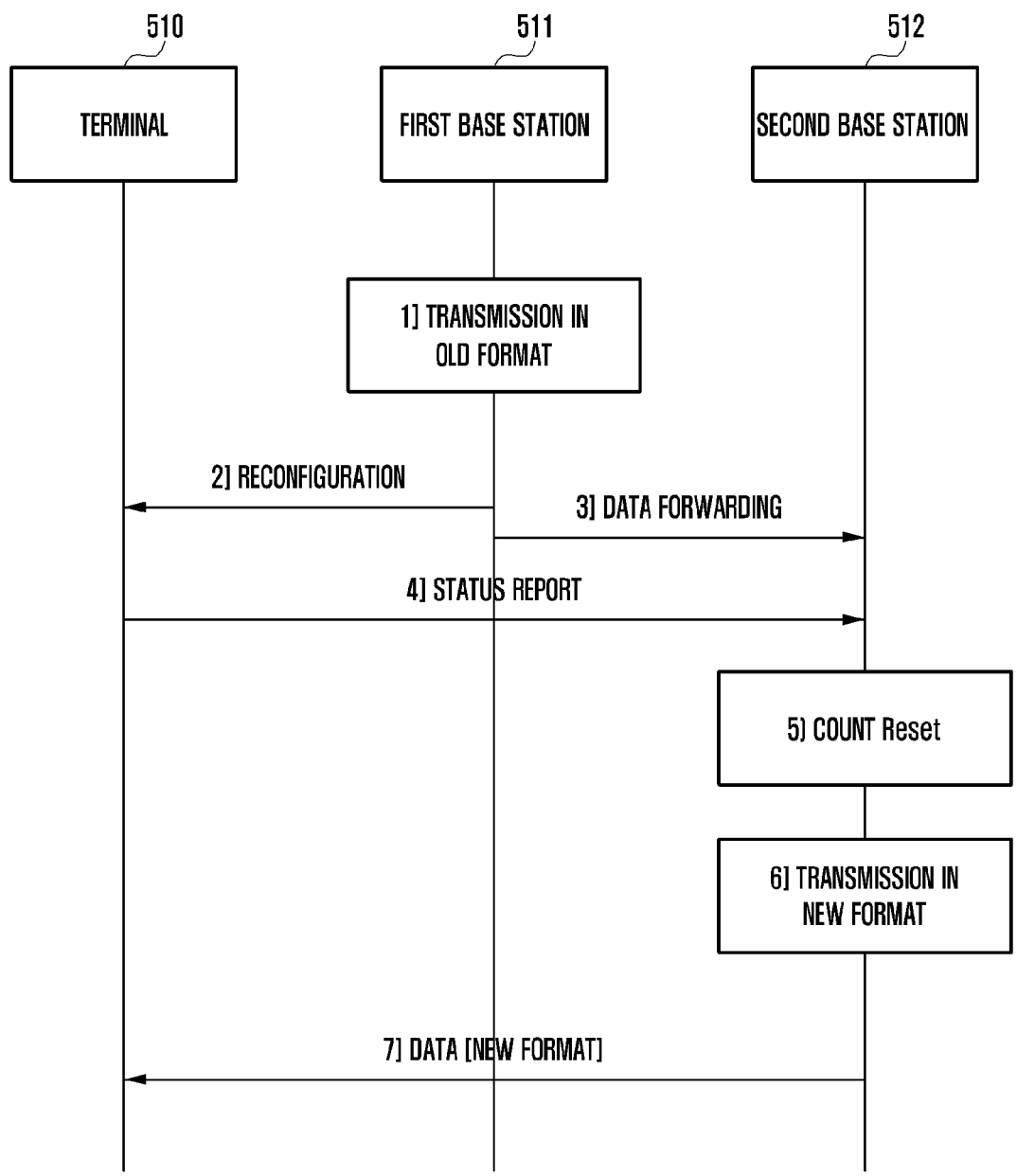
FIG. 51 is a diagram illustrating a terminal and base station signal flow when a COUNT is restarted and a header format is changed with respect to downlink data according to an embodiment of the disclosure.

FIG. 51 shows a terminal and base station signal flow when a COUNT is restarted and a header format is changed with respect to downlink data. In an embodiment of FIG. 51, an old format may include an SN size having a relatively long length, and a new format may include an SN size having a relatively short length. Alternatively, the opposite case is also possible.

At the start timing of the embodiment of FIG. 51, a first base station 511 transmits a packet to a terminal 510 using an old format (1). Thereafter, the terminal 510 receives a reconfiguration message from the base station and recognizes that it needs to receive a packet using a new format. In the embodiment of FIG. 51, it has been assumed that the reconfiguration message is received from the first base station 511, but a base station capable of transmitting a reconfiguration message to the terminal 510 is not limited to the transmission of the message. The first base station 511 forwards data to a second base station 512 (3).

In this case, the receiver, that is, the terminal 510, transmits a receiver status report message to a transmitter, that is, the base station, in order to identify information of the received packet. In this case, the PDCP entities of the base station and the terminal may be responsible for this role. In the embodiment of FIG. 51, it has been assumed that the terminal 510 transmits the status report message to the second base station 512 (4), but the terminal may transmit the status report message to the first base station 511 and the first base station 511 may then transmit the status report message to the second base station 512. The status report message includes information indicating which packet has been received or which packet is not received or needs to be retransmitted. The status report message may include an SN or COUNT value that has not been first received. Furthermore, the status report message may include a bitmap indicative of the reception state of the packet. Detailed status report messages are shown in FIGS. 32 and 33.

After receiving the status report message, the second base station 512 resets a COUNT (5). In this case, the second base station reconfigures a packet, corresponding to one of an FMS, FMC, LMS or LMC value included in the status report message, as a COUNT 0. A method of resetting the COUNT to 0 may follow one of the procedures of FIGS. 45 to 47.

Thereafter, the second base station 512 may transmit a downlink packet to the terminal using a new format (6). In order to prevent HFN desynchronization, the base station and the terminal may use the transmission method described in FIG. 43-44. From this timing, the terminal 510 receives a packet using a new format (7).

Figure 52:
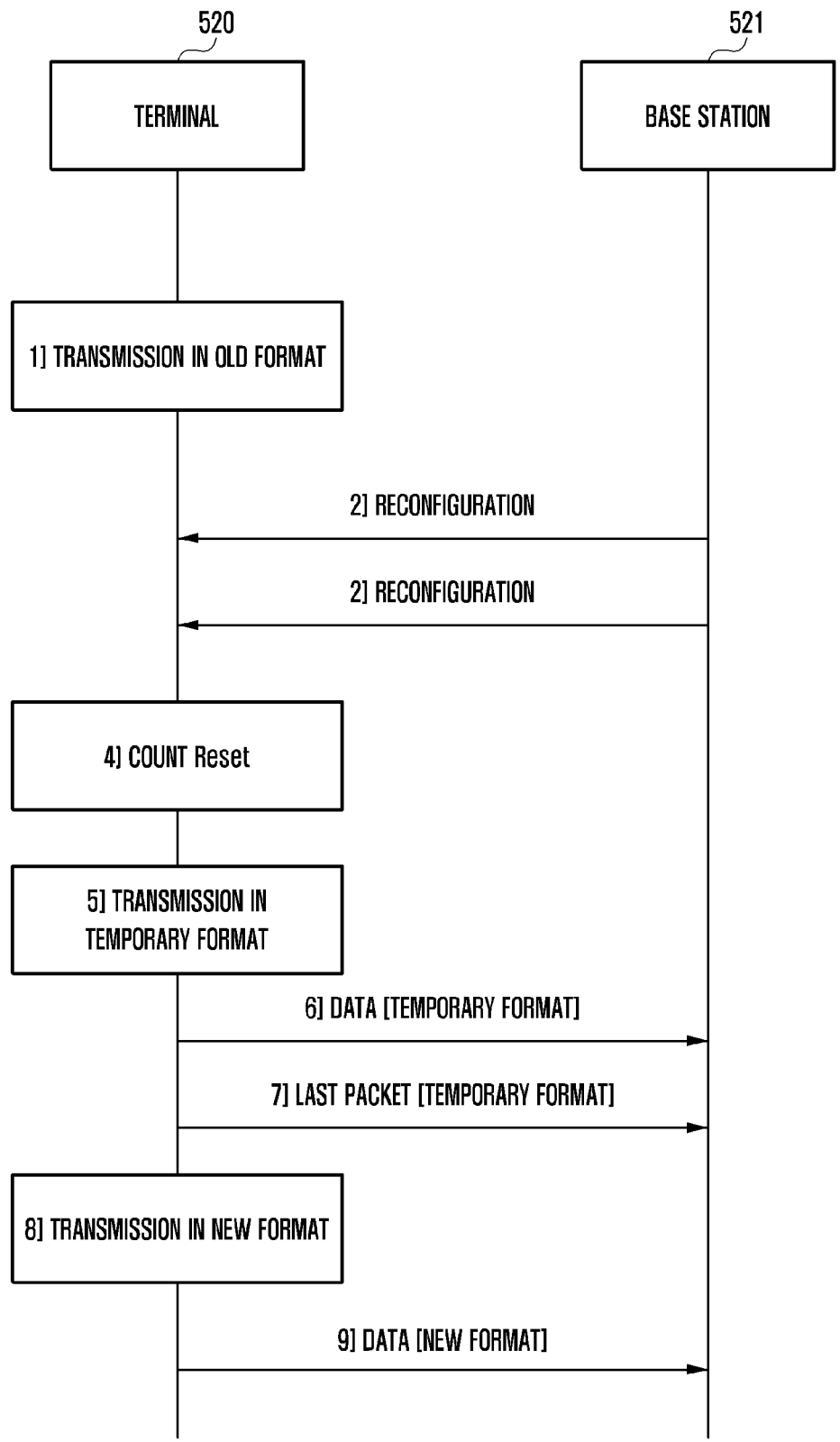
FIG. 52 is a diagram illustrating a procedure of changing COUNT resumption and a header format with respect to uplink data according to an embodiment of the disclosure.

FIG. 52 shows a procedure of changing COUNT resumption and a header format with respect to uplink data. In an embodiment of FIG. 52, an old format may include an SN size having a relatively long length, and a new format may include an SN size having a relatively short length. Alternatively, the opposite case is also possible.

At the start timing of the embodiment of FIG. 52, a terminal 520 transmits a packet to a base station 521 using an old format (1). Thereafter, the terminal 520 receives a reconfiguration message from the base station 521 (2), and recognizes that it needs to transmit a packet using a new format. In this case, the receiver, that is, the base station 521, transmits a receiver status report message to the transmitter, that is, the terminal 520 (3), in order to identify information of the received packet. In this case, the PDCP entities of the base station 521 and the terminal 520 may be responsible for this role. The status report message includes information indicating which packet has been received or which packet is not received or needs to be retransmitted. The status report message may include an SN or COUNT value that has not been first received and a bitmap indicative of the reception state of a subsequent packet. Detailed status report messages are shown in FIGS. 32 and 33.

After receiving the reconfiguration message and receiving the status report message, the terminal 520 resets a COUNT (4). In this case, the terminal reconfigures a packet, corresponding to one of an FMS, FMC, LMS or LMC value included in the status report message, as a COUNT 0. A method of resetting the COUNT to 0 may follow one of the procedures of FIGS. 45 to 47.

The terminal 520 transmits a packet using a temporary format after resetting the COUNT to 0 (5). The terminal 520 transmits a packet as much as a preset amount using the temporary format (6, 7), and may hereinafter transmit a packet using a new format indicated in the reconfiguration message (8). In this case, the terminal may transmit up to a packet, having an SN or COUNT value that is a given amount higher than a first missing SN (FMS) or first missing count (FMC) indicated in the status report message, using the temporary format. The size of the given amount may be a PDCP Window size used in the old format or a positive number times the size.

After the transmitter, that is, the terminal 520, transmits a packet using the temporary format, it transmits a packet using a new format (9), but experiences retransmission in a radio channel. For this reason, the base station 521 may receive the data of the temporary format and the data of the new format that have been out of sequence. In such a case, in order to distinguish between the heater formats, an indicator to identify whether a packet uses the temporary format is necessary, and detailed header formats thereof are shown in FIGS. 34 and 35.

Figure 53:
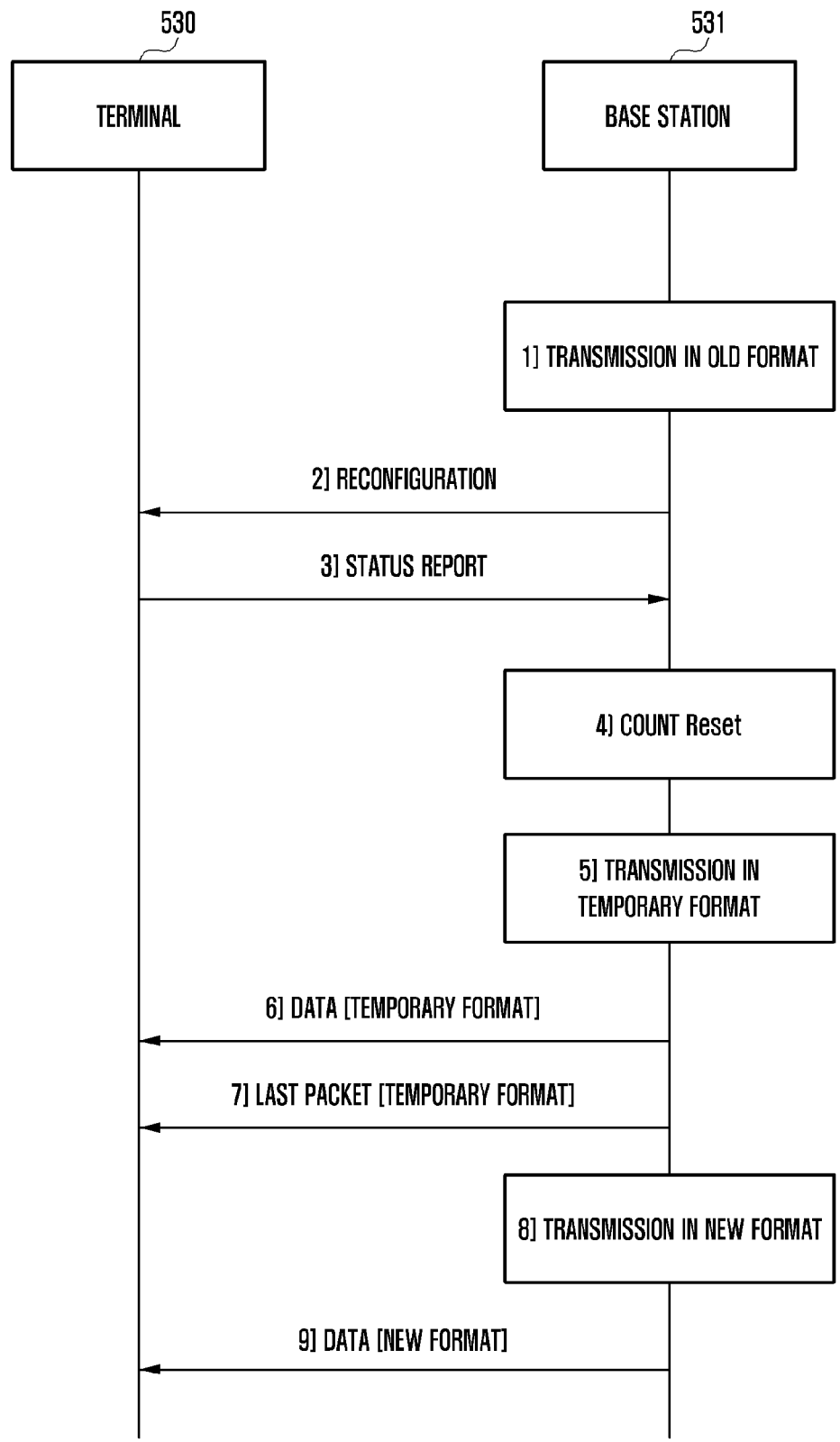
FIG. 53 is a diagram illustrating a procedure of restarting a COUNT and changing a header format with respect to downlink data according to an embodiment of the disclosure.

FIG. 53 shows a procedure of restarting a COUNT and changing a header format with respect to downlink data. In an embodiment of FIG. 53, an old format may include an SN size having a relatively long length, and a new format may include an SN size having a relatively short length. Alternatively, the opposite case is also possible.

At the start timing of the embodiment of FIG. 53, a base station 531 transmits a packet to a terminal 530 using an old format (1). After transmitting a reconfiguration message (2), the base station 531 recognizes that it needs to transmit a packet using a new format. In this case, the receiver, that is, the terminal 530, transmits a receiver status report message to the transmitter, that is, the base station 531 (3), in order to identify information of the received packet. In this case, the PDCP entities of the base station 531 and the terminal 530 may be responsible for this role. The status report message includes information indicating which packet has been received or which packet is not received or needs to be retransmitted. The status report message may include an SN or COUNT value that has not been first received and a bitmap indicative of the reception state of a subsequent packet. Detailed status report messages are shown in FIGS. 32 and 33.

After transmitting reconfiguration message and receiving the status report message, the base station 531 resets a COUNT (4). In this case, the base station reconfigures a packet, corresponding to one of an FMS, FMC, LMS or LMC value included in the status report message, as a COUNT 0. A method of resetting the COUNT to 0 may follow one of the procedures of FIGS. 45 to 47. After resetting the COUNT to 0, the base station 531 transmits a packet using a temporary format (5). The base station transmits a packet as much as a preset amount using the temporary format (6, 7), and may hereinafter transmit a packet using a new format indicated in the reconfiguration message (8).

In this case, the base station may transmit up to a packet, having an SN or COUNT value that is a given amount higher than a first missing SN (FMS) or first missing count (FMC) indicated in the status report message, using the temporary format. The size of the given amount may be a PDCP Window size used in the old format or a positive number times the size. After transmitting a packet using the temporary format, the transmitter, that is, the base station 531, transmits a packet using a new format (9), but experiences retransmission in a radio channel. For this reason, the terminal 530 may receive the data of the temporary format and the data of the new format that have been out of sequence. In such a case, in order to distinguish between the heater formats, an indicator to identify whether a packet uses the temporary format is necessary, and detailed header formats thereof are shown in FIGS. 34 and 35.

Figure 54:
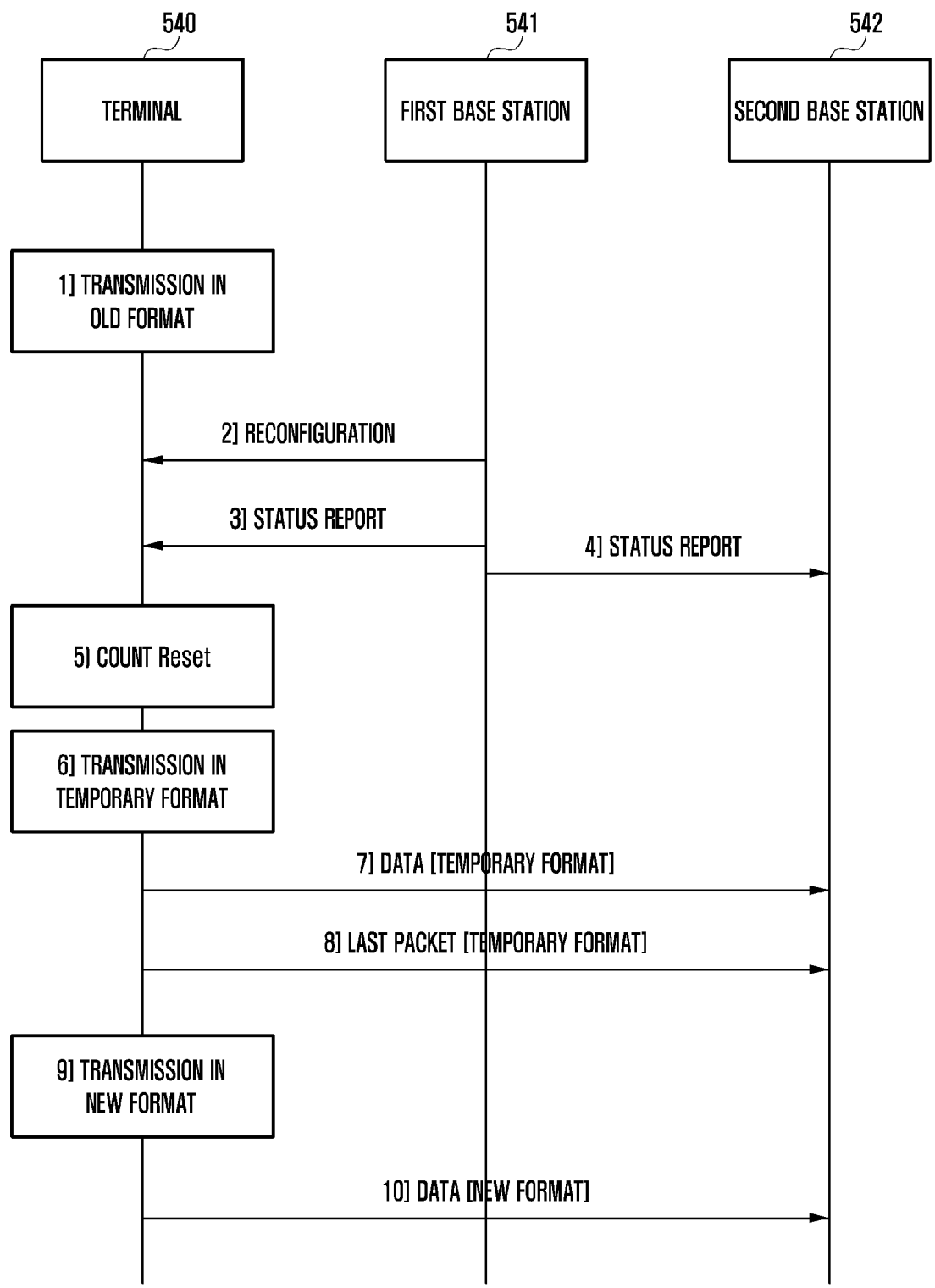
FIG. 54 is a diagram illustrating a change signal flow between a terminal and a base station when a COUNT is restarted and a header format is changed with respect to uplink data according to an embodiment of the disclosure.

FIG. 54 shows a change signal flow between a terminal and a base station when a COUNT is restarted and a header format is changed with respect to uplink data. In an embodiment of FIG. 54, an old format may include an SN size having a relatively long length, and a new format may include an SN size having a relatively short length. Alternatively, the opposite case is also possible.

At the start timing of the embodiment of FIG. 54, a terminal 540 transmits a packet to a first base station 541 using an old format (1). Thereafter, the terminal 540 receives a reconfiguration message from the base station and recognizes that it needs to transmit a packet using a new format. In the embodiment of FIG. 54, it has been assumed that the reconfiguration message is received from the first base station 541 (2), but a base station capable of transmitting the reconfiguration message to the terminal is not limited to the transmission of the message. In this case, a receiver, that is, the first base station 541, transmits a receiver status report message to the transmitter, that is, the terminal 540 (3), in order to identify information of the received packet. In this case, the PDCP entities of the base station and the terminal may be responsible for this role. In the embodiment of FIG. 54, it has been assumed that the first base station 541 transmits the status report message to the terminal 540, but the first base station 541 may transmit the status report message to a second base station 542 (4) and the second base station 542 may transmit the status report message to the terminal 540.

The status report message includes information indicating which packet has been received or which packet is not received or needs to be retransmitted. The status report message may include an SN or COUNT value that has not been first received. Furthermore, the status report message may include a bitmap indicative of the reception state of the packet. Detailed status report messages are shown in FIGS. 32 and 33.

After receiving the reconfiguration message and receiving the status report message, the terminal 540 resets a COUNT (5). In this case, the terminal reconfigures a packet, corresponding to one of an FMS, FMC, LMS or LMC value included in the status report message, as a COUNT 0. A method of resetting the COUNT to 0 may follow one of the procedures of FIGS. 45 to 47.

The terminal 540 transmits a packet using a temporary format (6) after resetting the COUNT to 0. The terminal 540 transmits a packet as much as a preset amount using the temporary format (7, 8), and may hereinafter transmit a packet using a new format indicated in the reconfiguration message (9). In this case, the terminal may transmit up to a packet, having an SN or COUNT value that is a given amount higher than a first missing SN (FMS) or first missing count (FMC) indicated in the status report message, using the temporary format. The size of the given amount may be a PDCP Window size used in the old format or a positive number times the size.

After transmitting a packet using the temporary format, the transmitter, that is, the terminal 540, transmits a packet using the new format (10), but experiences retransmission in a radio channel. For this reason, the second base station 542 may receive the data of the temporary format and the data of the new format that have been out of sequence. In such a case, in order to distinguish between the heater formats, an indicator to identify whether a packet uses the temporary format is necessary, and detailed header formats thereof are shown in FIGS. 34 and 35.

Figure 55:
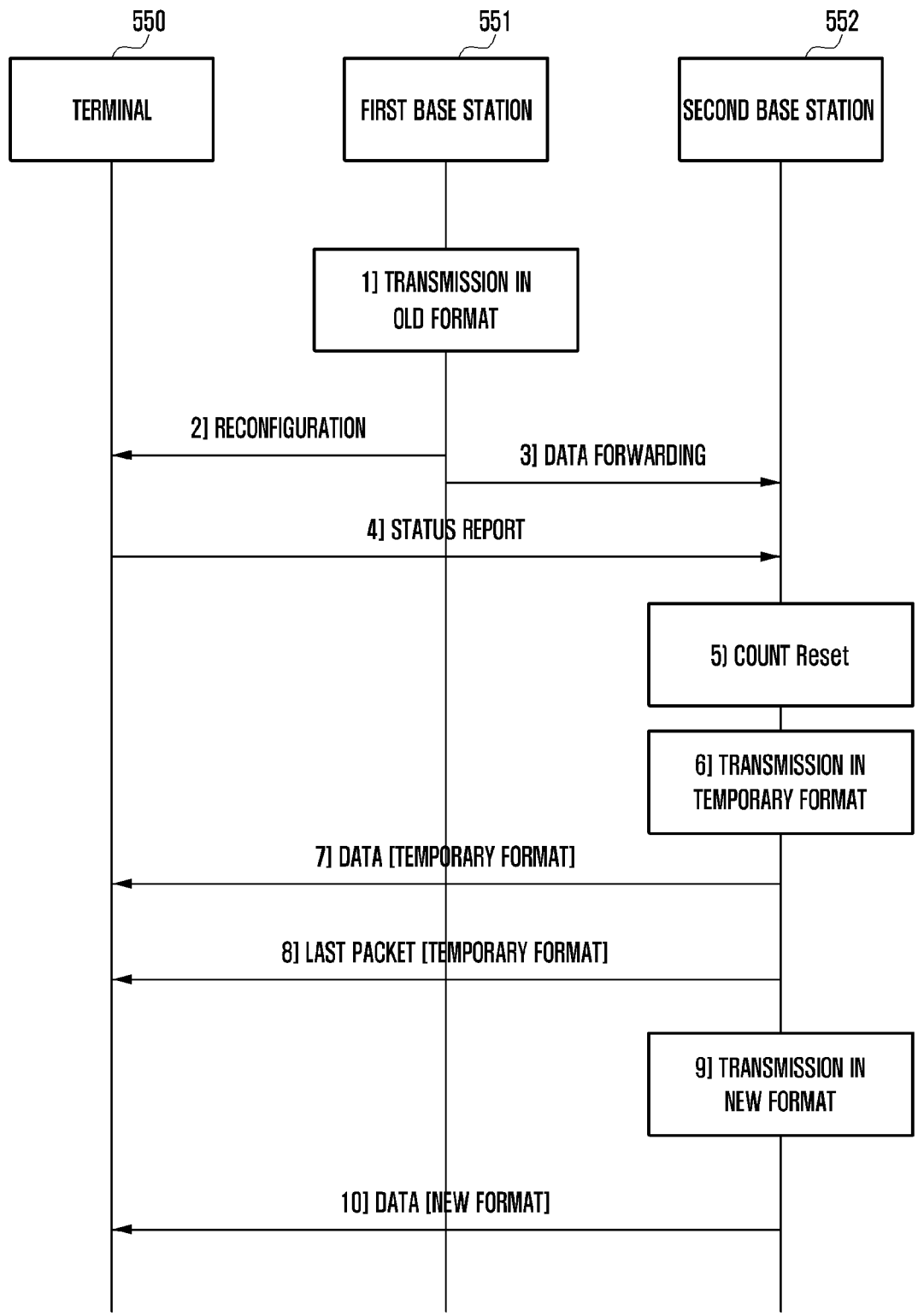
FIG. 55 is a diagram illustrating a change signal flow between a terminal and a base station when a COUNT is restarted and a header format is changed with respect to downlink data according to an embodiment of the disclosure.

FIG. 55 shows a change signal flow between a terminal and base stations when a COUNT is restarted and a header format is changed with respect to downlink data. In an embodiment of FIG. 55, an old format may include an SN size having a relatively long length, and a new format may include an SN size having a relatively short length. Alternatively, the opposite case is also possible.

At the start timing of the embodiment of FIG. 55, a first base station 551 transmits a packet to a terminal 550 using an old format (1). Thereafter, the terminal 550 receives a reconfiguration message from the base station and recognizes that it needs to receive a packet using a new format. The base station transmits the reconfiguration message and then recognizes that it needs to transmit a packet using the new format. In the embodiment of FIG. 55, it has been assumed that the reconfiguration message is received from the first base station 551 (2), but a base station capable of transmitting the reconfiguration message to the terminal is not limited to the transmission of the message. The first base station 551 forwards data to a second base station 552 (3).

In this case, the receiver, that is, the terminal 550, transmits a receiver status report message to the transmitter, that is, the base station, in order to identify information of the received packet. In this case, the PDCP entities of the base station and the terminal may be responsible for this role. In the embodiment of FIG. 55, it has been assumed that the terminal 550 transmits the status report message to the second base station 552 (4), but the terminal 550 may transmit the status report message to the first base station 551 and the first base station 551 may transmit the status report message to the second base station 552. The status report message includes information indicating which packet has been received or which packet is not received or needs to be retransmitted. The status report message may include an SN or COUNT value that has not been first received. Furthermore, the status report message may also include a bitmap indicative of the reception state of a subsequent packet. Detailed status report messages are shown in FIGS. 32 and 33.

After receiving the status report message, the second base station 552 resets a COUNT (5). In this case, the second base station reconfigures a packet, corresponding to one of an FMS, FMC, LMS or LMC value included in the status report message, as a COUNT 0. A method of resetting the COUNT to 0 may follow one of the procedures of FIGS. 45 to 47. After resetting the COUNT to 0, the second base station 552 transmits a packet using a temporary format (6). The second base station 552 transmits a packet as much as a preset amount using the temporary format (7, 8), and may hereinafter transmit a packet using a new format indicated in the reconfiguration message (9).

In this case, the second base station may transmit up to a packet, having an SN or COUNT value that is a given amount higher than a first missing SN (FMS) or first missing count (FMC) indicated in the status report message, using the temporary format. The size of the given amount may be a PDCP Window size used in the old format or a positive number times the size. After transmitting a packet using the temporary format, the transmitter, that is, the second base station 552, transmits a packet using the new format (10), but experiences retransmission in a radio channel. For this reason, the terminal 550 may receive the data of the temporary format and the data of the new format that have been out of sequence. In such a case, in order to distinguish between the heater formats, an indicator to identify whether a packet uses the temporary format is necessary, and detailed header formats thereof are shown in FIGS. 34 and 35.

Figure 56:
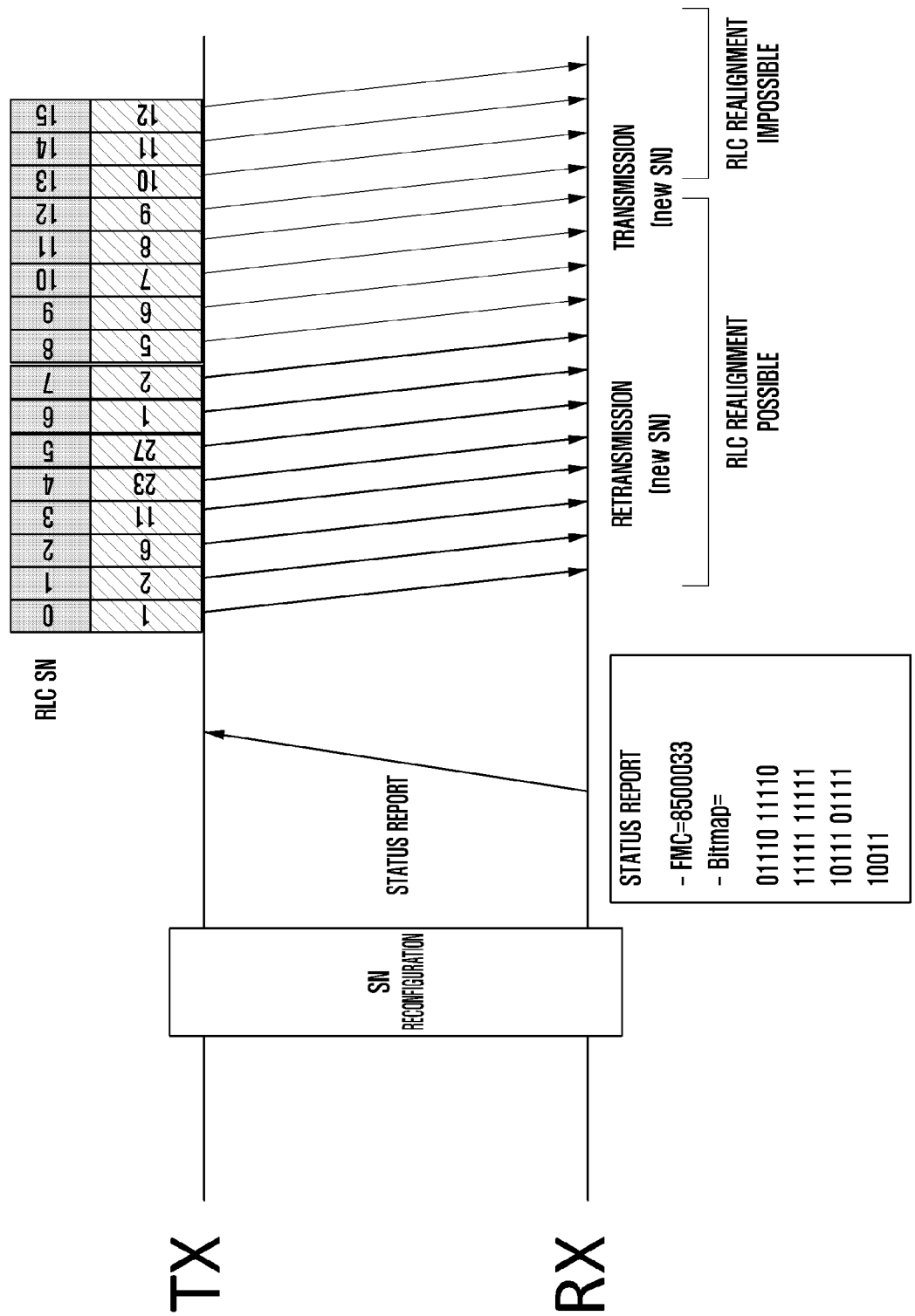
FIG. 56 is a diagram illustrating a procedure of retransmitting a non-reception packet after a packet format reconfiguration by which the length of a PDCP SN is changed according to an embodiment of the disclosure.

FIG. 56 shows an embodiment of a procedure of retransmitting a non-reception packet after a packet format reconfiguration by which the length of a PDCP SN is changed. In FIG. 56, it is assumed that the size of the PDCP SN is changed from 7 bits to 5 bits due to a reconfiguration. In this case, the reception situation of a packet is the same as that of FIG. 40. Accordingly, in this case, a status report may be transmitted from a receiver to a transmitter, and may include an FMC and a bitmap as shown in the embodiment of FIG. 33 or may include an FMS and a bitmap as shown in the embodiment of FIG. 32. In FIG. 56, it is assumed that the status report is transmitted as the status report of FIG. 33 including an FMC and a bitmap.

The FMC indicates a COUNT value of a packet having the smallest COUNT value among not-received packets, and thus 8500033 is indicated in the FMC. Furthermore, the reception state of packets subsequent to this packet is indicated using a bitmap. In the embodiment of FIG. 56, the bitmap is indicated as 0 upon non-reception and indicated as 1 upon reception. Accordingly, the bitmap may be indicated as 01110 11110 11111 11111 10111 01111 10011. That is, the non-reception of packets having COUNT values of 8500034, 8500038, 8500043, 8500055, 8500059, 8500065, 8500066 has been specified as a bit 0, and it may indicate that up to a packet having a PDCP COUNT of 8500068 has been received.

A transmitter performs the retransmission of the non-reception packets based on them. In this case, the transmitter transmits the packets using a PDU format including a new PDCP SN among PDU formats including the PDCP SN of FIG. 35. In the embodiment of FIG. 56, the F field of FIG. 34-35 may not be used because different formats including a PDCP SN or a COUNT are not mixed in a receiver.

In this case, the RLC header of the RLC layer may be additionally attached to packets (PDCP SDUs or PDCP PDUs), and the packets may be transmitted. The RLC header may include an RLC sequence number (RLC SN). In the embodiment of FIG. 56, in the RLC layer, reordering is performed on a given number of packets after a reconfiguration or received after a status report message. The arrival sequence of packets, transmitted by a transmitter, at a receiver may be different due to several causes, such as a radio channel change.

For example, among packets corresponding to RLC sequence numbers 3 and 4 (corresponding to PDCP sequence numbers 11 and 23), the packet corresponding to the RLC sequence number 3 may be first transmitted, and the packet corresponding to the RLC sequence number 4 may be then transmitted. However, the packet corresponding to the RLC sequence number 4 may first arrive at a receiver, and the packet corresponding to the RLC sequence number 3 may then arrive at the receive. In this case, HFN desynchronization may occur due to such a phenomenon in the sequence is changed.

In the embodiment of FIG. 56, after reordering is performed on 12 packets from an RLC sequence number 0 to an RLC sequence number 11 in the RLC layer of a receiver, the packets may be sequentially transmitted to the PDCP layer of the receiver. Reordering may not be performed on subsequent packets, and the subsequent packet may be immediately transmitted from the RLC layer of the receiver to the PDCP layer when the packet is received. In this case, a base station may configure that reordering will be performed on how many packets with respect to a terminal.

Figure 57:
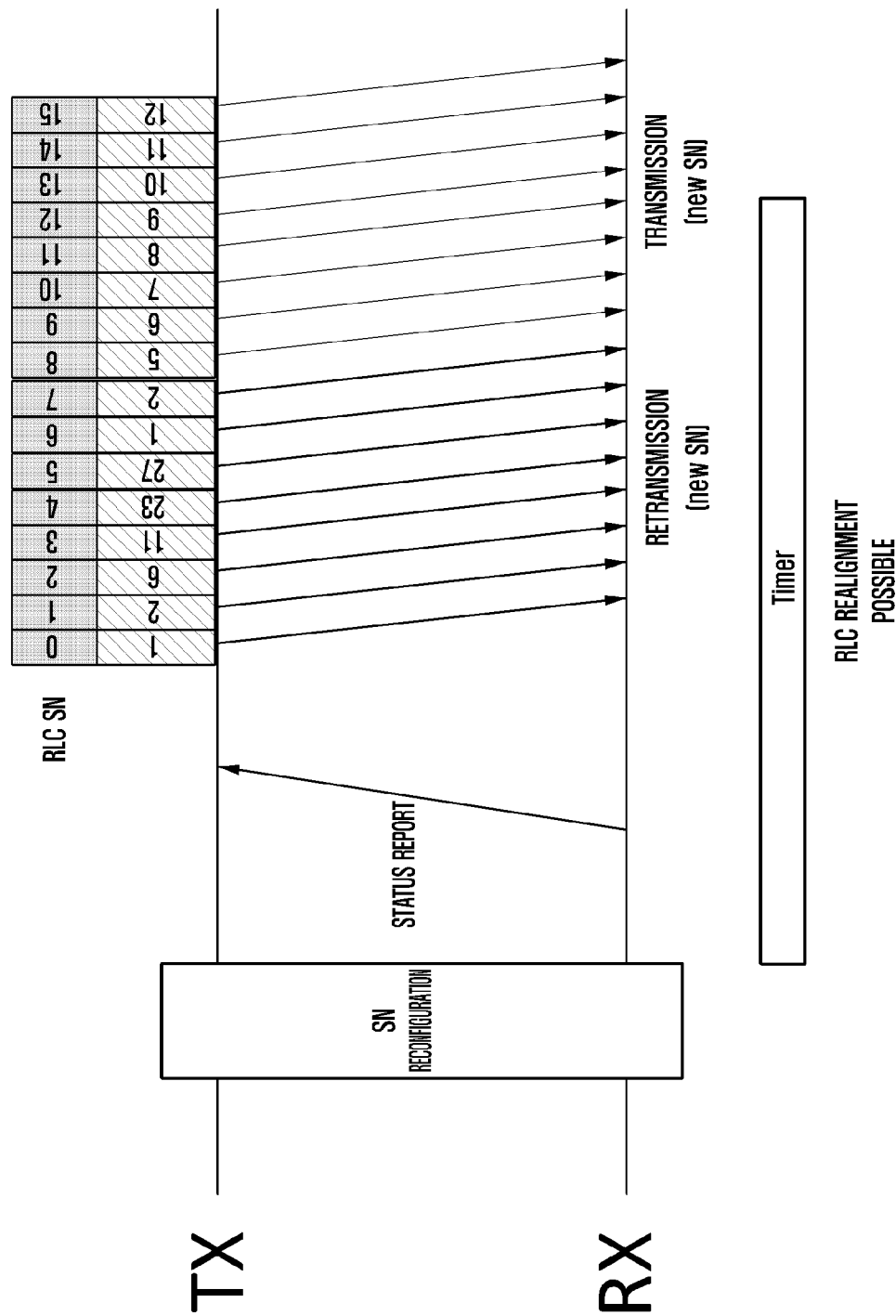
FIG. 57 is a diagram illustrating a procedure of retransmitting a non-reception packet after a packet format reconfiguration by which the length of a PDCP SN is changed according to an embodiment of the disclosure.

FIG. 57 shows an embodiment of a procedure of retransmitting a non-reception packet after a packet format reconfiguration by which the length of a PDCP SN is changed. In FIG. 57, it is assumed that the size of a PDCP SN is changed from 7 bits to 5 bits due to a reconfiguration. In this case, the reception situation of packets is the same as that of FIG. 40. Accordingly, in this case, a status report may be transmitted from a receiver to a transmitter, and may include an FMC and a bitmap as shown in the embodiment of FIG. 33 or may include an FMS and a bitmap as shown in the embodiment of FIG. 32. In FIG. 57, the status report is transmitted as the status report of FIG. 33 including an FMC and a bitmap.

The FMC indicates a COUNT value of a packet having the smallest COUNT value among not-received packets, and thus 8500033 is indicated in the FMC. Furthermore, the reception state of packets subsequent to this packet is indicated using a bitmap. In the embodiment of FIG. 57, the bitmap is indicated as 0 upon non-reception and indicated as 1 upon reception. Accordingly, the bitmap may be indicated as 01110 11110 11111 11111 10111 01111 10011. That is, the non-reception of packets having COUNT values of 8500034, 8500038, 8500043, 8500055, 8500059, 8500065, 8500066 has been specified as a bit 0, and it may indicate that up to a packet having a PDCP COUNT of 8500068 has been received.

A transmitter performs the retransmission of the non-reception packets based on them. In this case, the transmitter transmits the packets using a PDU format including a new PDCP SN among PDU formats including the PDCP SN of FIG. 35. In the embodiment of FIG. 57, the F field of FIG. 34-35 may not be used because different formats including a PDCP SN or a COUNT are not mixed in a receiver.

In this case, the RLC header of the RLC layer may be additionally attached to packets (PDCP SDUs or PDCP PDUs), and the packets may be transmitted. The RLC header may include an RLC sequence number (RLC SN). In the embodiment of FIG. 57, in the RLC layer, reordering is performed on packets after a reconfiguration or received after a status report message for a given time.

The arrival sequence of packets, transmitted by a transmitter, at a receiver may be different due to several causes, such as a radio channel change. For example, among packets corresponding to RLC sequence numbers 3 and 4 (corresponding to PDCP sequence numbers 11 and 23), the packet corresponding to the RLC sequence number 3 may be first transmitted, and the packet corresponding to the RLC sequence number 4 may be then transmitted. However, the packet corresponding to the RLC sequence number 4 may first arrive at a receiver, and the packet corresponding to the RLC sequence number 3 may then arrive at the receive. In this case, HFN desynchronization may occur due to such a phenomenon in the sequence is changed.

In the embodiment of FIG. 57, after a reconfiguration time, a timer may be driven, and reordering may be performed on packets until the timer expires. The packets may be sequentially transmitted to the PDCP layer of the receiver. Reordering may not be performed on subsequent packets, and the subsequent packet may be immediately transmitted from the RLC layer of the receiver to the PDCP layer when the packet is received. In this case, a base station may configure that reordering will be performed how long (timer time) in the RLC layer with respect to a terminal.

Meanwhile, the embodiments of the disclosure disclosed in the specification and drawings have suggested given examples in order to easily describe the technical contents of the disclosure and to help understanding of the disclosure, and are not intended to limit the scope of the disclosure. That is, it is evident to those skilled in the art to which the disclosure pertains that other modified examples based on technical spirit of the disclosure may be practiced. Furthermore, the embodiments may be combined and operated, if necessary. For example, part of the embodiment 1 and part of the embodiment 2 of the disclosure may be combined, and thus a base station and a terminal may operate based on them. Furthermore, the embodiments have been proposed based on the LTE/LTE-A system, but other modified examples based on the technical spirit of the embodiment may also be applied to other systems, such as 5G and an NR system.

The invention claimed is:

1. A method performed by a transmitter in a wireless communication system, the method comprising:
   receiving, from a receiver, configuration information on a report associated with packet data convergence protocol (PDCP) packet discarding;
   starting a timer for a PDCP packet;
   discarding the PDCP packet based on the timer being expired; and
   transmitting, to the receiver, the report including information on the discarded PDCP packet based on the configuration information,
   wherein at least one PDCP packet except for the discarded PDCP packet is processed at the receiver based on the report, without a transmission of a negative acknowledgement (NACK) for the discarded PDCP packet by the receiver.

2. The method of claim 1,
wherein the configuration information includes information on a discarded PDCP packet format, and
wherein the information on the discarded PDCP packet includes an indication of the discarded PDCP packet, and a sequence number of the discarded PDCP packet.

3. The method of claim 2, wherein the configuration information further includes threshold information on a waiting timer, and
wherein the method further comprises: starting the waiting timer, in case that a first PDCP packet is identified to be discarded; identifying whether the waiting timer expires over a time based on the threshold information; and transmitting, to the receiver, a report including a sequence number of the first PDCP packet and a sequence number of a second PDCP packet discarded during the time based on the threshold information based on the waiting timer being expired.

4. A method performed by a receiver in a wireless communication system, the method comprising:
transmitting, to a transmitter, configuration information on a report associated with packet data convergence protocol (PDCP) packet discarding;
receiving, from the transmitter, the report including information on a discarded PDCP packet, based on the configuration information, wherein the discarded PDCP packet is based on a timer started for a PDCP packet being expired; and
processing at least one PDCP packet except for the discarded PDCP packet based on the report, without transmitting a negative acknowledgement (NACK) for the discarded PDCP packet.

5. The method of claim 4,
wherein the configuration information includes information on a discarded PDCP packet format, and
wherein the information on the discarded PDCP packet includes an indication of the discarded PDCP packet, and a sequence number of the discarded PDCP packet.

6. The method of claim 5, wherein the configuration information includes at least one of information on a transmission period of the report, information on a transmission event of the report, or information on an occurrence condition of the transmission event.

7. The method of claim 6, wherein the configuration information further includes threshold information on a waiting timer, and
wherein the method further comprises: receiving, from the transmitter, a report including a sequence number of a first PDCP packet and a sequence number of a second PDCP packet discarded during a time until the waiting timer expires, after the waiting timer is started based on the first PDCP packet being discarded, and
wherein the waiting timer expires when a time based on the threshold information is exceeded after the waiting timer is started in the transmitter.

8. A transmitter in a wireless communication system, the transmitter comprising:
a transceiver; and
a controller configured to:
control the transceiver to receive, from a receiver, configuration information on a report associated with packet data convergence protocol (PDCP) packet discarding,
start a timer for a PDCP packet,
discard the PDCP packet based on the timer being expired, and
control the transceiver to transmit, to the receiver, the report including information on the discarded PDCP packet based on the configuration information,
wherein at least one PDCP packet except for the discarded PDCP packet is processed at the receiver based on the report, without a transmission of a negative acknowledgement (NACK) for the discarded PDCP packet by the receiver.

9. The transmitter of claim 8,
wherein the configuration information includes information on a discarded PDCP packet format, and
wherein the information on the discarded PDCP packet includes an indication of the discarded PDCP packet, and a sequence number of the discarded PDCP packet.

10. The transmitter of claim 9, wherein the configuration information includes at least one of information on a transmission period of the report, information on a transmission event of the report, or information on an occurrence condition of the transmission event.

11. The transmitter of claim 10, wherein the configuration information further includes threshold information on a waiting timer,
wherein the controller is further configured to start the waiting timer, in case that a first PDCP packet is identified to be discarded, identify whether the waiting timer expires over a time based on the threshold information, and control the transceiver to transmit, to the receiver, a report including a sequence number of the first PDCP packet and a sequence number of a second PDCP packet discarded during the time based on the threshold information, based on the waiting timer being expired.

12. A receiver in a wireless communication system, the receiver comprising:
a transceiver; and
a controller configured to:
control the transceiver to transmit, to a transmitter, configuration information on a report associated with packet data convergence protocol (PDCP) packet discarding,
control the transceiver to receive, from the transmitter, the report including information on a discarded PDCP packet generated based on the configuration information, wherein the discarded PDCP packet is based on a timer started for a PDCP packet being expired, and
process at least one PDCP packet except for the discarded PDCP packet based on the report, without transmitting a negative acknowledgement (NACK) for the discarded PDCP packet.

13. The receiver of claim 12, wherein the configuration information includes at least one of information on a transmission period of the reporting, information on a transmission event of the reporting, information on an occurrence condition of the transmission event or information on a discarded PDCP packet format.

14. The receiver of claim 13, wherein:
the configuration information further includes threshold information on a waiting timer,
the controller is further configured to control the transceiver to receive, from the transmitter, a report including a sequence number of a first PDCP packet and a sequence number of a second PDCP packet discarded during a time until the waiting timer expires after the waiting timer is started based on the first PDCP packet being discarded, and wherein the waiting timer expires based on a time being exceeded based on the threshold information after the waiting timer is started in the transmitter.

\* \* \* \* \*